United States Patent
Morita et al.

(10) Patent No.: US 9,433,857 B2
(45) Date of Patent: Sep. 6, 2016

(54) INPUT CONTROL DEVICE, INPUT CONTROL METHOD, AND INPUT CONTROL PROGRAM

(75) Inventors: Hiroshi Morita, Kanagawa (JP); Yuji Takeuchi, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 164 days.

(21) Appl. No.: 14/351,707

(22) PCT Filed: Jul. 24, 2012

(86) PCT No.: PCT/JP2012/004695
§ 371 (c)(1),
(2), (4) Date: Apr. 14, 2014

(87) PCT Pub. No.: WO2013/065214
PCT Pub. Date: May 10, 2013

(65) Prior Publication Data
US 2014/0243092 A1 Aug. 28, 2014

(30) Foreign Application Priority Data
Oct. 31, 2011 (JP) ................. 2011-239620

(51) Int. Cl.
*A63F 13/10* (2006.01)
*A63F 13/20* (2014.01)
(Continued)

(52) U.S. Cl.
CPC ............. *A63F 13/06* (2013.01); *G06F 1/1626* (2013.01); *G06F 3/0485* (2013.01);
(Continued)

(58) Field of Classification Search
CPC ....... A63F 13/06; A63F 13/10; G06F 3/0488
See application file for complete search history.

(56) References Cited

U.S. PATENT DOCUMENTS

| 8,547,358 B2 | 10/2013 | Homma |
| 2007/0097151 A1 | 5/2007 | Rosenberg |

(Continued)

FOREIGN PATENT DOCUMENTS

| EP | 2282256 A1 | 2/2011 |
| EP | 2341418 A | 7/2011 |

(Continued)

OTHER PUBLICATIONS

International Search Report for corresponding PCT/JP2012/004695, dated Sep. 18, 2012.
(Continued)

*Primary Examiner* — Omkar Deodhar
(74) *Attorney, Agent, or Firm* — Matthew B. Dernier, Esq.

(57) ABSTRACT

A game device includes a screen generator that displays a display target on a display screen of a display device, an input acquirer that acquires the position or direction of operation input to the display target from a touch panel annexed to the display screen of the display device and a back touch panel provided on a surface on the opposite side to the display screen of the display device, a determining section that determines the direction in which to operate the display target according to the position or direction of the operation input and the kind of the display target as the target of the operation when the input acquirer acquires the operation input to the display target from the back touch panel, and a movement controller or a rotation controller that operates the display target in the direction determined by the determining section.

7 Claims, 38 Drawing Sheets

(51) Int. Cl.
*G06F 3/0484* (2013.01)
*G06F 3/0485* (2013.01)
*G06F 3/0488* (2013.01)
*G06F 1/16* (2006.01)

(52) U.S. Cl.
CPC ...... *G06F 3/04845* (2013.01); *G06F 3/04847* (2013.01); *G06F 3/04883* (2013.01); *A63F 2300/1075* (2013.01); *A63F 2300/204* (2013.01); *A63F 2300/6045* (2013.01); *G06F 2200/1636* (2013.01); *G06F 2200/1637* (2013.01)

(56) References Cited

U.S. PATENT DOCUMENTS

| | | |
|---|---|---|
| 2009/0256809 A1 | 10/2009 | Minor |
| 2010/0149129 A1 | 6/2010 | Homma |
| 2011/0074716 A1 | 3/2011 | Ono |
| 2011/0161852 A1* | 6/2011 | Vainio et al. ....... G06F 3/04842 715/769 |
| 2012/0194421 A1* | 8/2012 | Son et al. ............. G06F 3/165 345/156 |
| 2012/0231884 A1 | 9/2012 | Sakai |

FOREIGN PATENT DOCUMENTS

| | | |
|---|---|---|
| JP | 2009187290 A | 8/2009 |
| JP | 2010140417 A | 6/2010 |
| JP | 2010146506 A | 7/2010 |
| JP | 2011076233 A | 4/2011 |
| WO | 2010126759 A1 | 11/2010 |
| WO | 2011018869 A1 | 2/2011 |

OTHER PUBLICATIONS

European Search Report for corresponding EP Application No. 12846303.1, dated May 7, 2015.

Erh-Li Early Shen et al: "Double-side multi-touch input for mobile devices". CHI 2009—Digital Life. New World: Conference Proceedings and Extended Abstracts; The 27th Annual CHI Conference on Human Factors in Computing Systems. pp. 4339-4344, Apr. 9, 2009.

International Preliminary Report on Patentability and Written Opinion for corresponding PCT/JP2012/004695, dated May 15, 2014.

* cited by examiner

FIG.5

| OPERATION TARGET | OPERATION | DIRECTION |
|---|---|---|
| HOMEPAGE | SCROLL | SAME |
| ROTATING DRUM | SCROLL | OPPOSITE |
| THREE-DIMENSIONAL OBJECT | ROTATION | OPPOSITE |
| CIRCULAR LIST | SCROLL | OPPOSITE |
| ⋮ | ⋮ | ⋮ |

FIG. 6
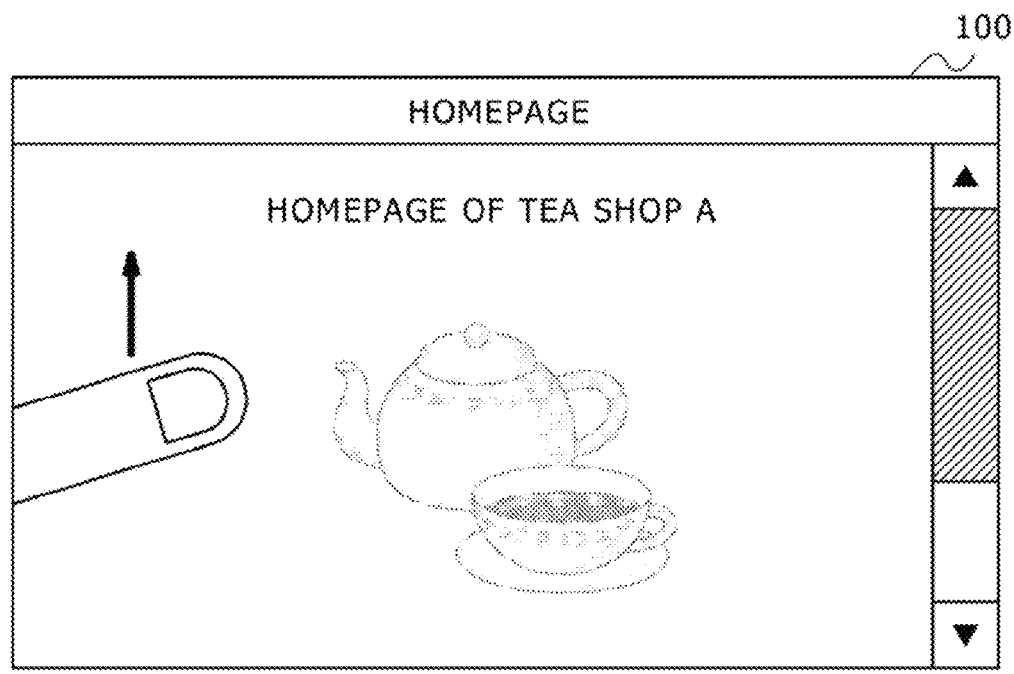
(a)
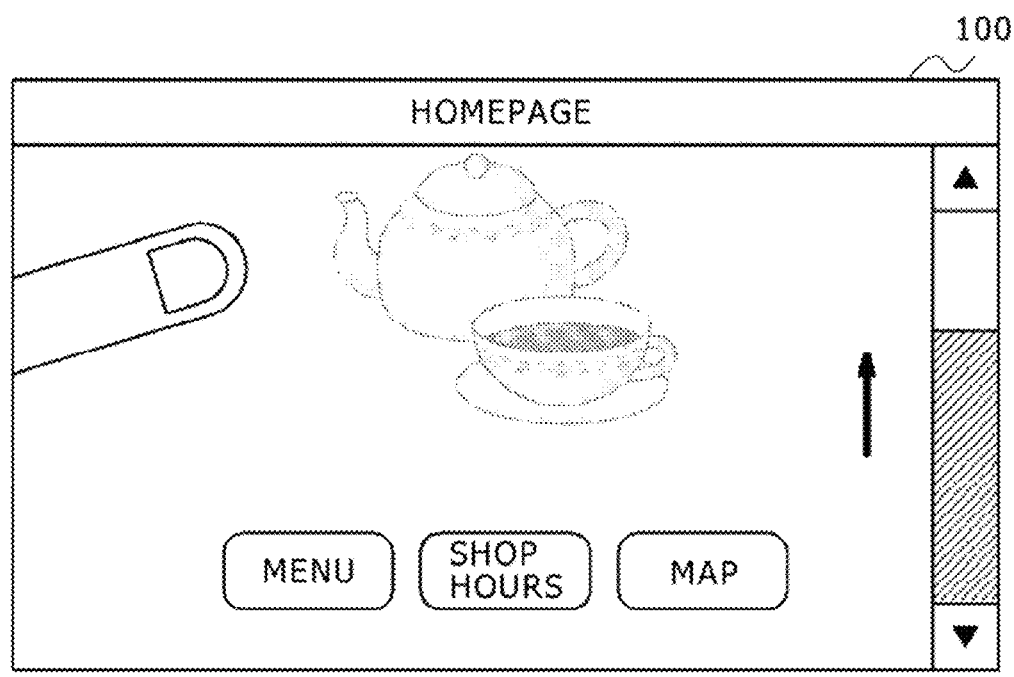
(b)

FIG.7
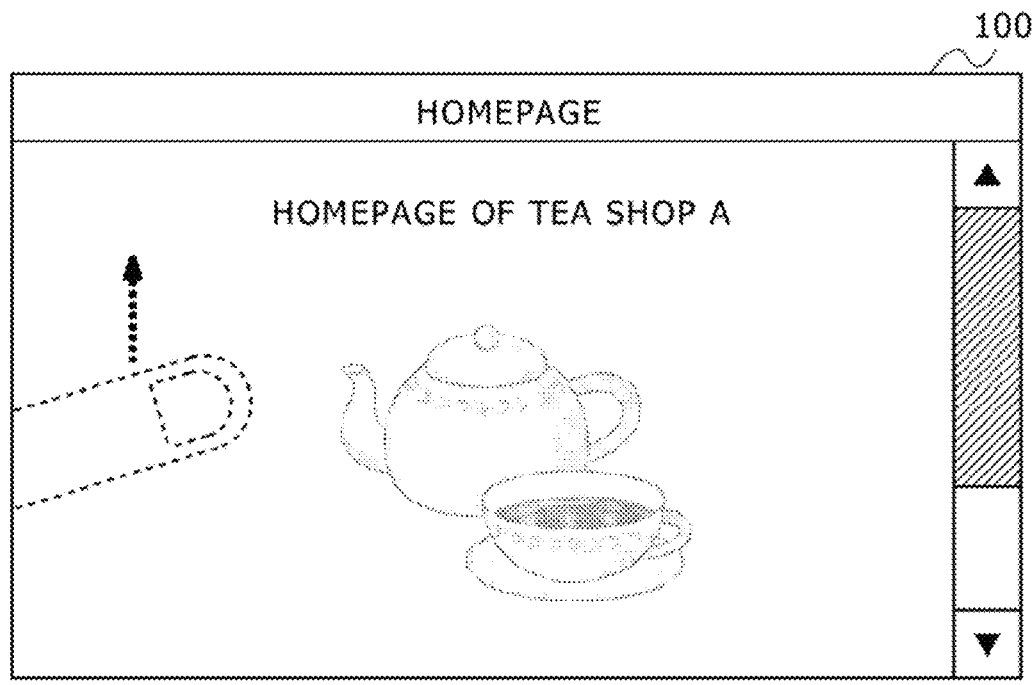
(a)
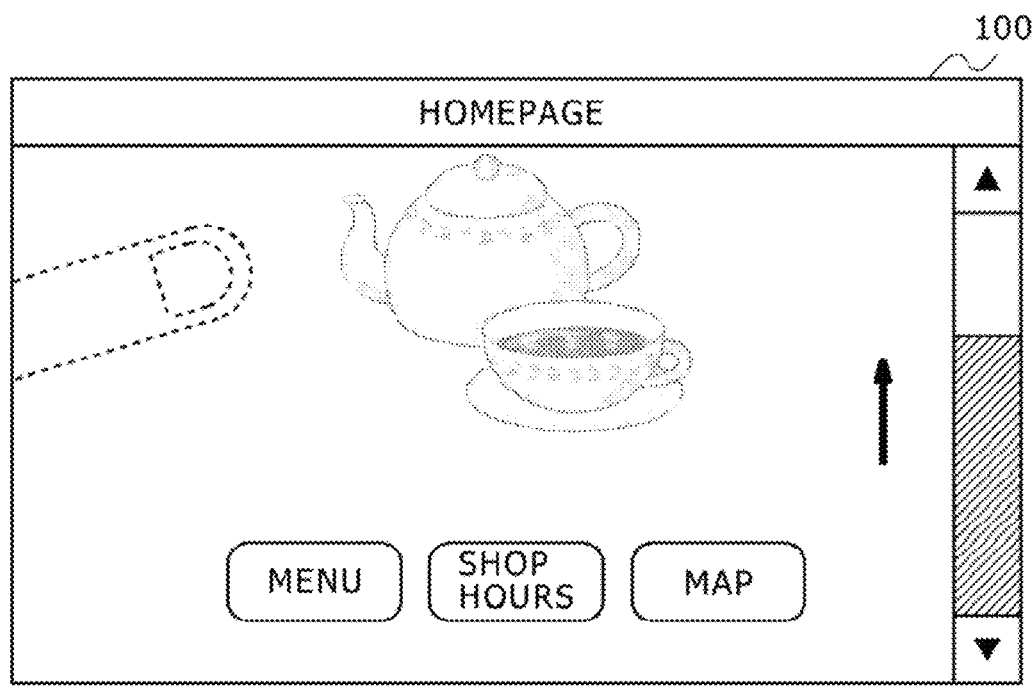
(b)

FIG.8
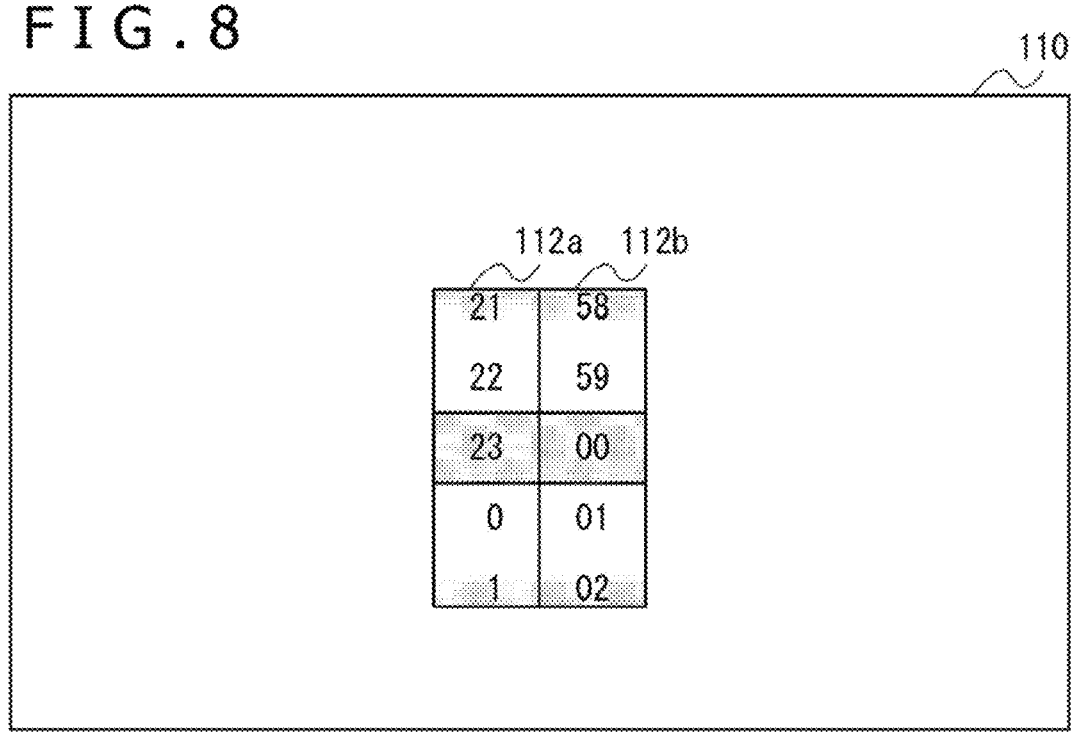
(a)
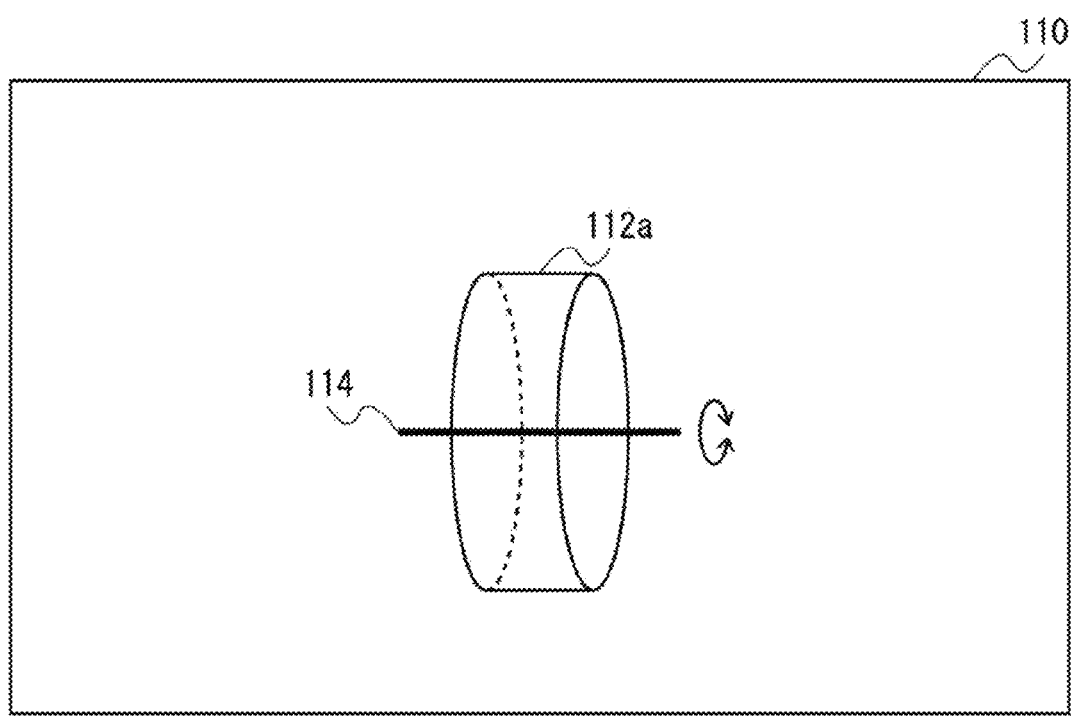
(b)

FIG. 9
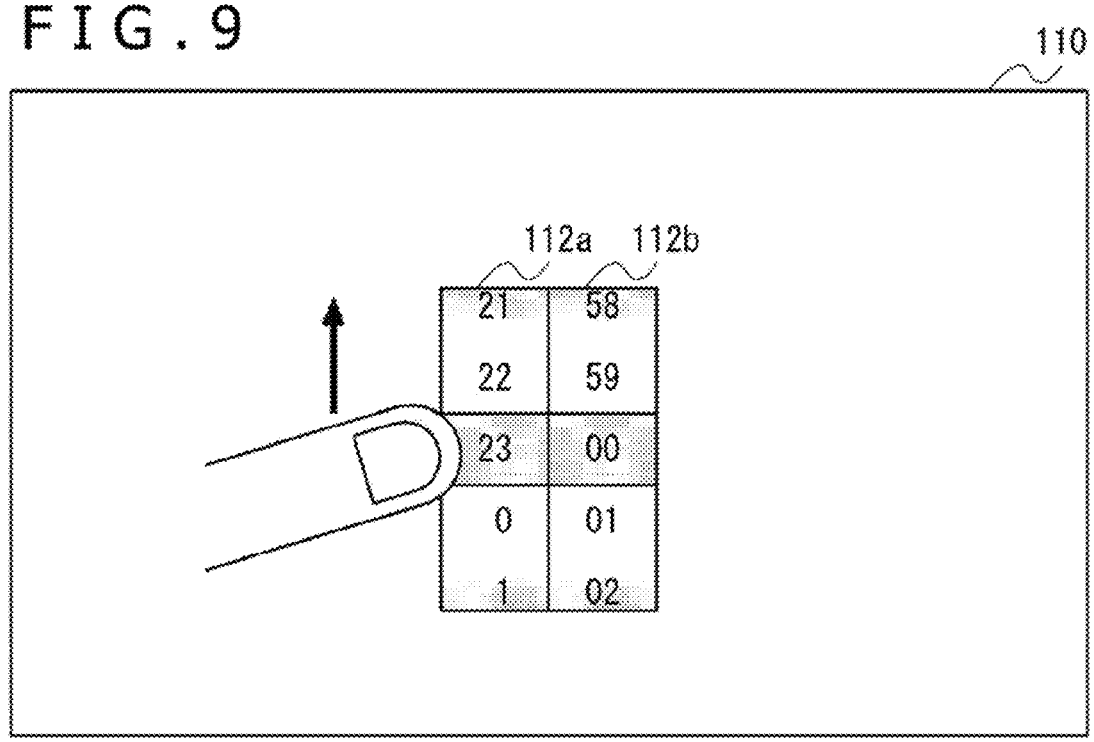
(a)
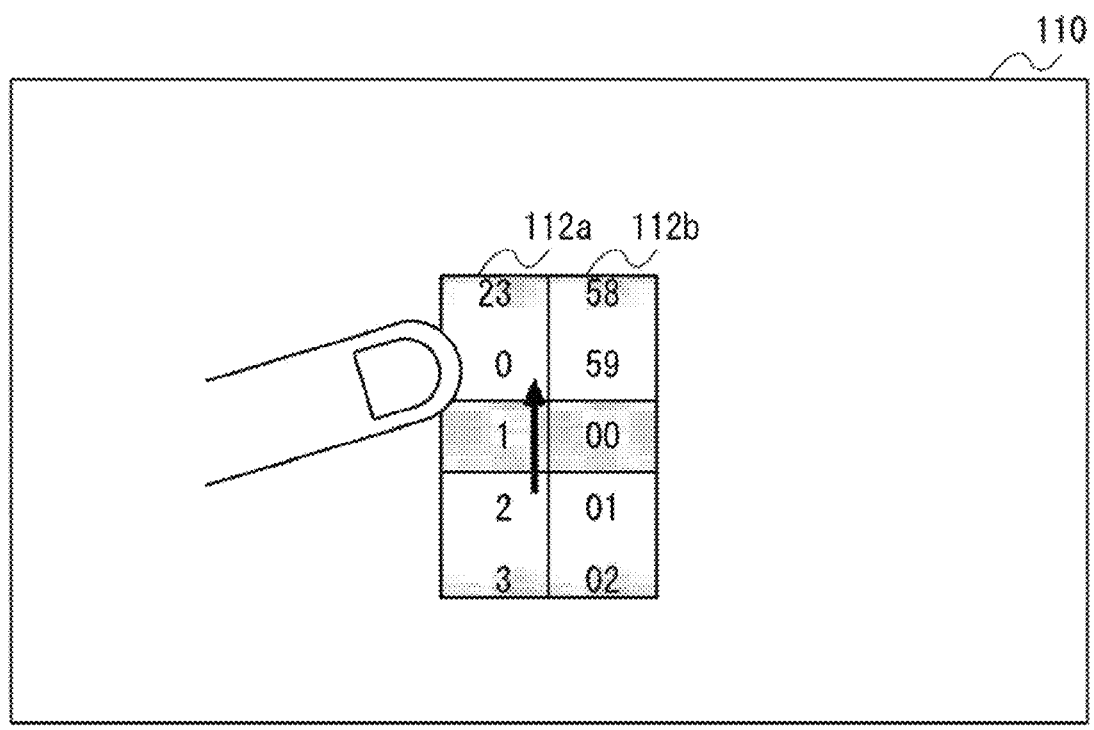
(b)

FIG. 10
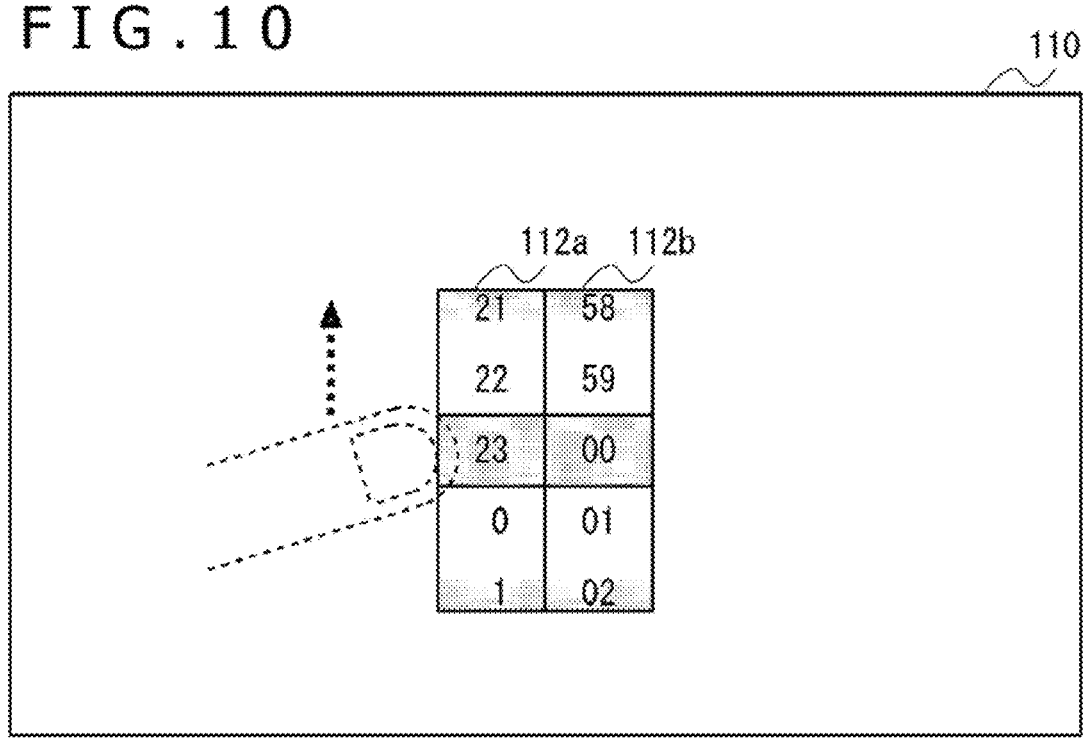
(a)
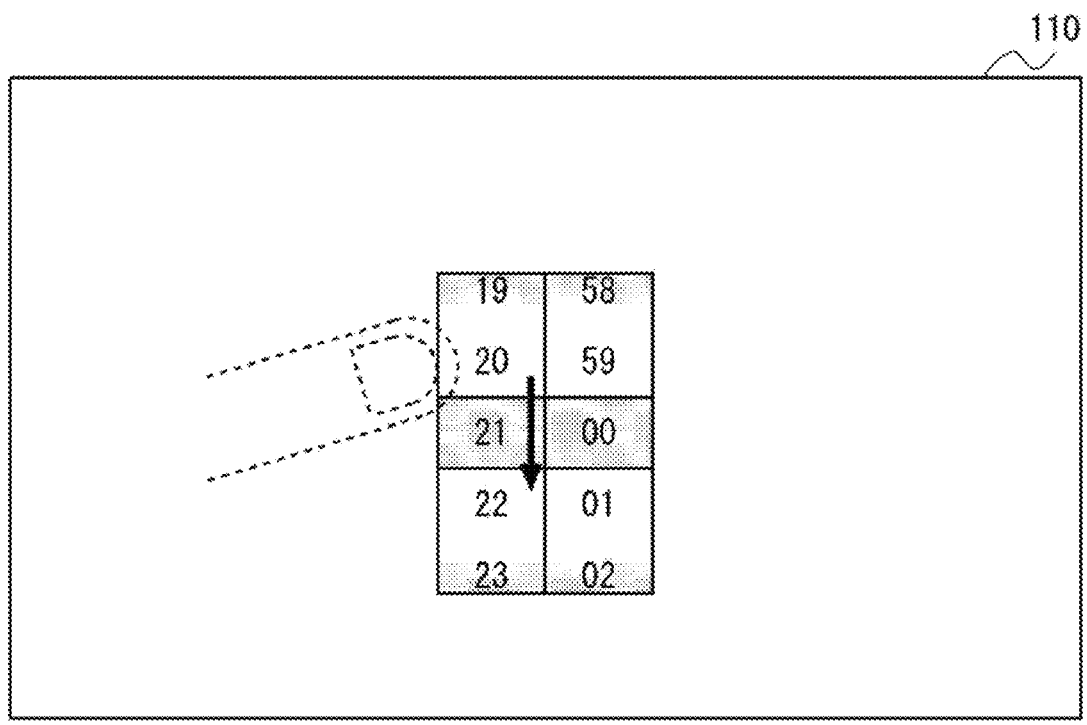
(b)

FIG.11
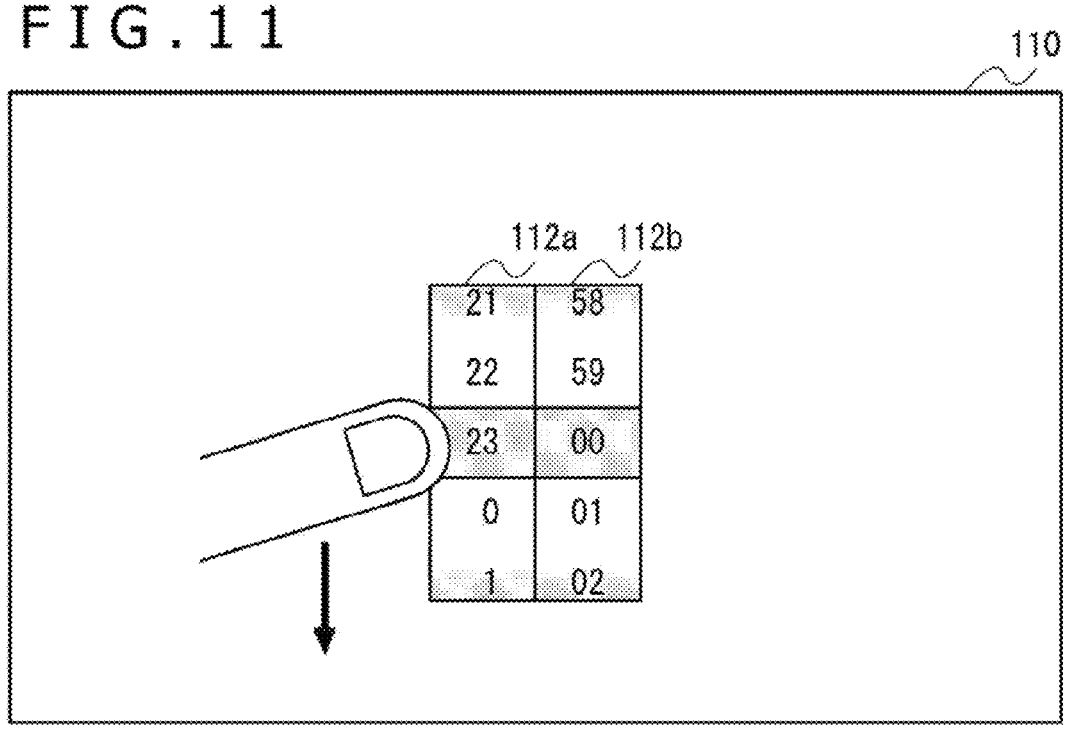
(a)
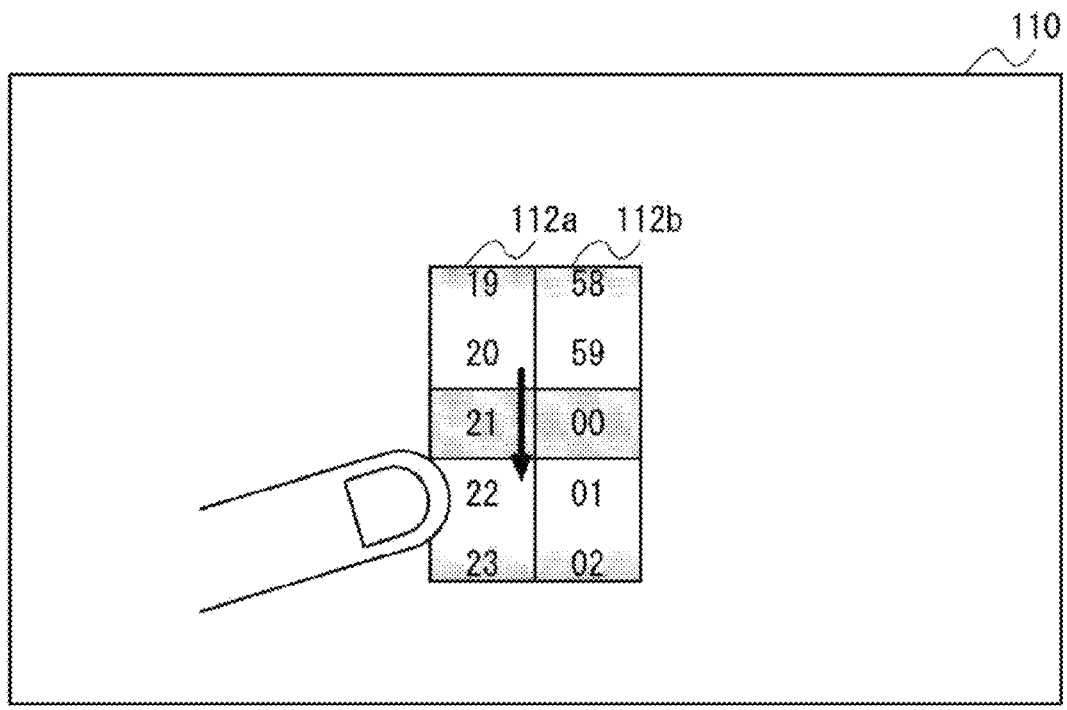
(b)

FIG.12
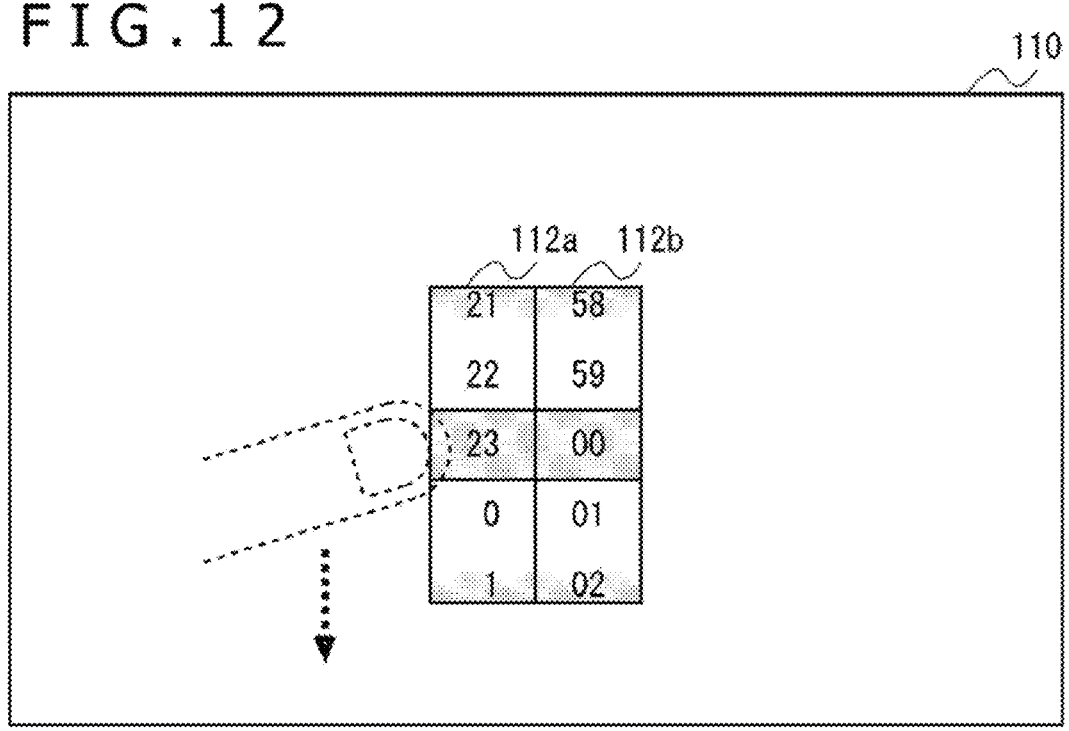
(a)
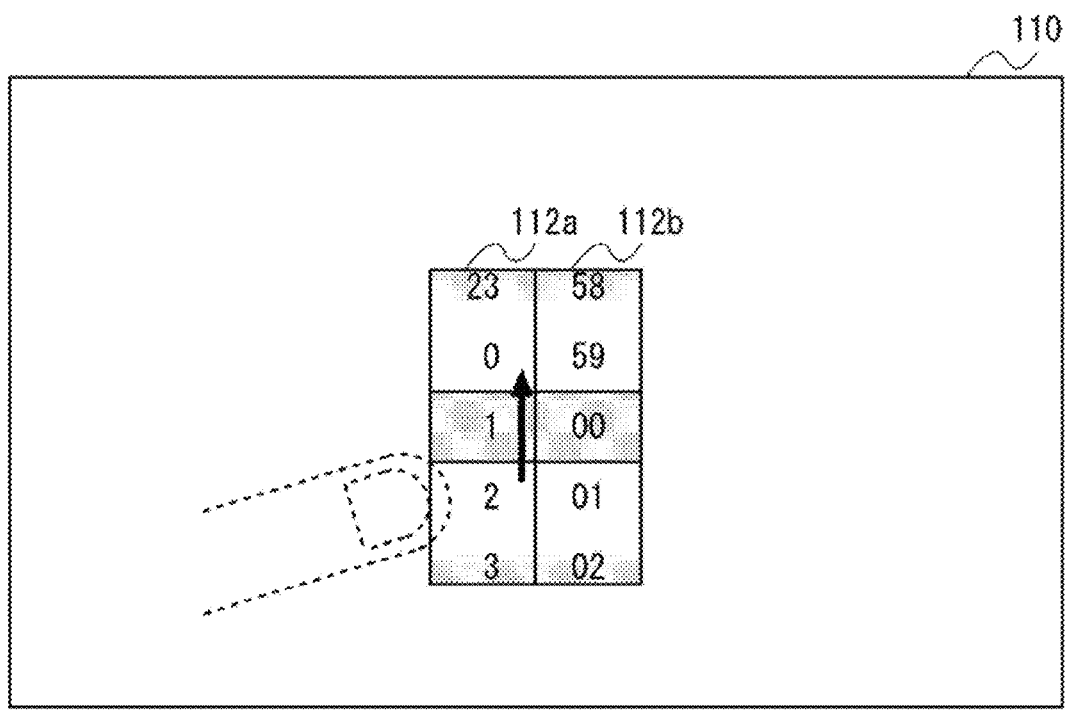
(b)

FIG. 13
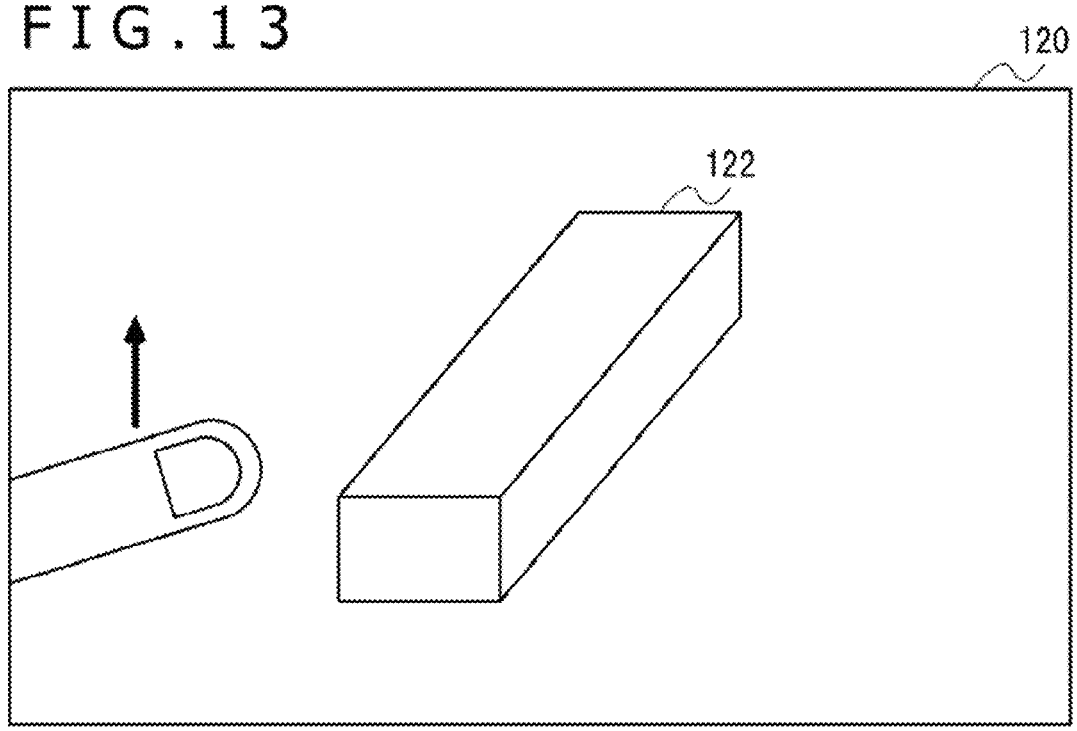
(a)
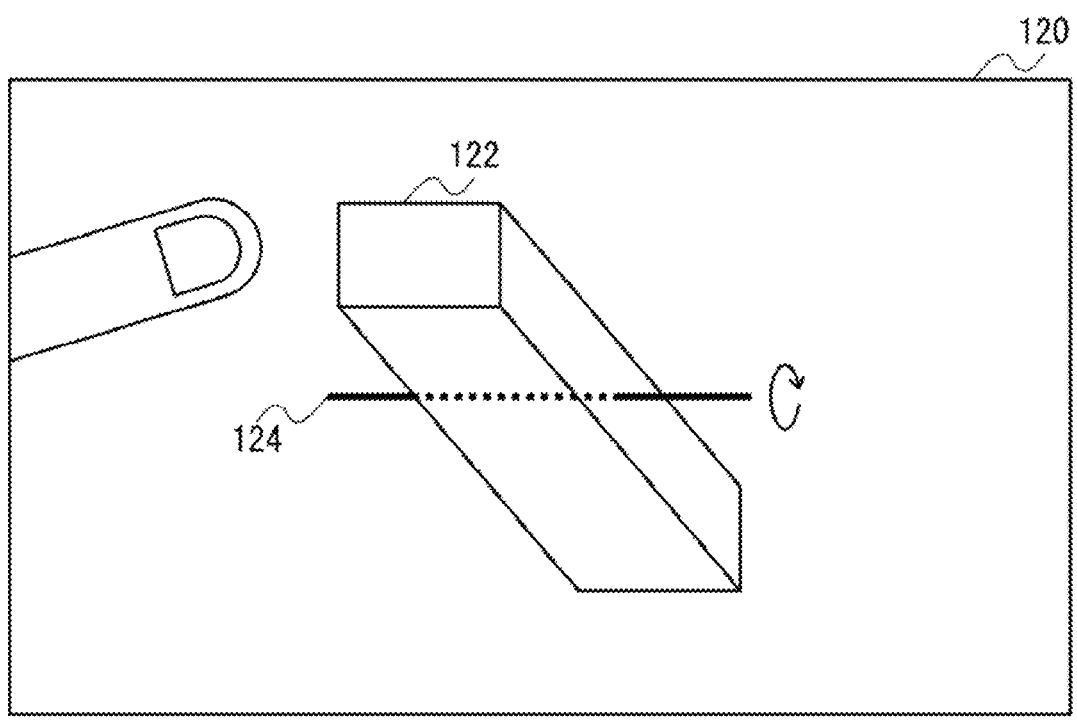
(b)

FIG. 14
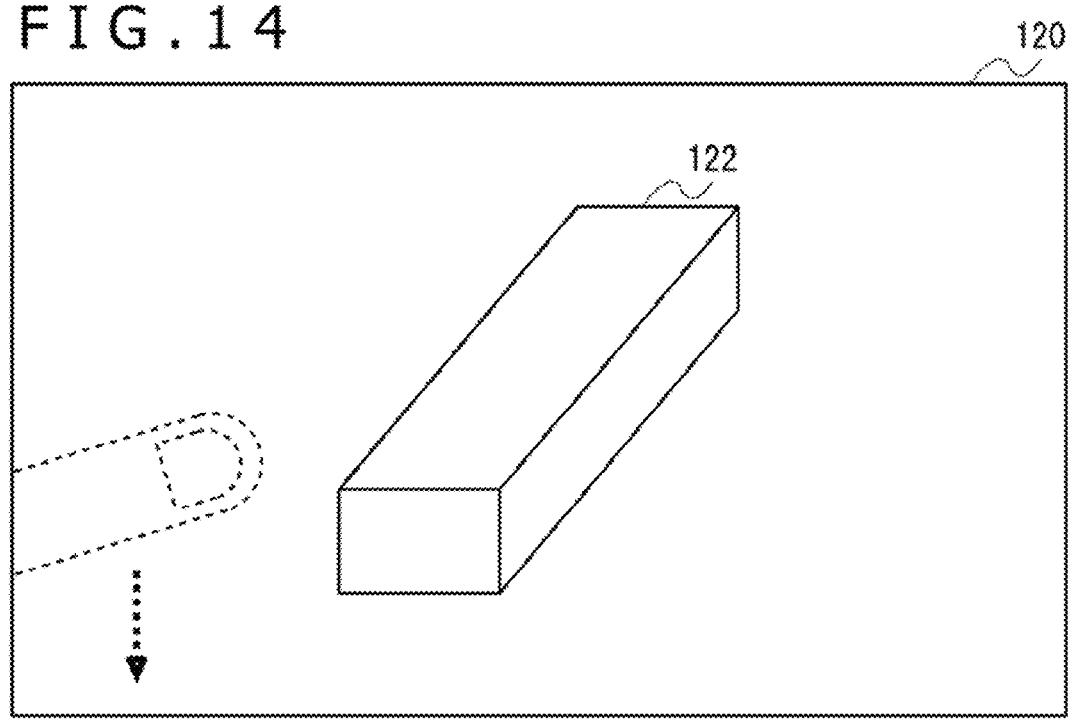
(a)
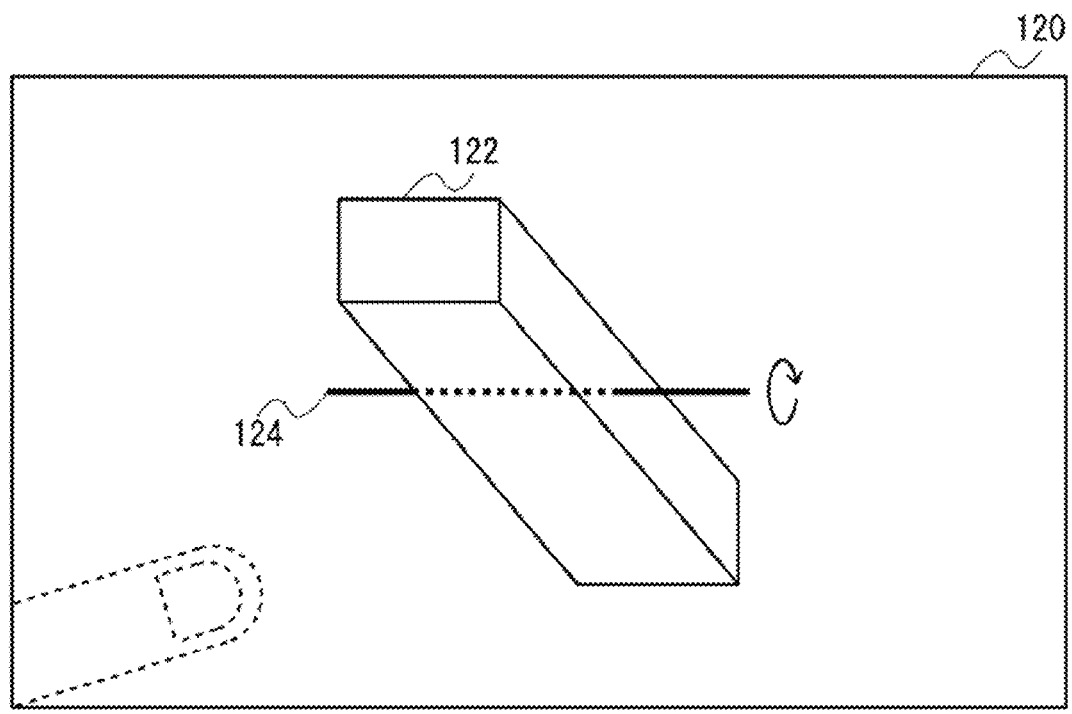
(b)

FIG.15
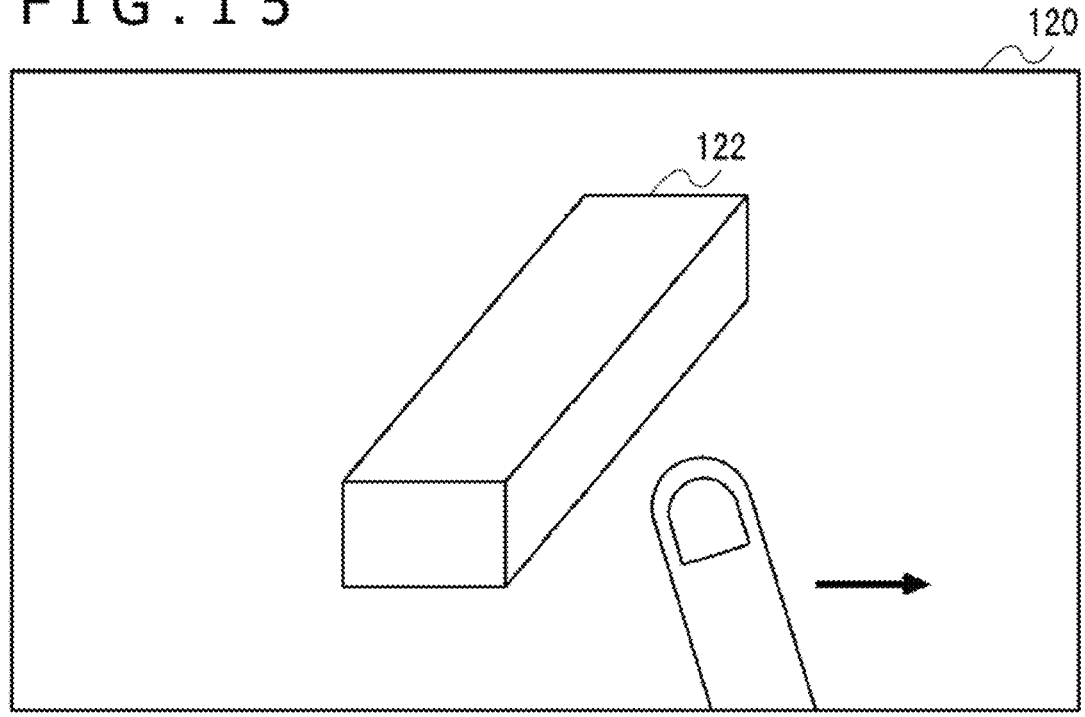
(a)
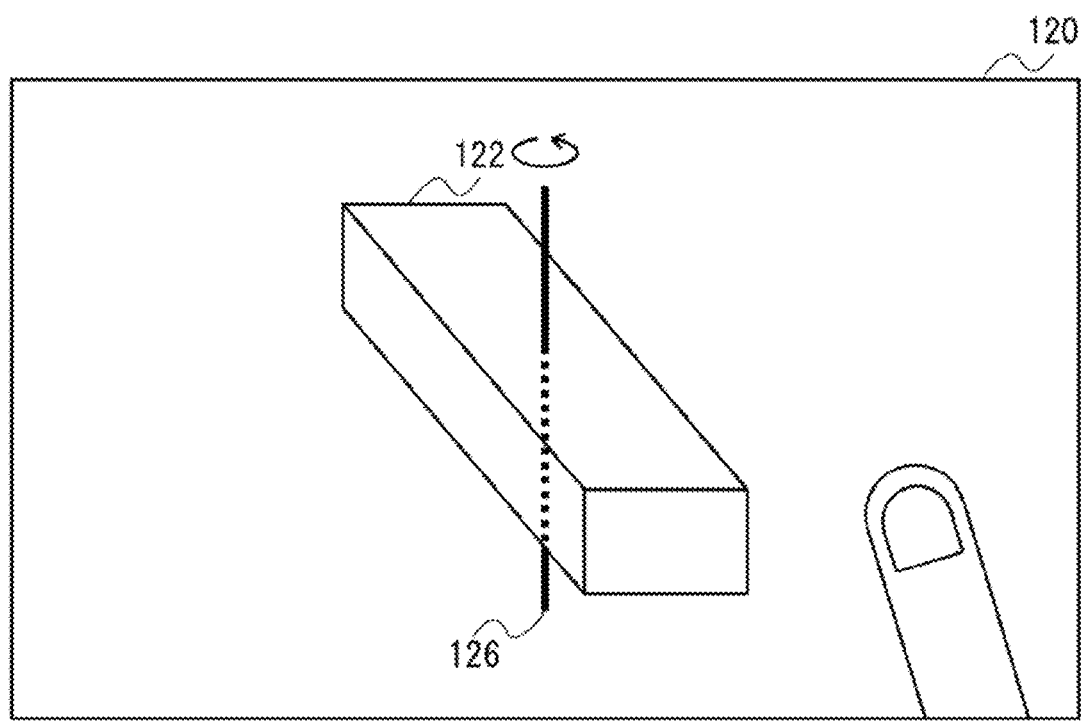
(b)

FIG. 16
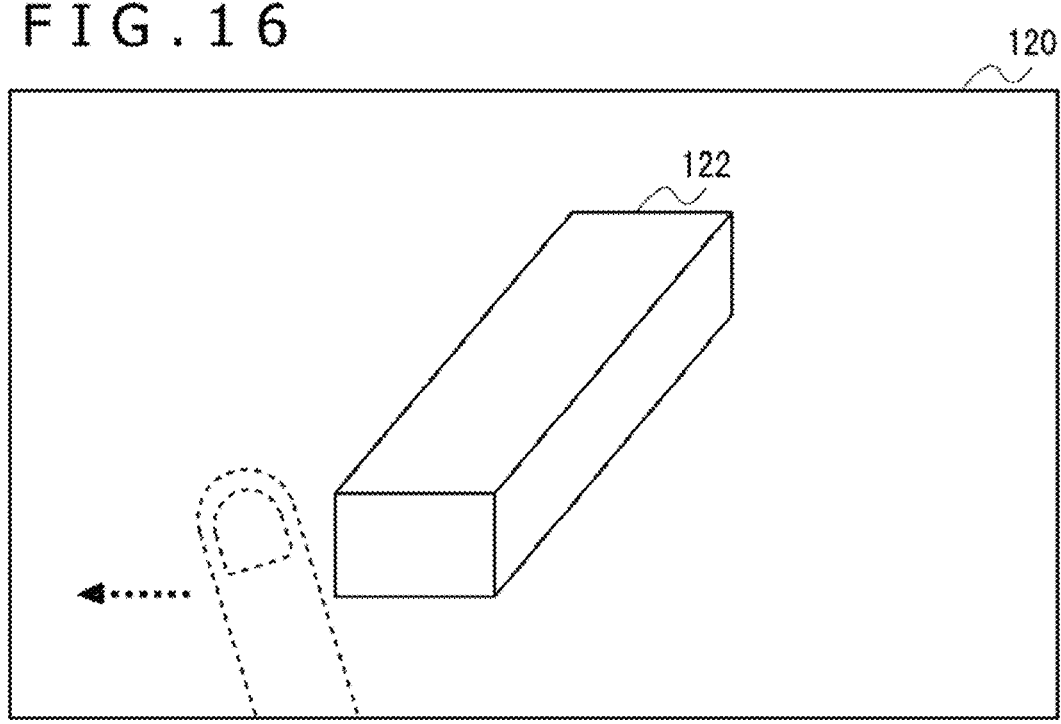
(a)
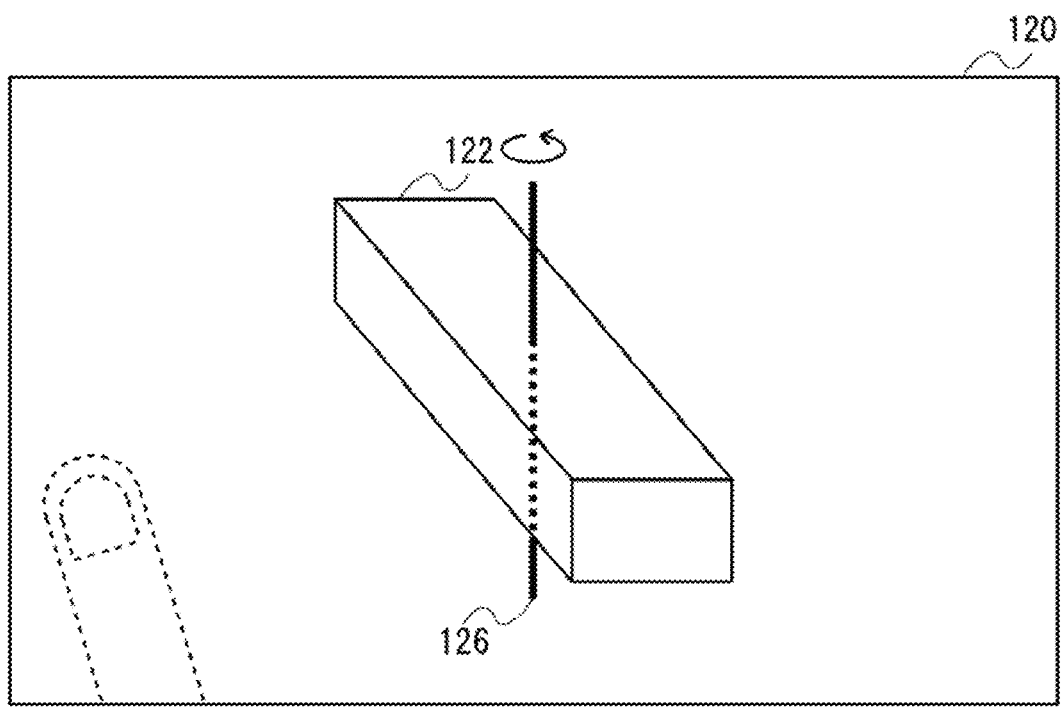
(b)

FIG.17
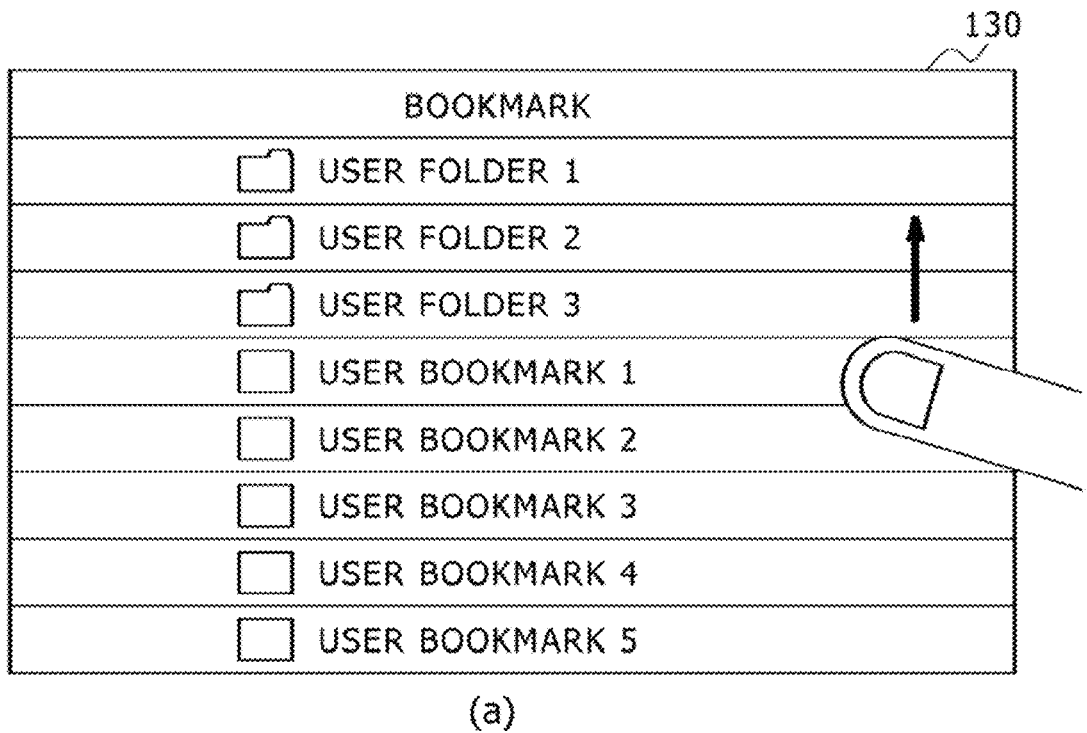
(a)
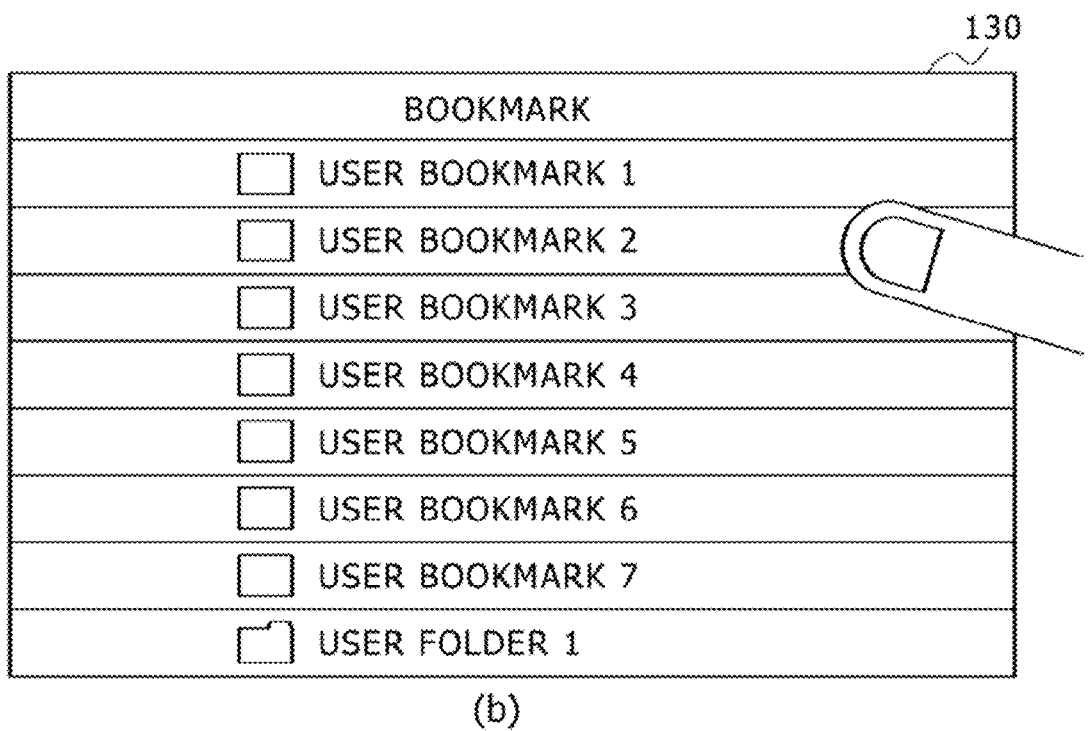
(b)

FIG.18
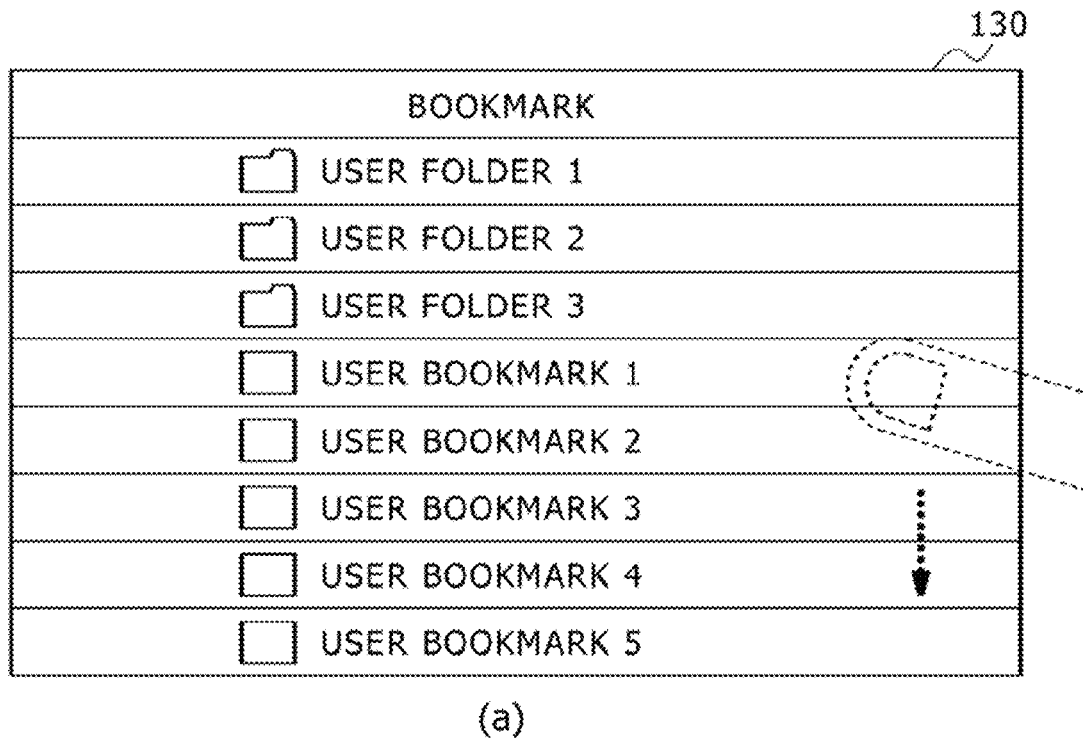
(a)
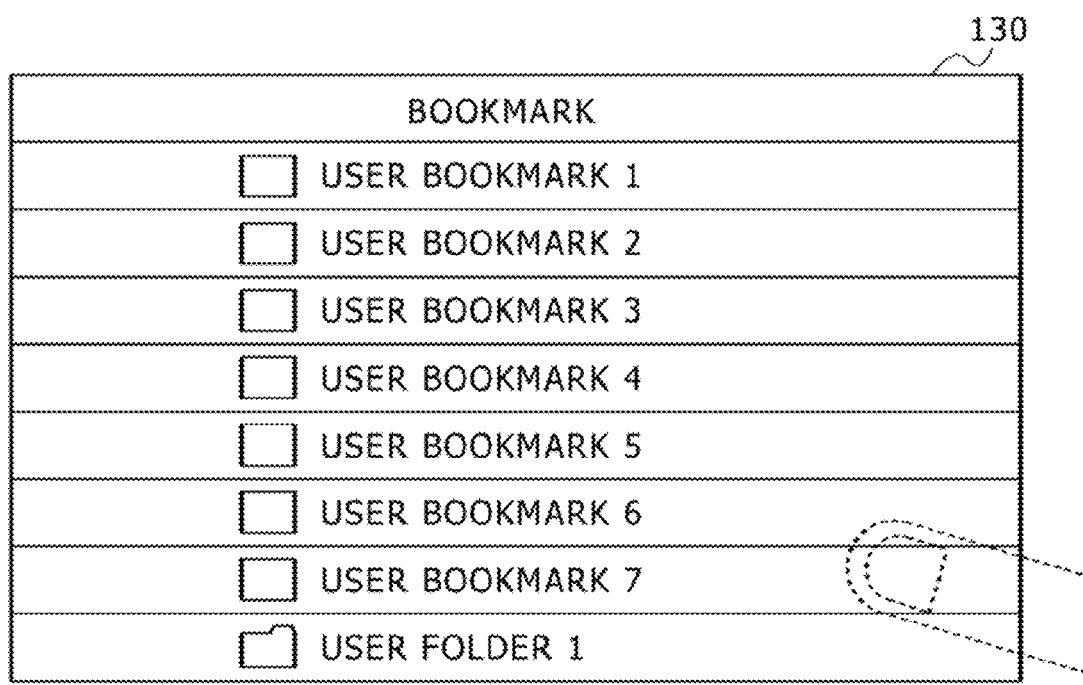
(b)

FIG.19
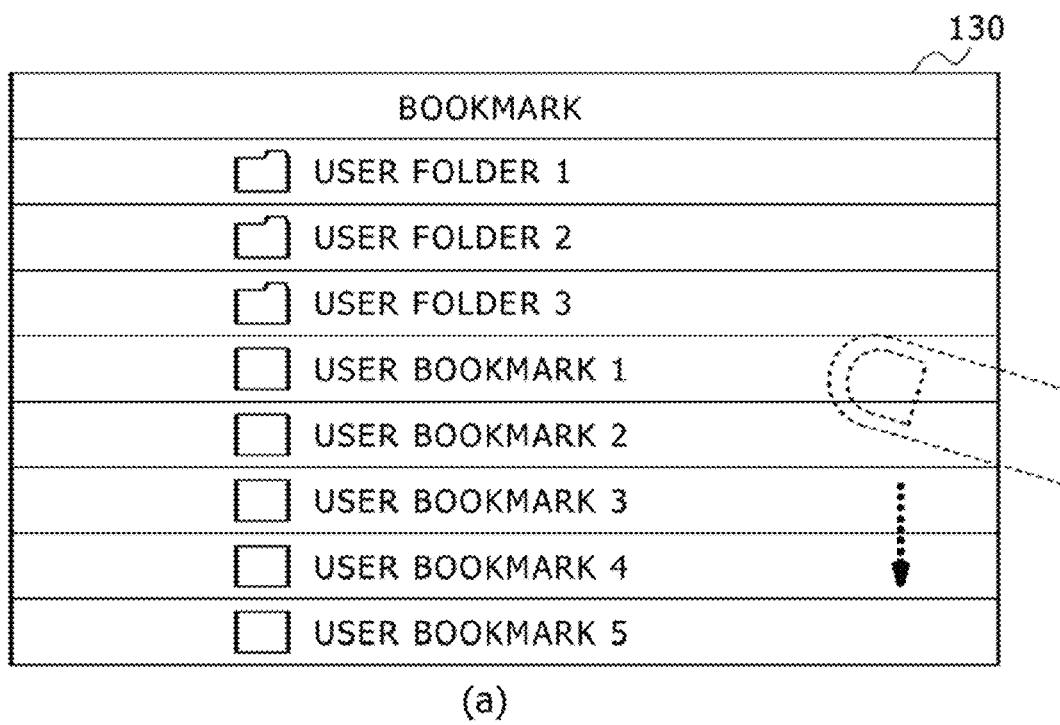
(a)
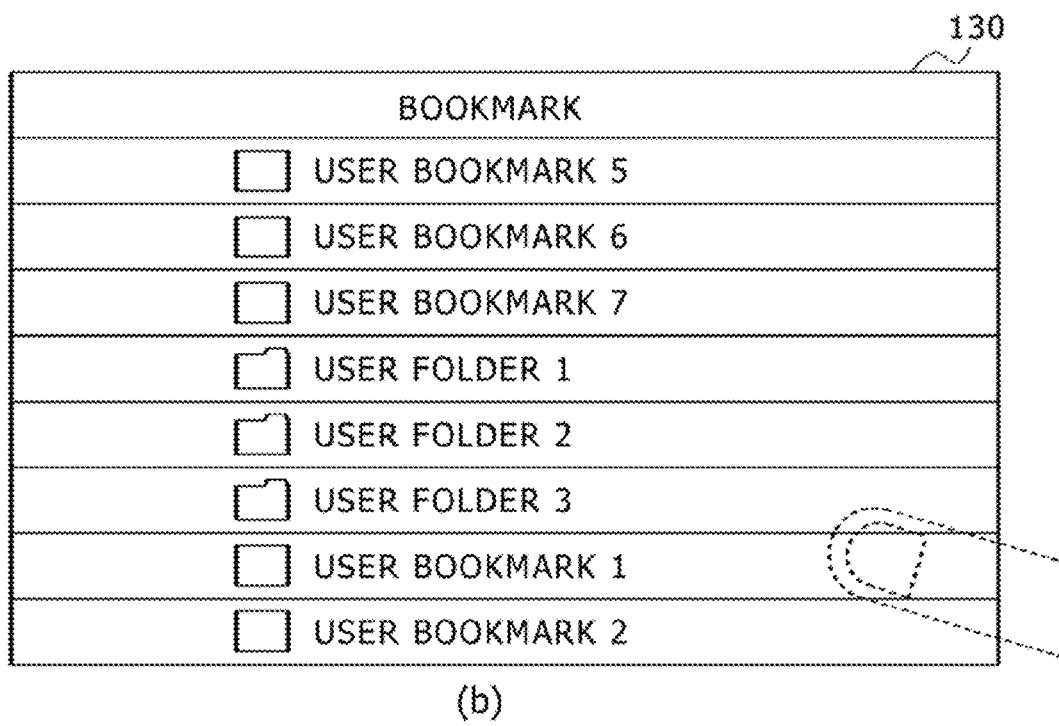
(b)

FIG.22
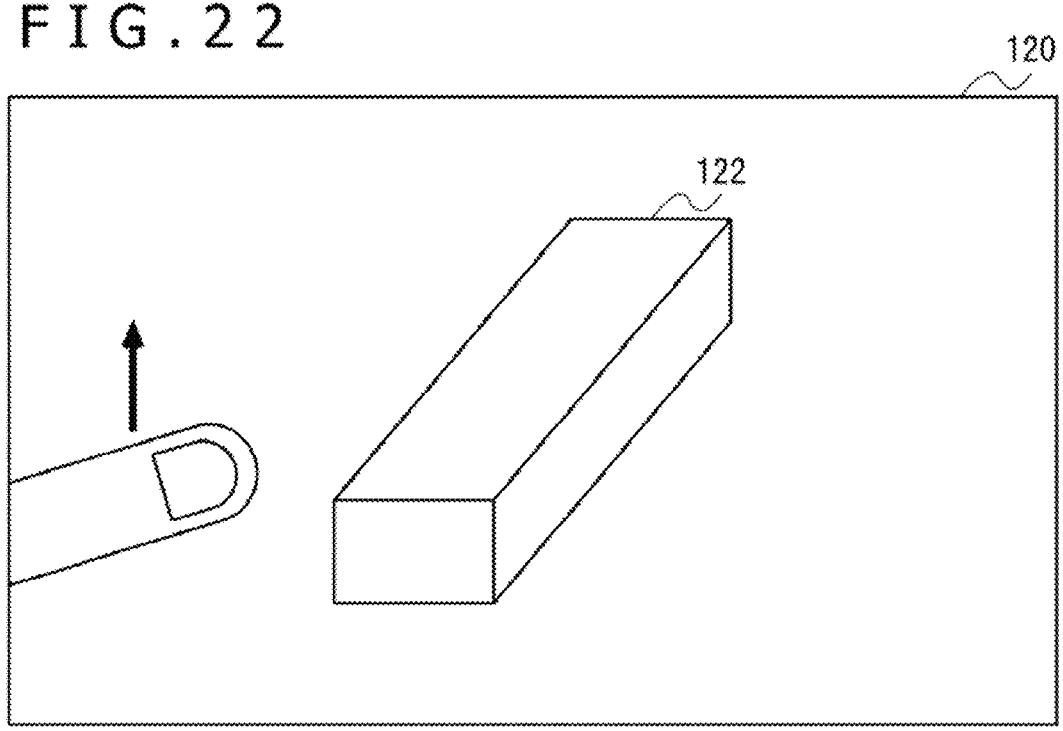
(a)
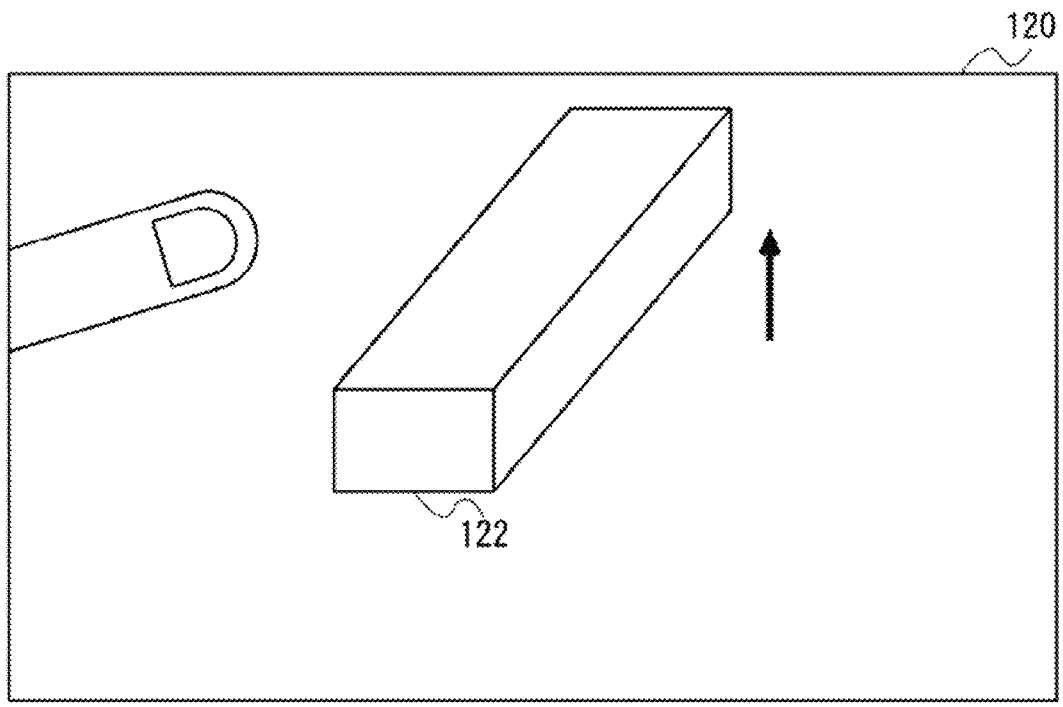
(b)

FIG.23
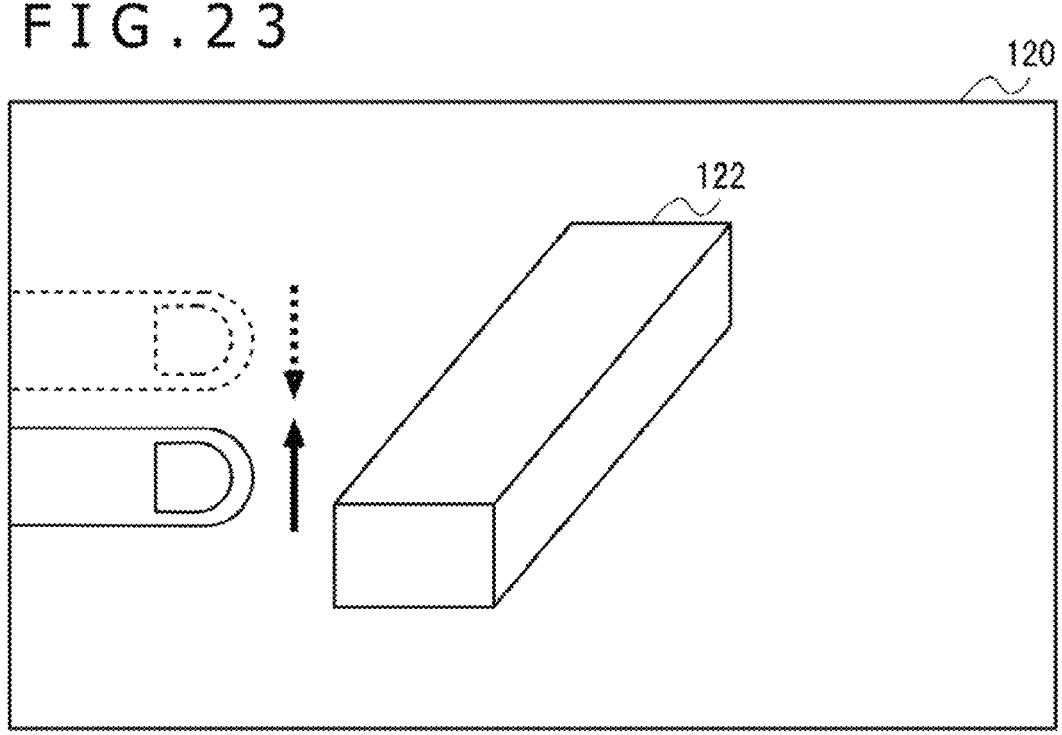
(a)
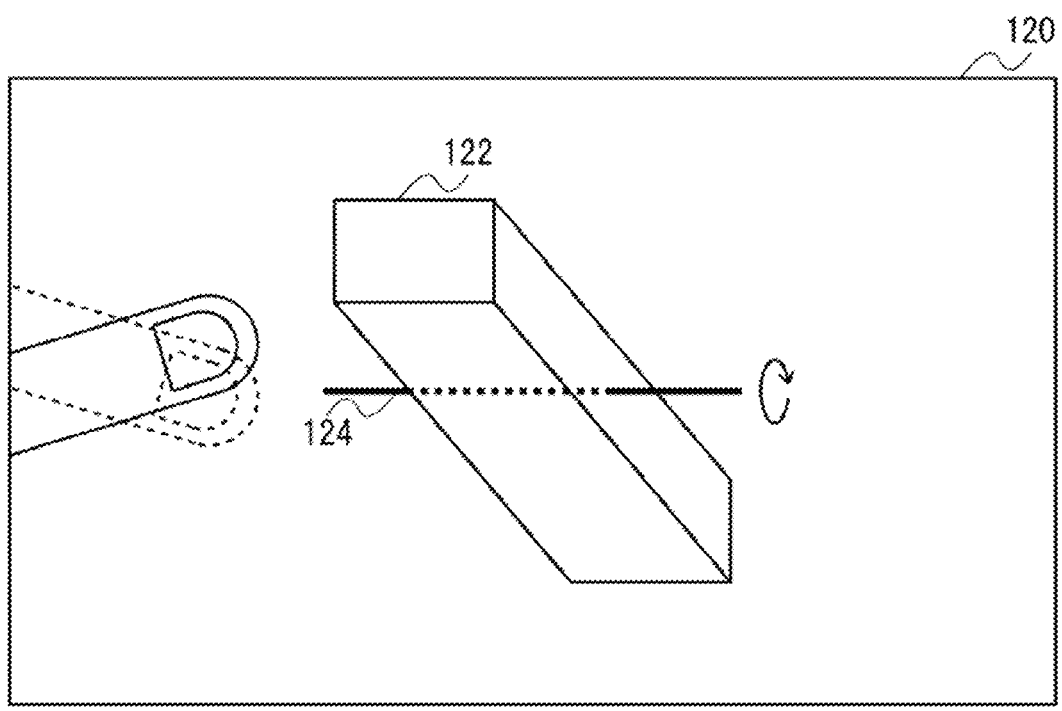
(b)

FIG. 24
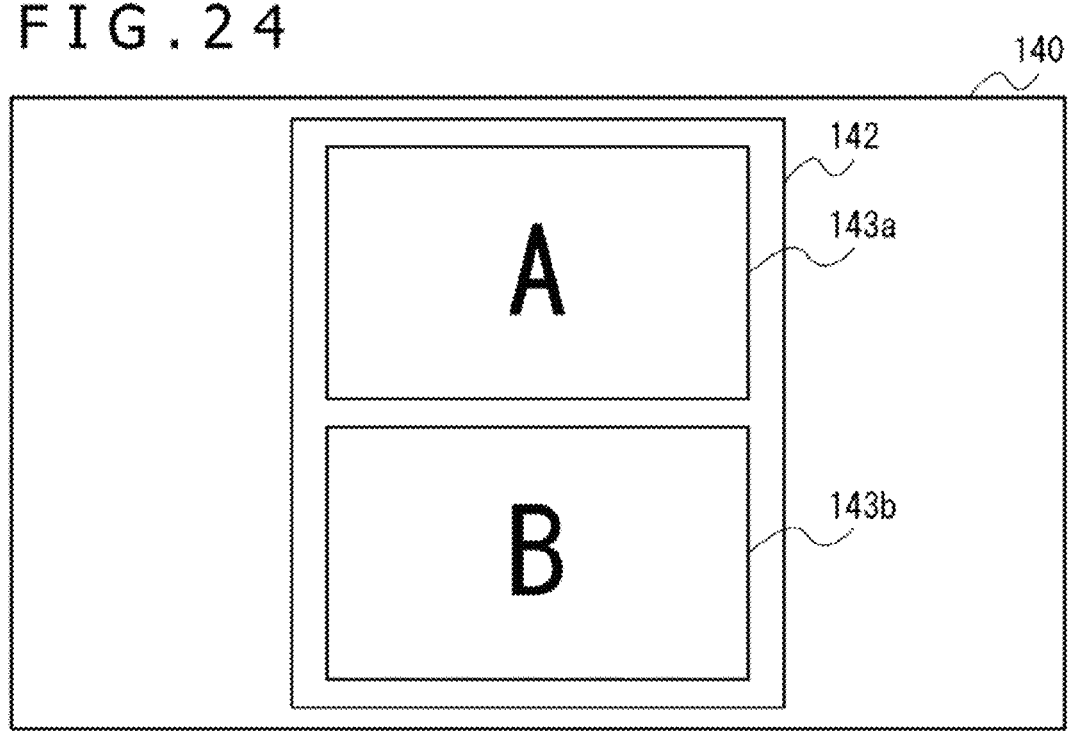
(a)
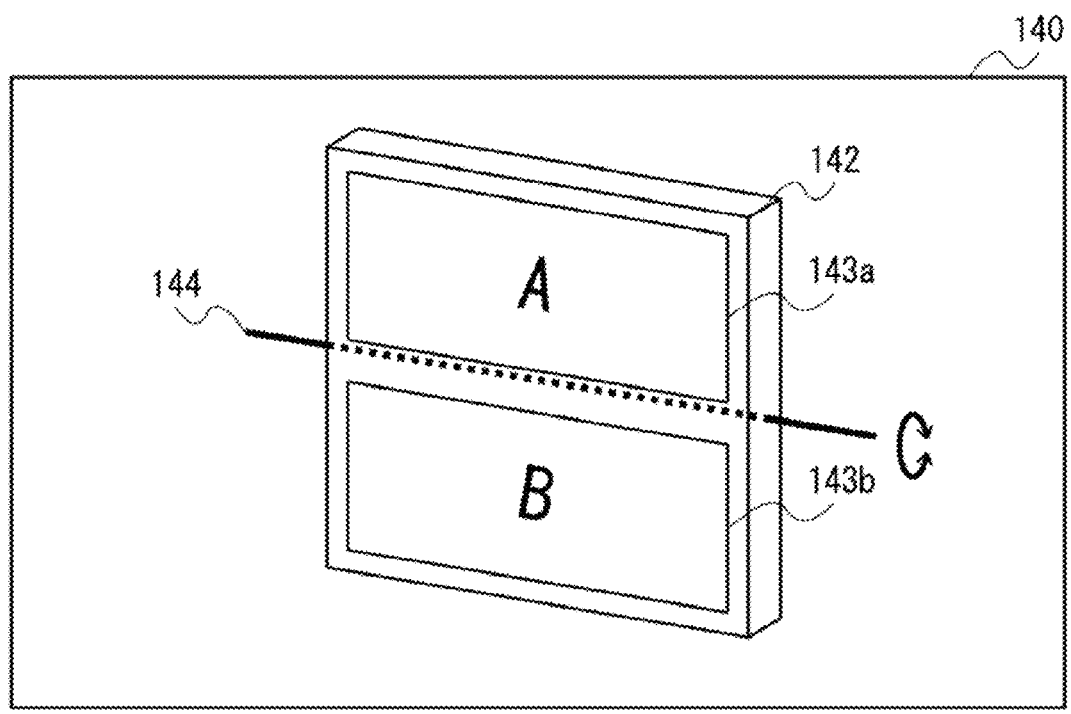
(b)

FIG. 25
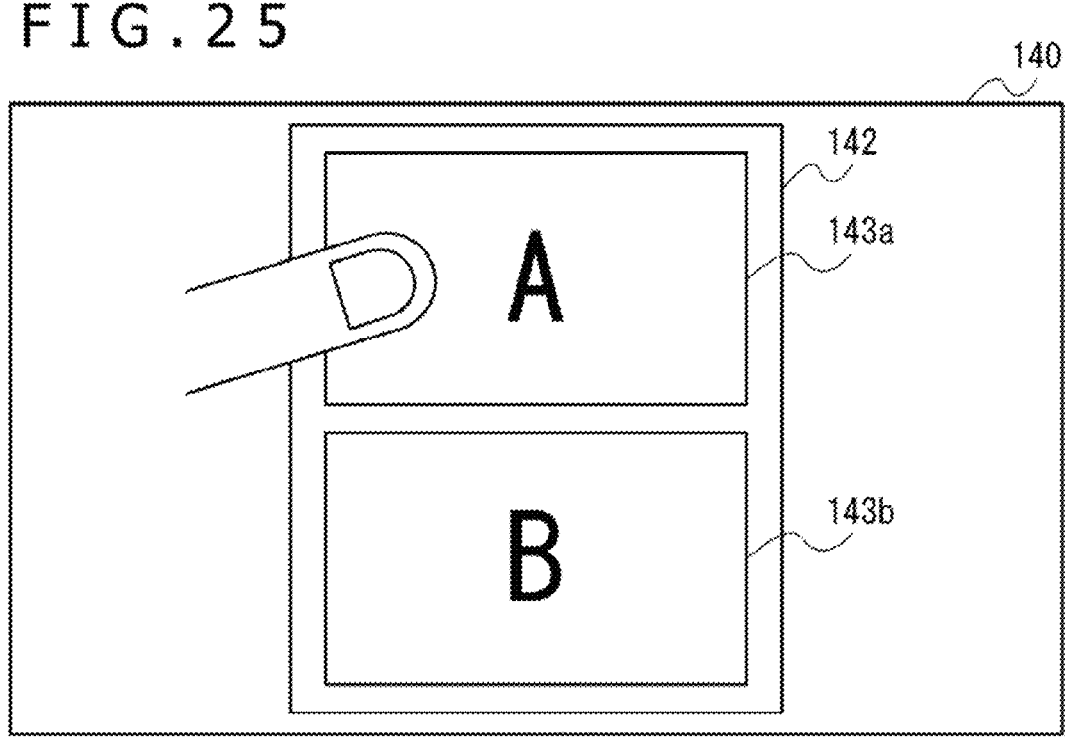
(a)
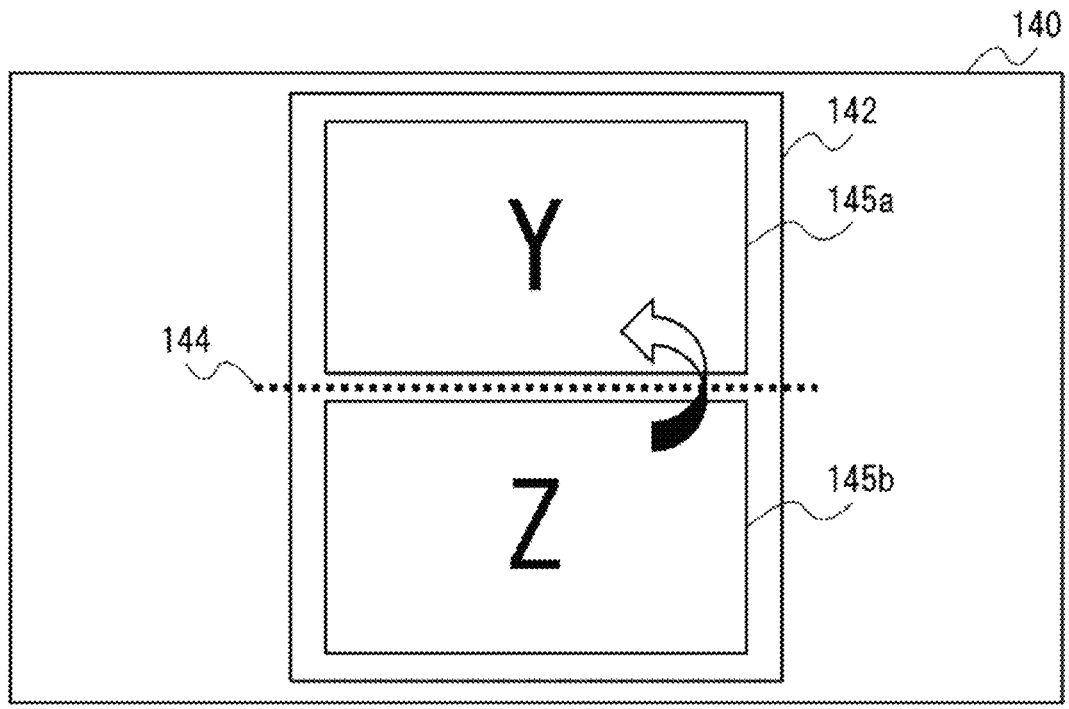
(b)

FIG.26
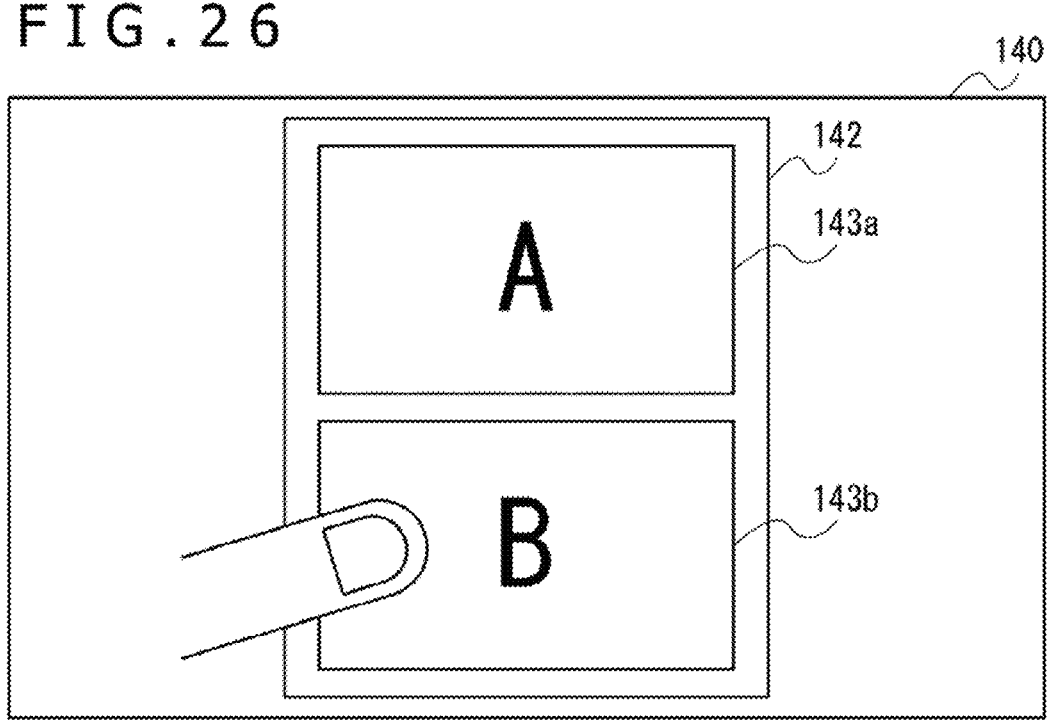
(a)
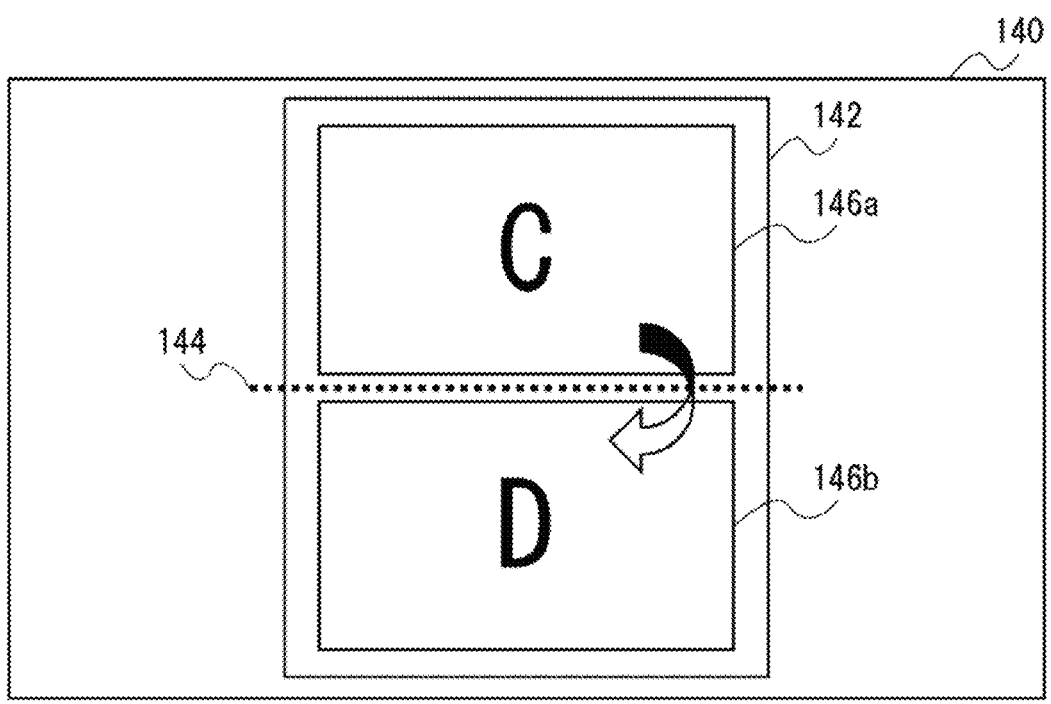
(b)

FIG.27
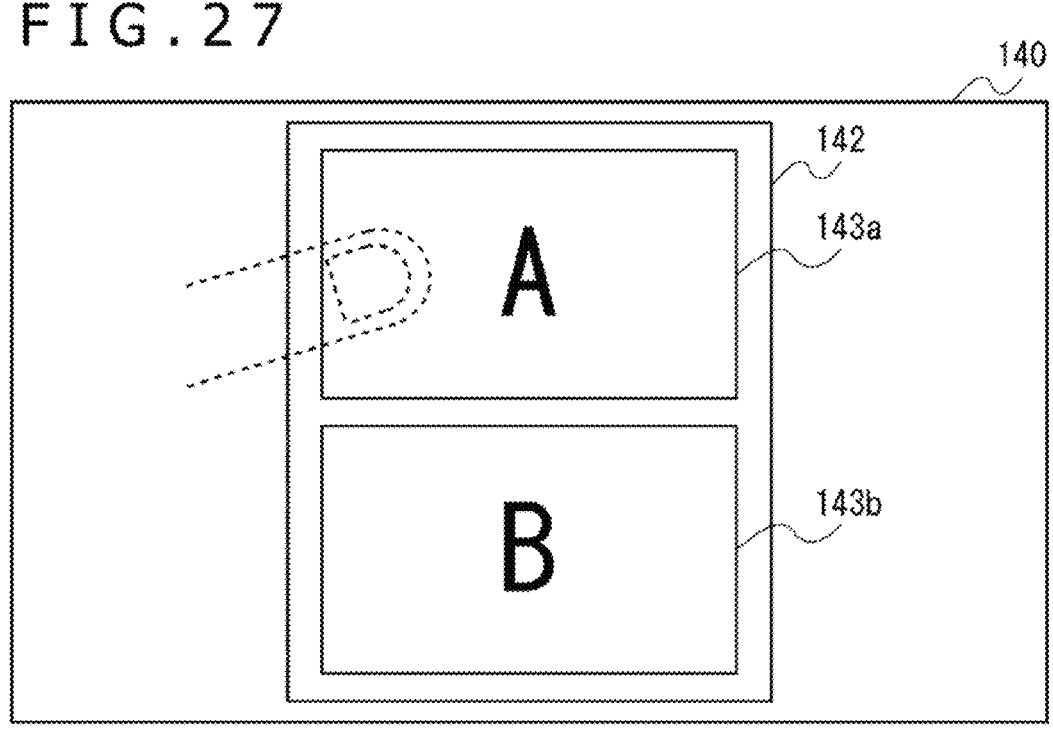
(a)
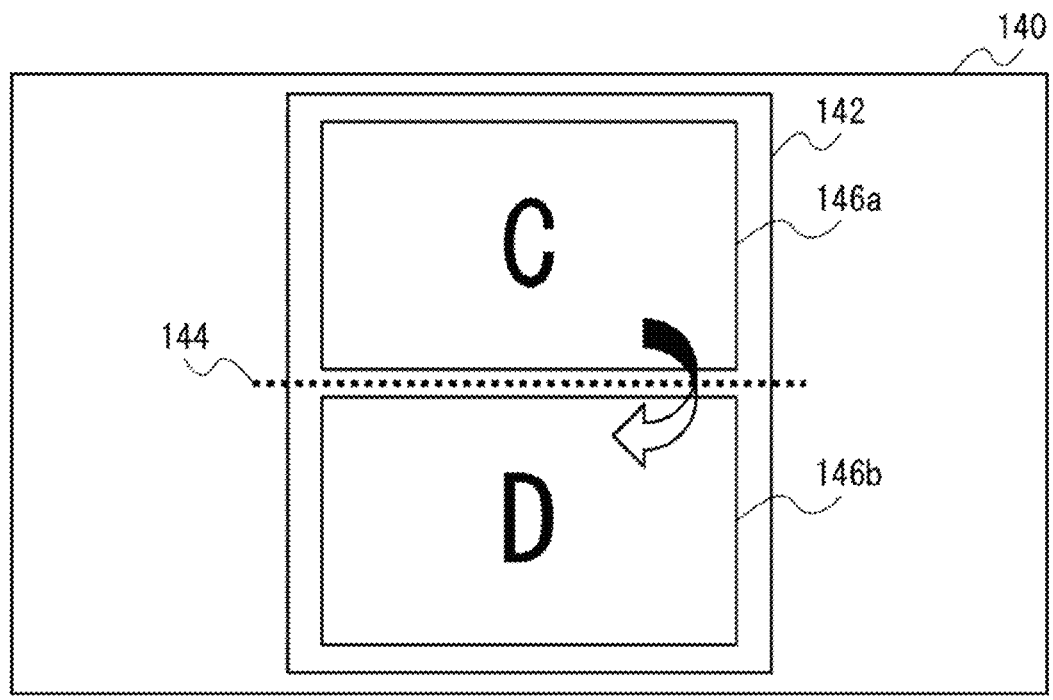
(b)

FIG. 28
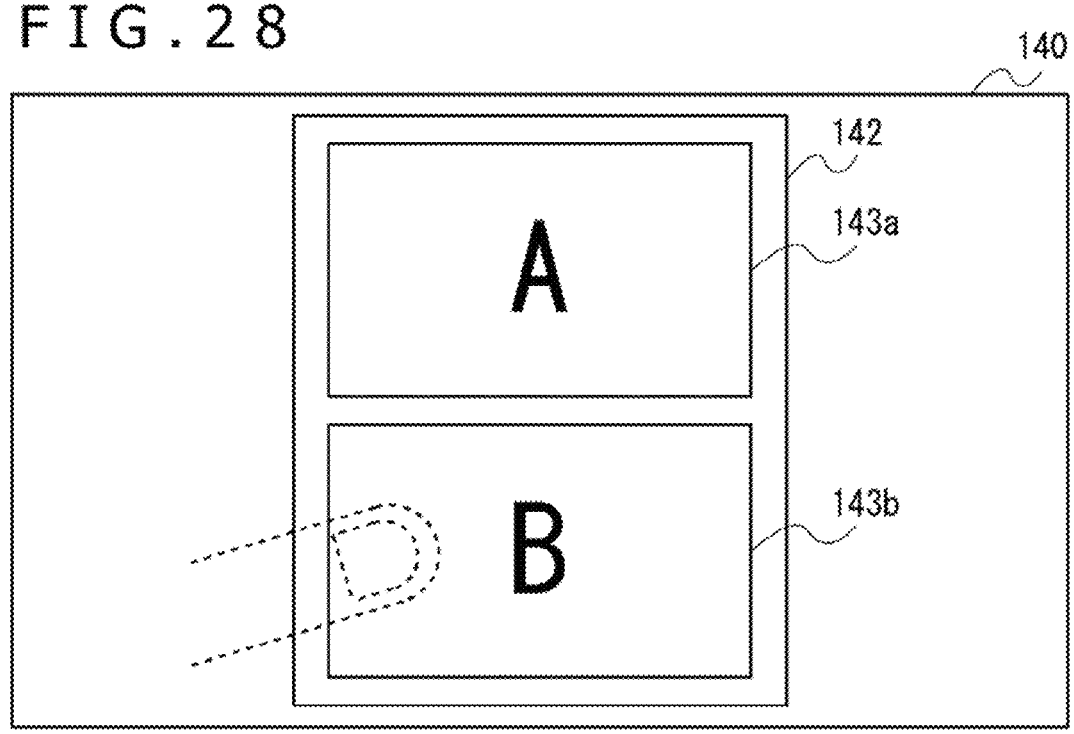
(a)
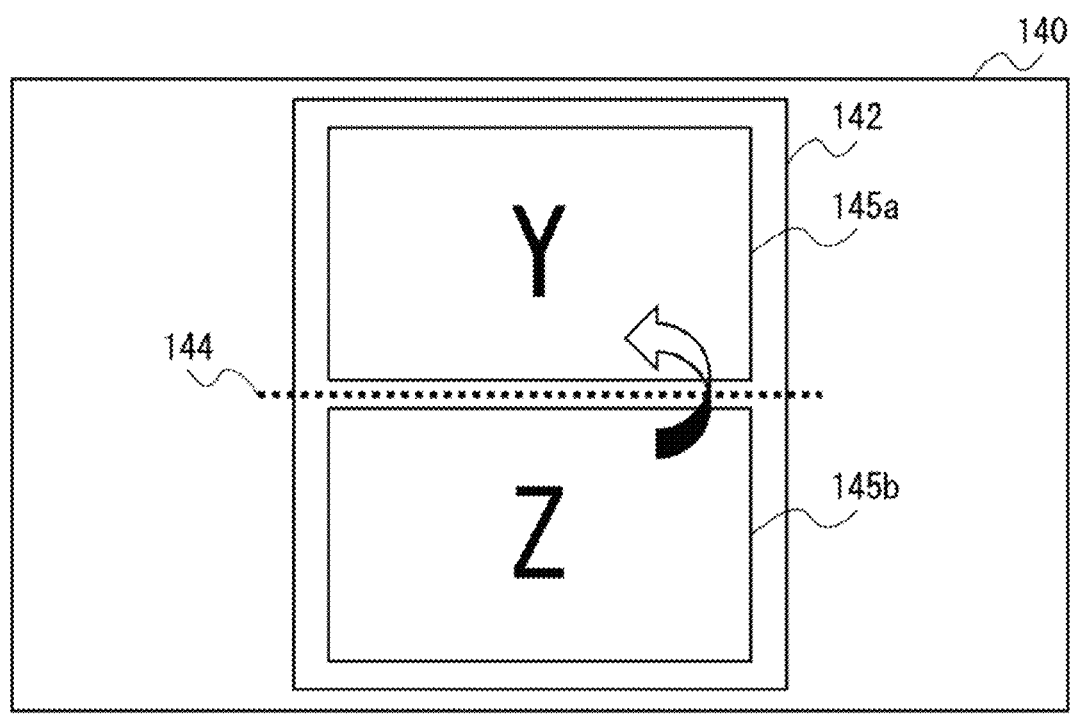
(b)

FIG.29
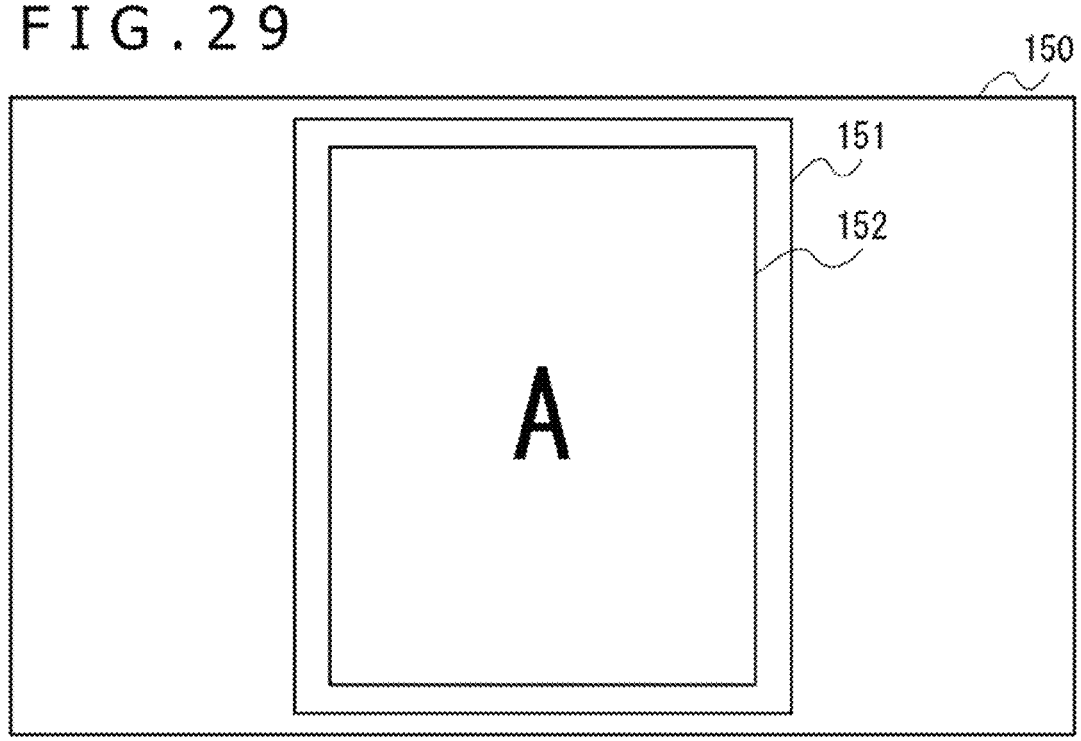
(a)
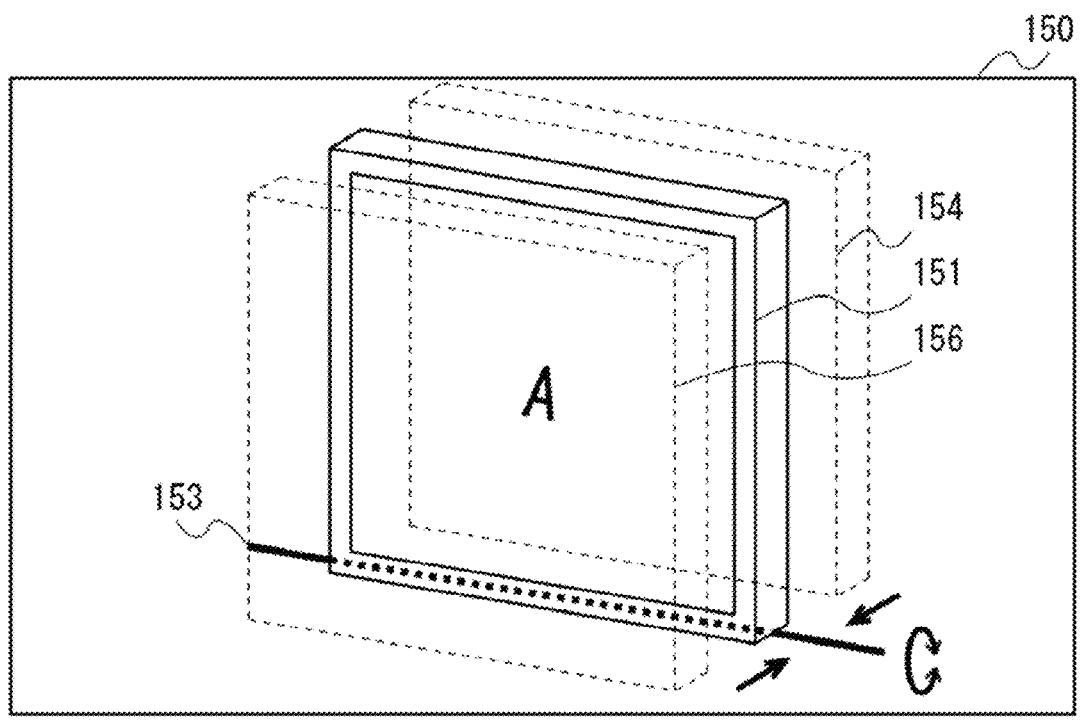
(b)

FIG. 30
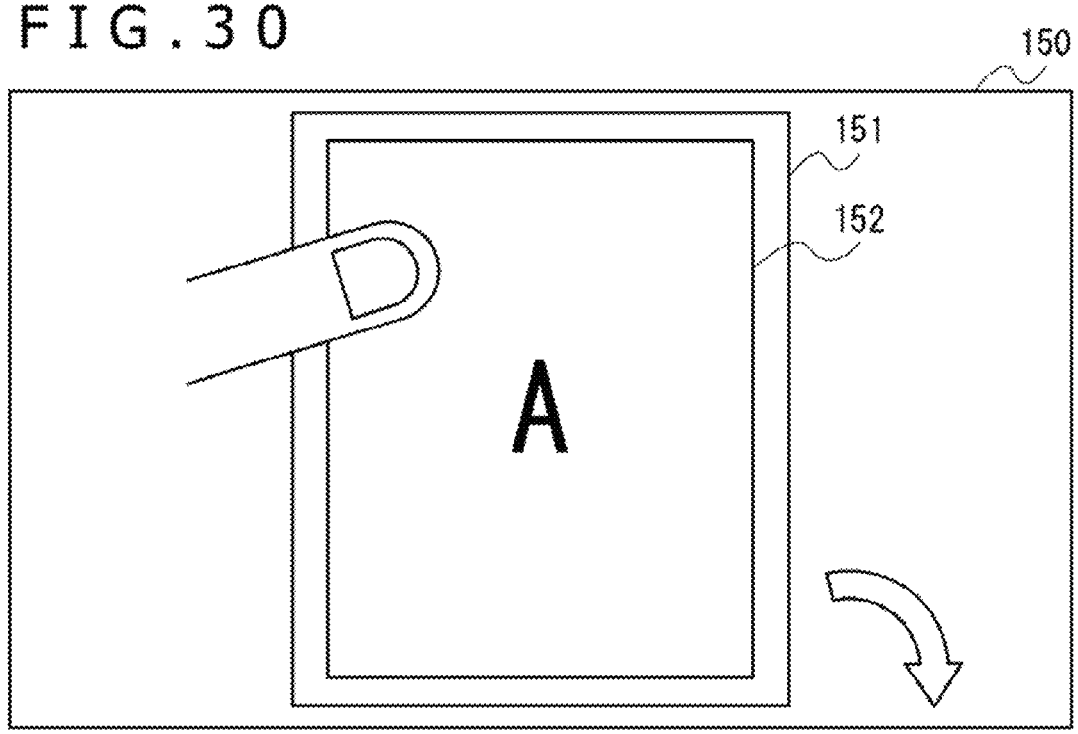
(a)
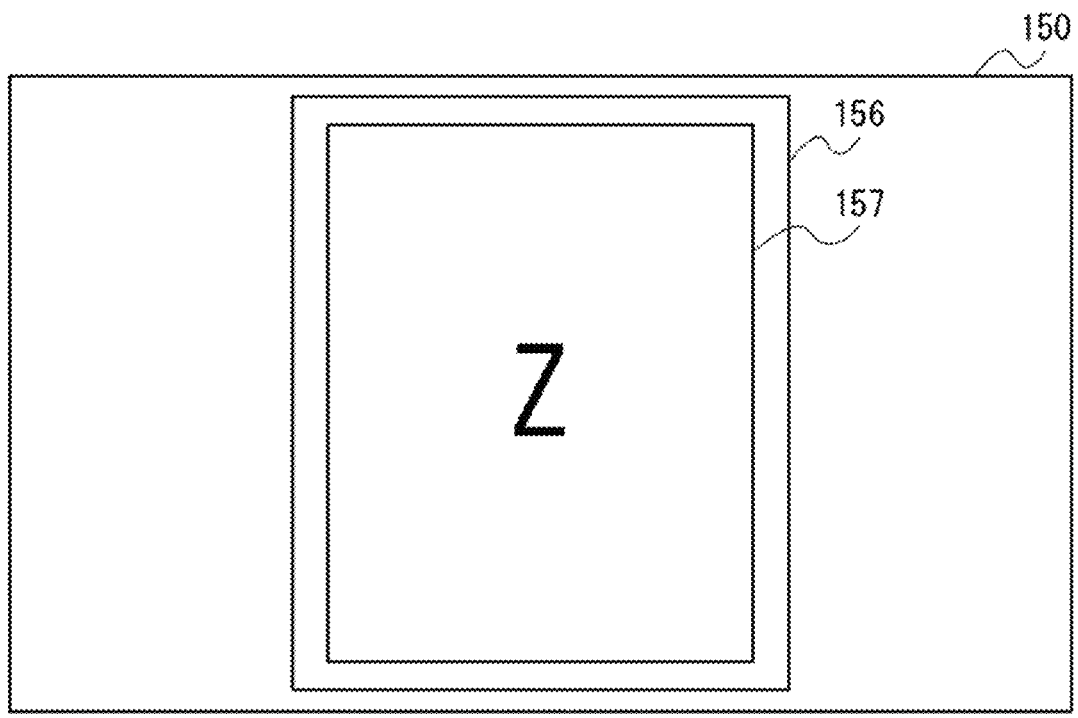
(b)

FIG.31
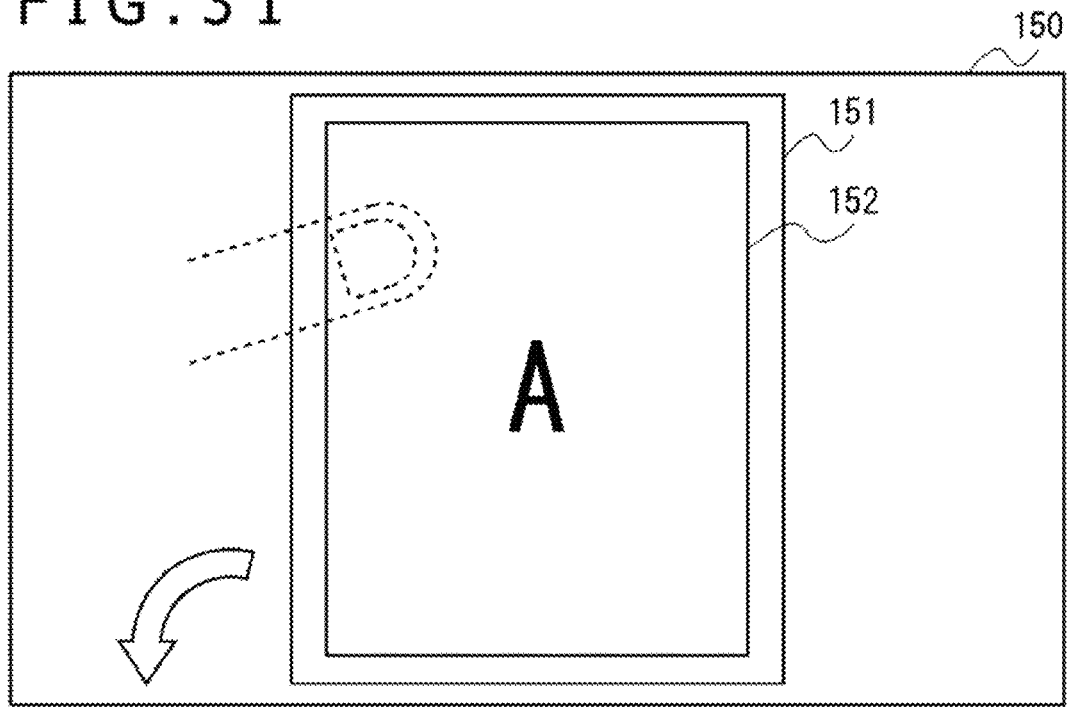
(a)
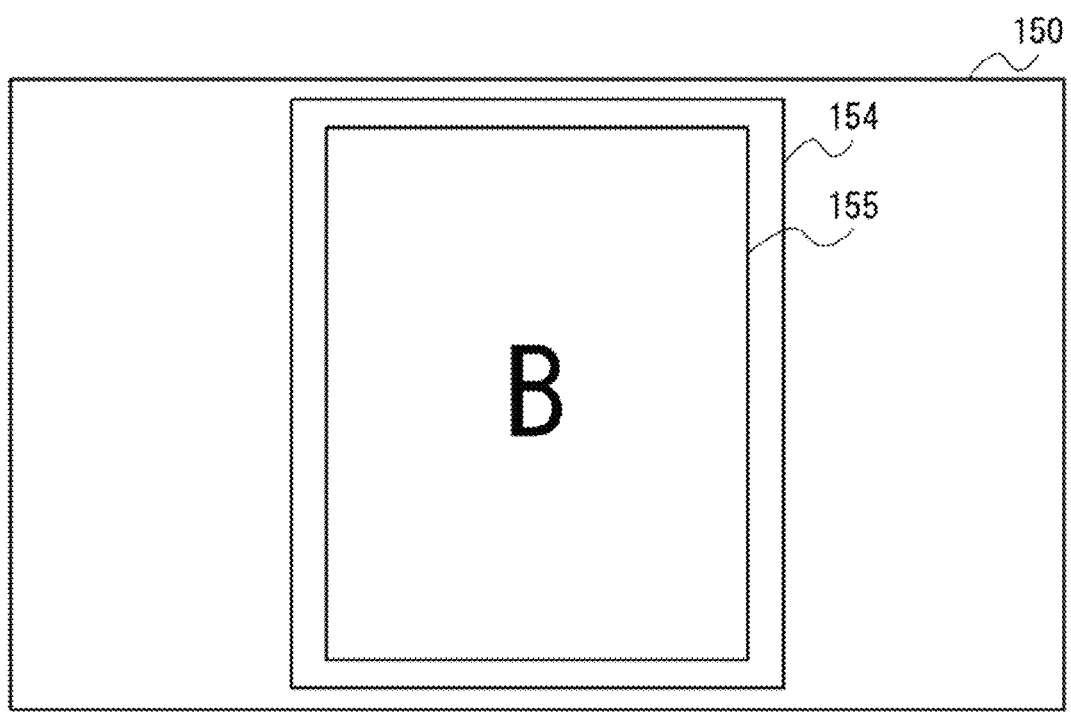
(b)

FIG. 32
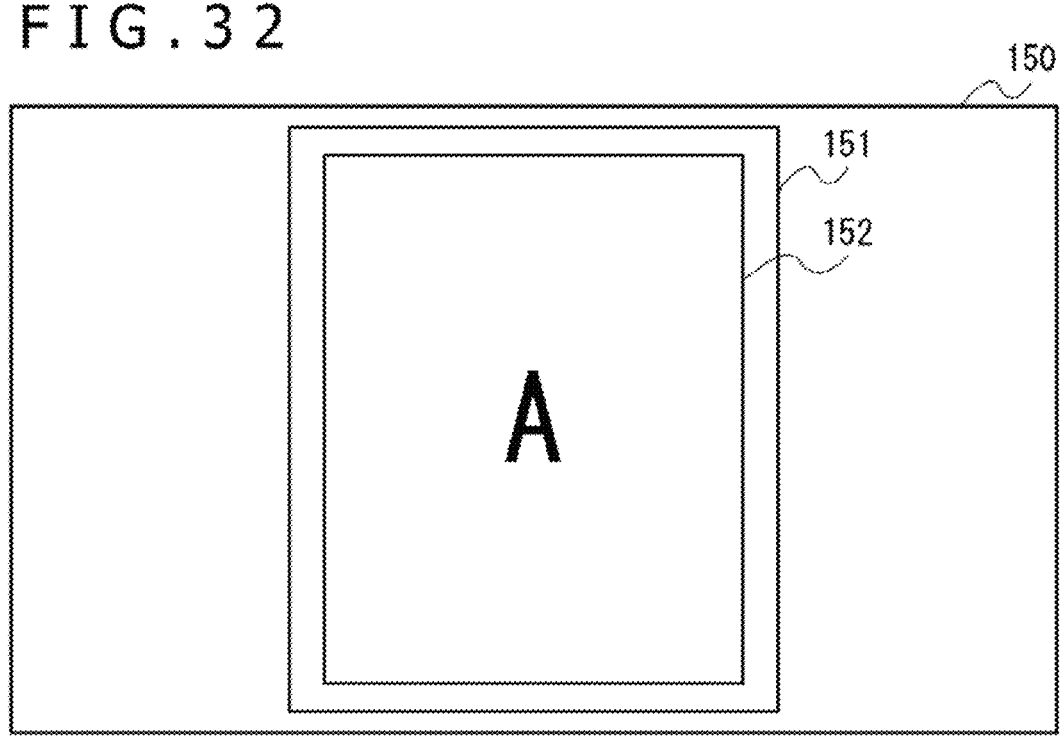
(a)
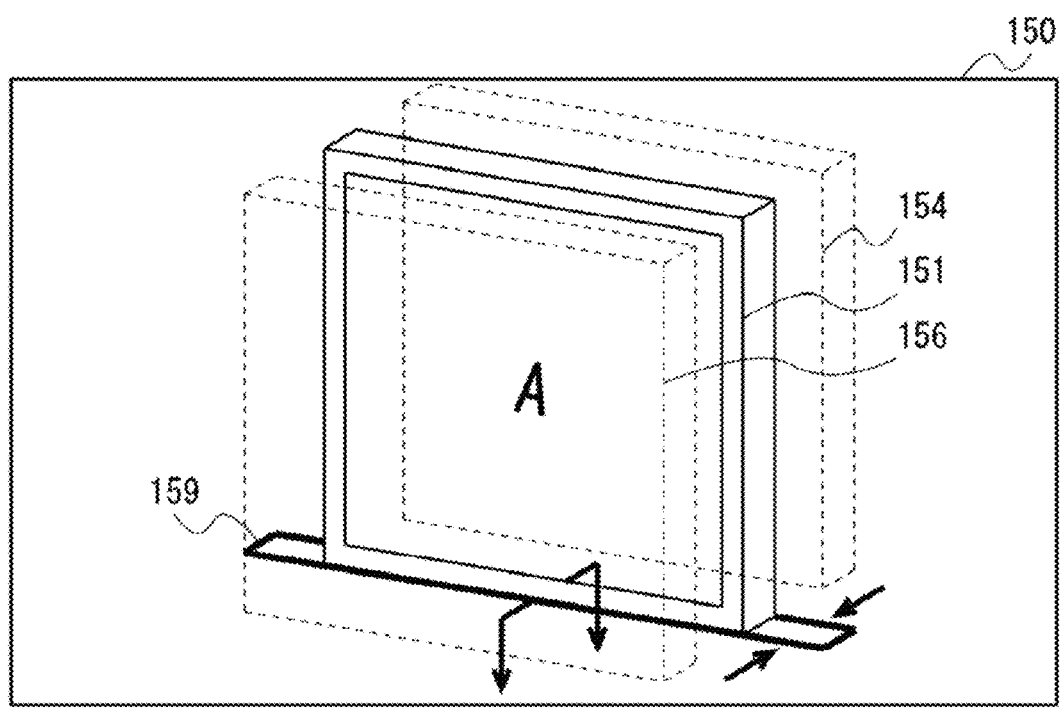
(b)

FIG.33
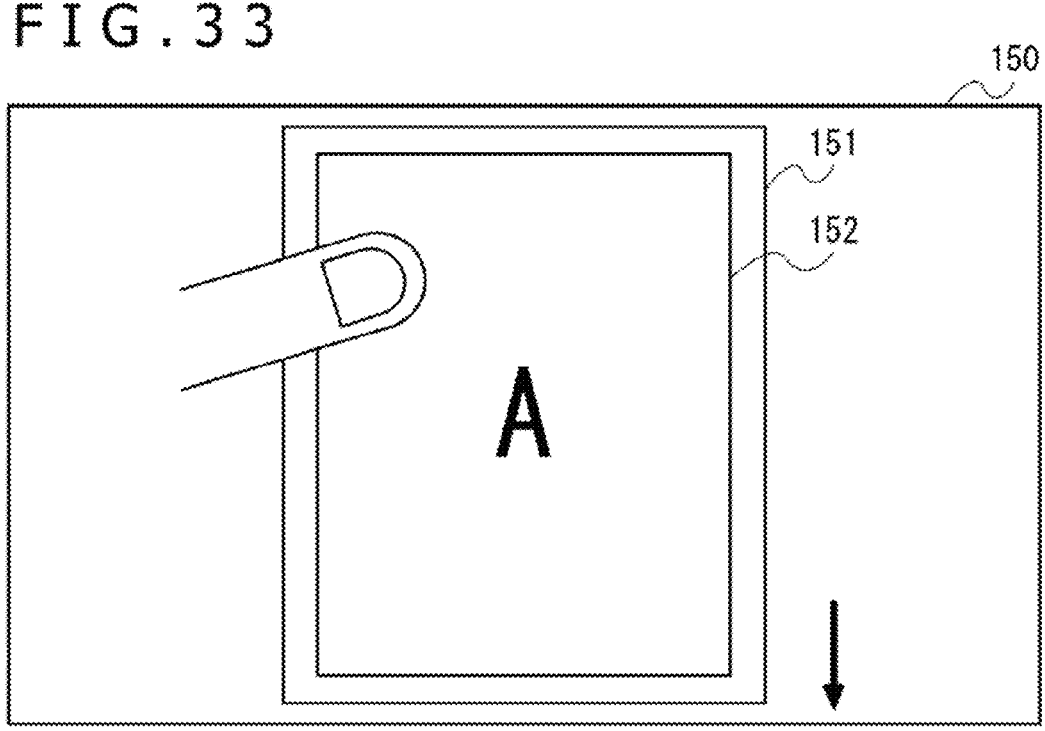
(a)
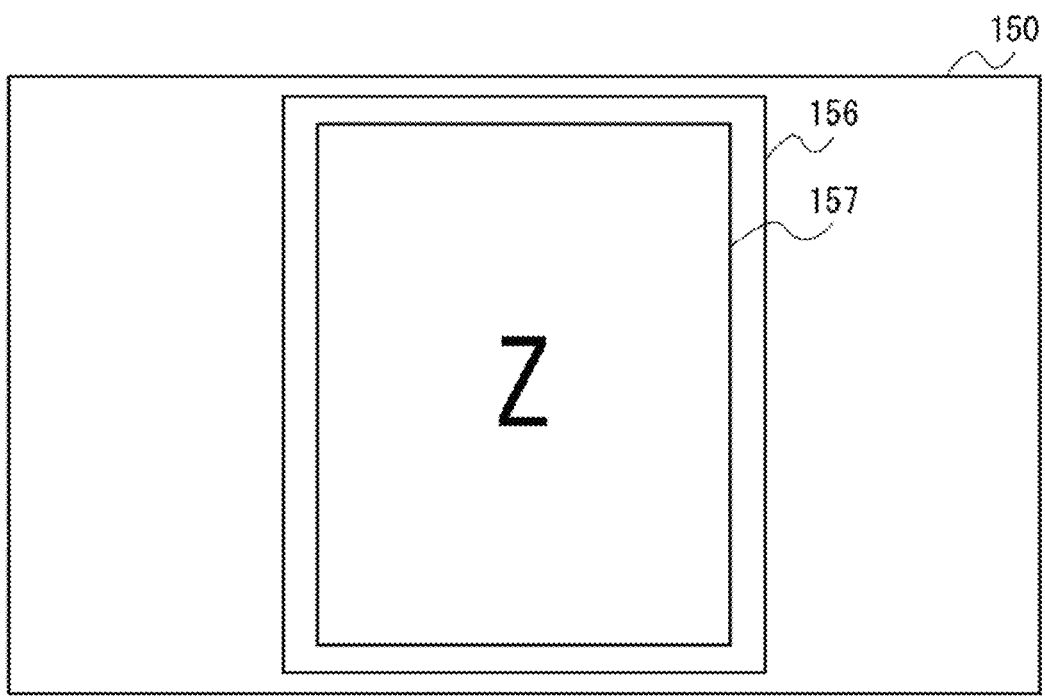
(b)

FIG. 34
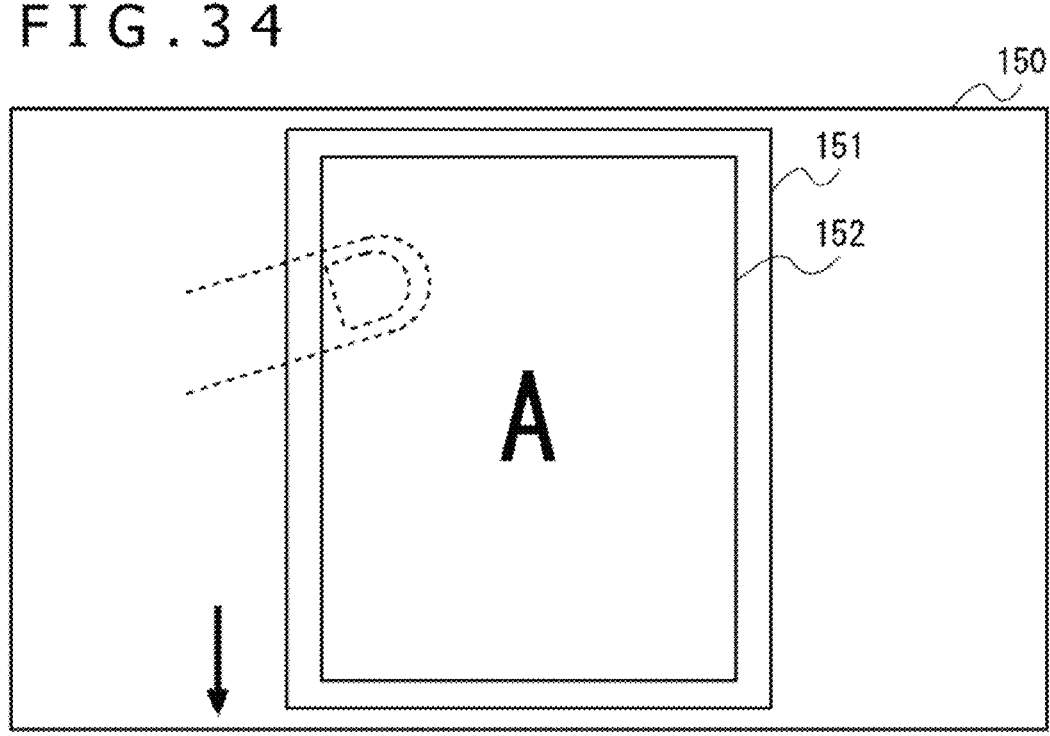
(a)
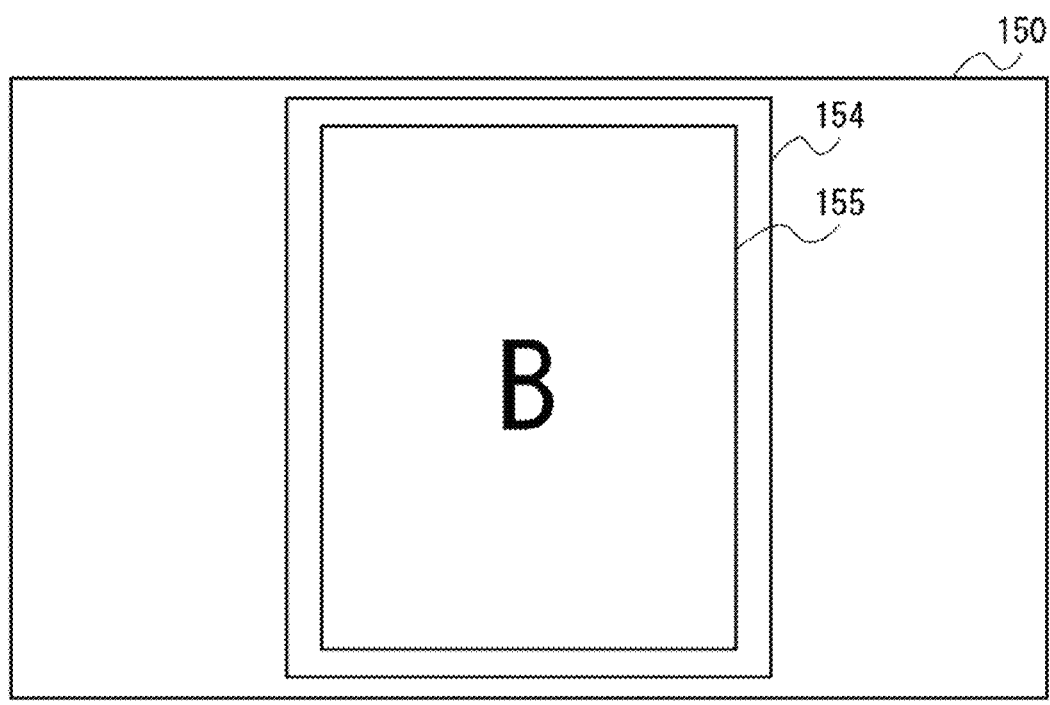
(b)

FIG.35
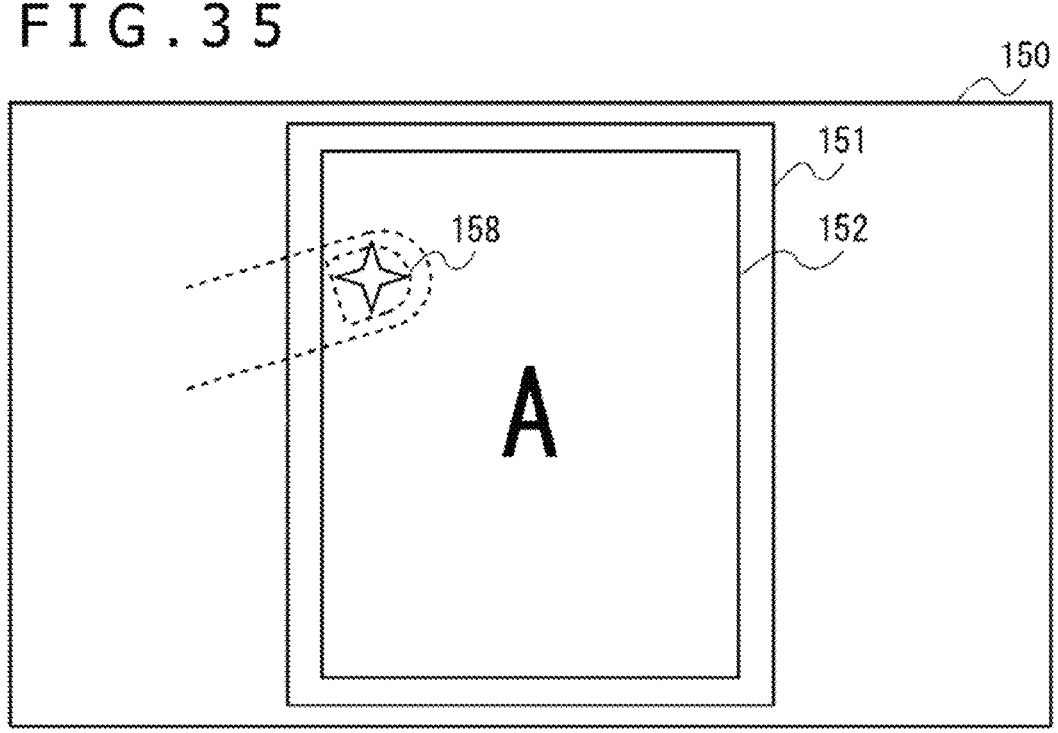
(a)
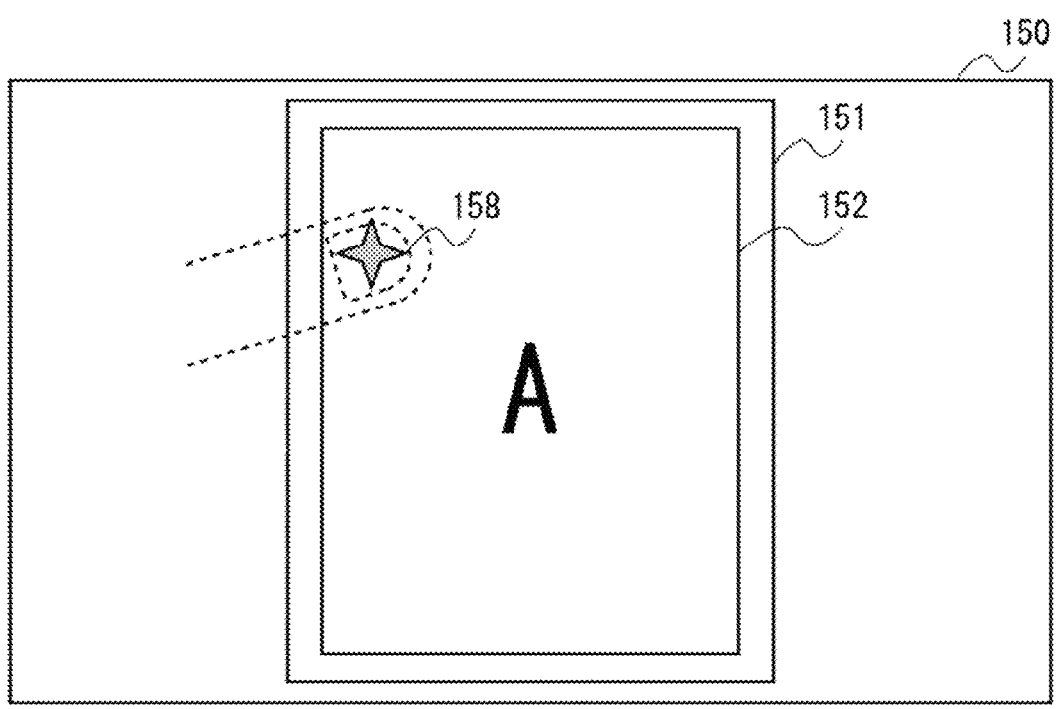
(b)

FIG.36
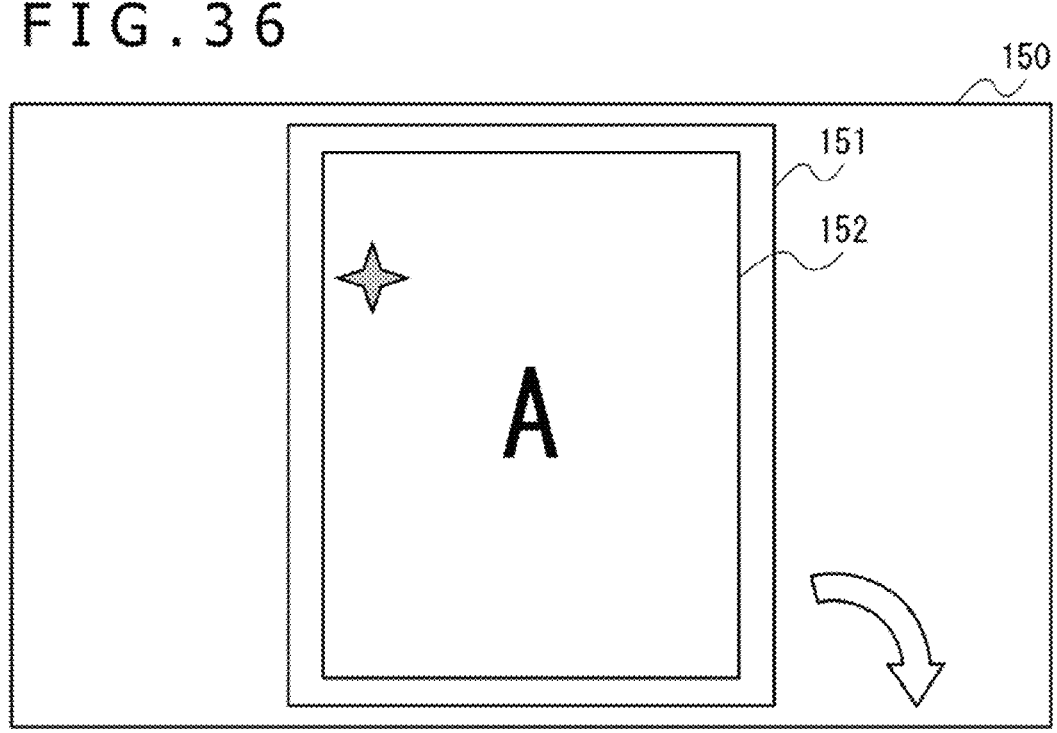
(a)
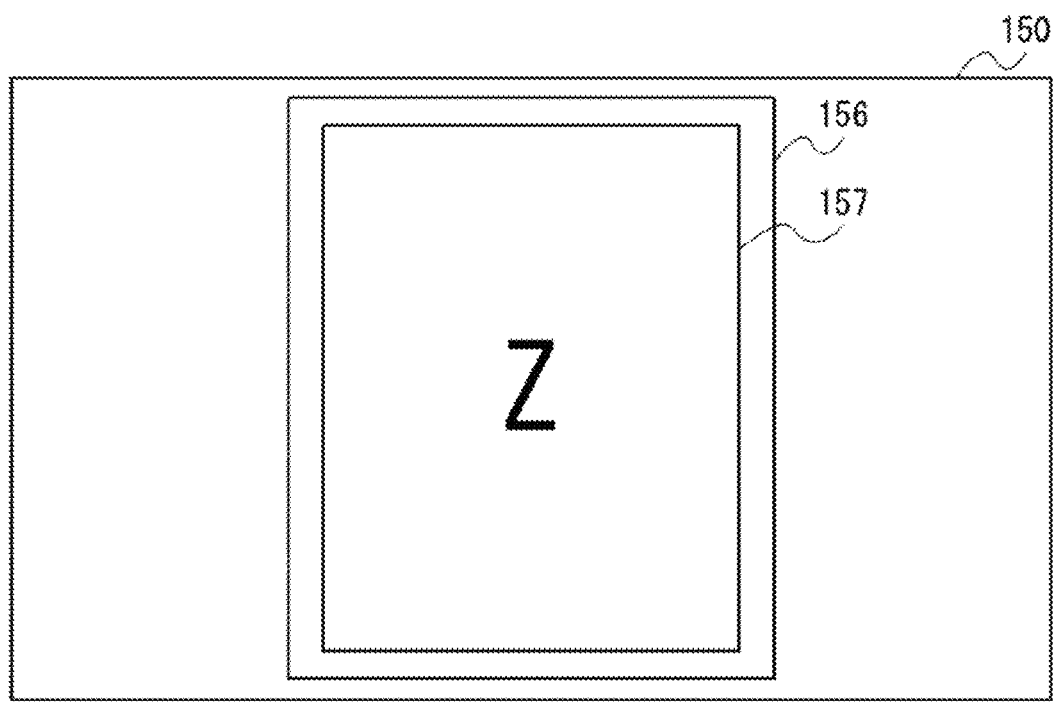
(b)

FIG.37
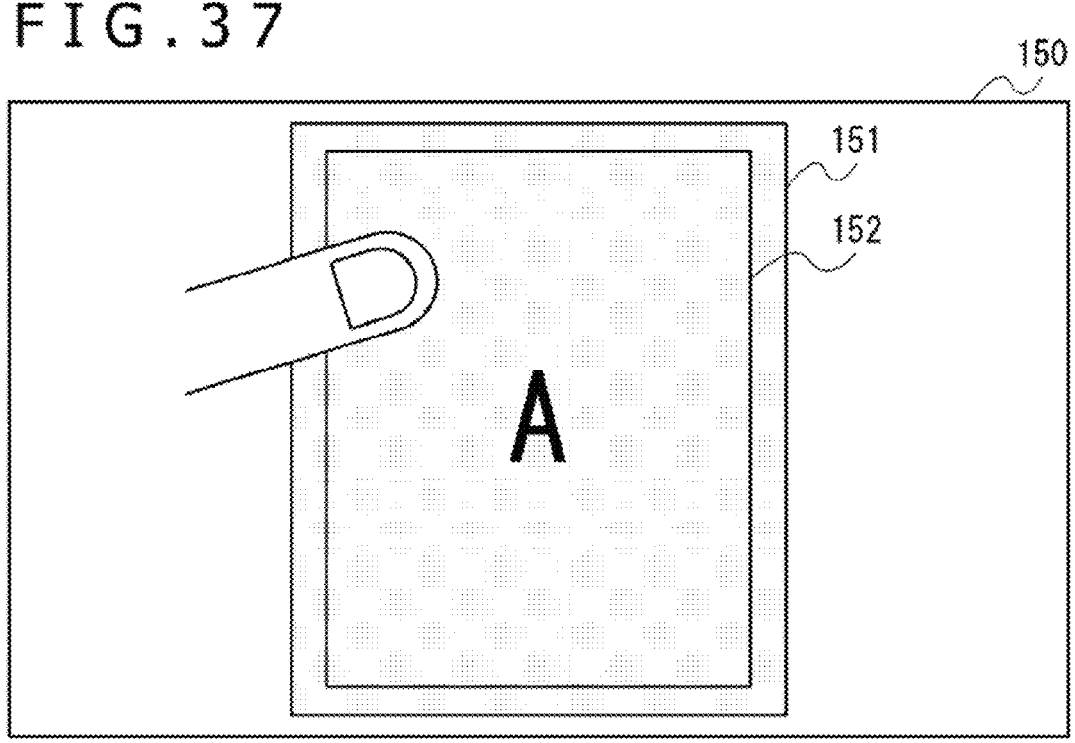
(a)
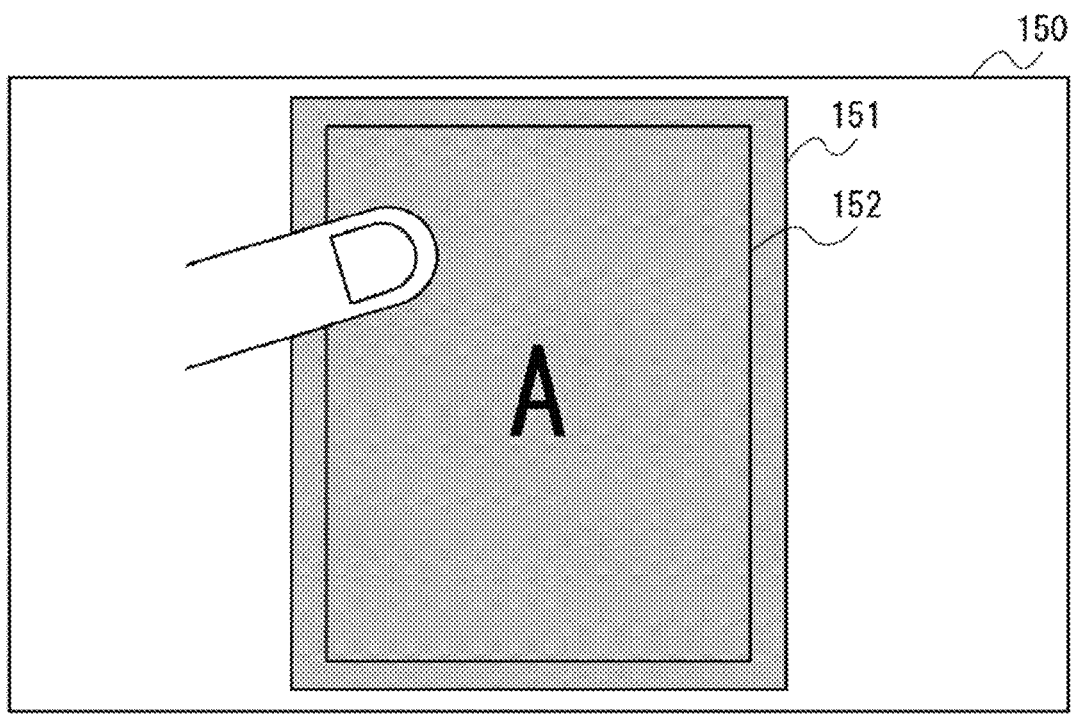
(b)

FIG. 38
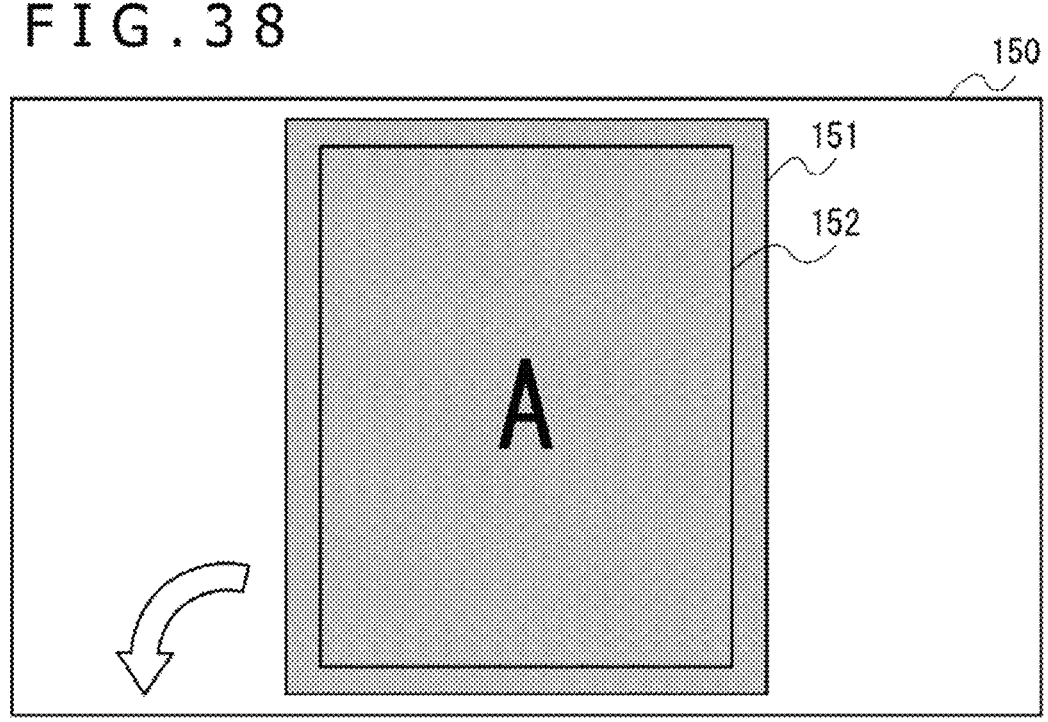
(a)
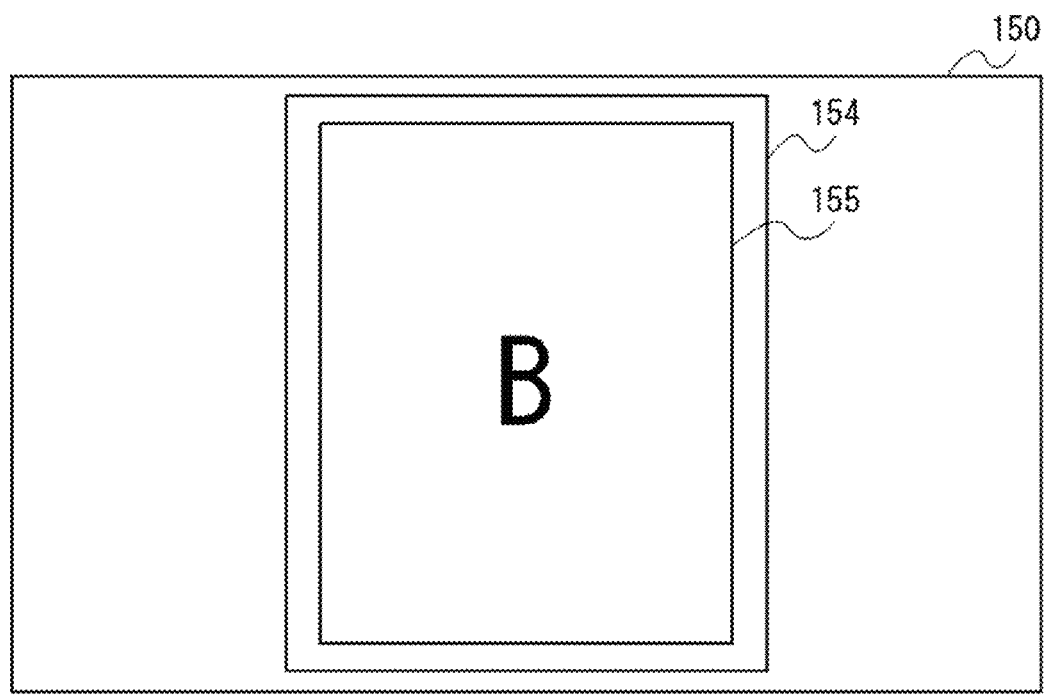
(b)

INPUT CONTROL DEVICE, INPUT CONTROL METHOD, AND INPUT CONTROL PROGRAM

TECHNICAL FIELD

The present invention relates to an input control technique and particularly to an input control device, an input control method, and an input control program to accept input for operating a display target displayed on a display device and operate the display target.

BACKGROUND ART

Smartphones and portable game devices having a touch panel have been widely prevalent and many users have been acquiring proficiency in basic input operation to the touch panel, such as tap input, flick input, swipe input, drag input, and pinch input.

SUMMARY

Technical Problem

However, on the expectation that smartphones, portable game devices, and so forth will become more popular in the future, a technique to provide an input method that is more user-friendly and provides high operability is required. In the process of development of a game device having a touch panel annexed to a display screen of a display device and a back touch panel provided on a surface on an opposite side to the display screen of the display device, the present applicant has reached recognition of problems of a user interface using such a new game device and has conceived of a technique for overcoming the problems and enhancing a convenience for the user.

The present invention is made in view of such circumstances and an object thereof is to provide a more convenient input control technique.

Solution to Problem

A certain aspect of the present invention relates to an input control program. This input control program causes a computer to function as a display controller that displays a display target on a display screen of a display device, an acquiring section that acquires a position or direction of operation input to the display target from a touch panel annexed to the display screen of the display device and a back touch panel provided on a surface on an opposite side to the display screen of the display device, a determining section that determines a direction in which to operate the display target according to the position or direction of operation input and a kind of the display target as a target of operation when the acquiring section acquires the operation input to the display target from the back touch panel, and an operation controller that operates the display target in the direction determined by the determining section.

What are obtained by translating arbitrary combinations of the above constituent elements and expressions of the present invention among method, device, system, and so forth are also effective as aspects of the present invention.

Advantageous Effect of Invention

According to the present invention, a more convenient input control technique can be provided.

BRIEF DESCRIPTION OF DRAWINGS

FIG. 5 is a diagram showing an example of internal data of an object table.

FIGS. 6(a) and 6(b) are diagrams showing a screen example when a homepage is scrolled.

FIGS. 7(a) and 7(b) are diagrams showing a screen example when the homepage is scrolled.

FIGS. 8(a) and 8(b) are diagrams showing a screen example when a rotating drum is scrolled.

FIGS. 9(a) and 9(b) are diagrams showing a screen example when the rotating drum is scrolled.

FIGS. 10(a) and 10(b) are diagrams showing a screen example when the rotating drum is scrolled.

FIGS. 11(a) and 11(b) are diagrams showing a screen example when the rotating drum is scrolled.

FIGS. 12(a) and 12(b) are diagrams showing a screen example when the rotating drum is scrolled.

FIGS. 13(a) and 13(b) are diagrams showing a screen example when a three-dimensional object is rotated.

FIGS. 14(a) and 14(b) are diagrams showing a screen example when the three-dimensional object is rotated.

FIGS. 15(a) and 15(b) are diagrams showing a screen example when the three-dimensional object is rotated.

FIGS. 16(a) and 16(b) are diagrams showing a screen example when the three-dimensional object is rotated.

FIGS. 17(a) and 17(b) are diagrams showing a screen example when a circular list is scrolled.

FIGS. 18(a) and 18(b) are diagrams showing a screen example when the circular list is scrolled.

FIGS. 19(a) and 19(b) are diagrams showing a screen example when the circular list is scrolled.

FIGS. 22(a) and 22(b) are diagrams showing a screen example when the three-dimensional object is moved.

FIGS. 23(a) and 23(b) are diagrams showing a screen example when the three-dimensional object is rotated.

FIGS. 24(a) and 24(b) are diagrams showing a screen example when the display target is switched by tap input.

FIGS. 25(a) and 25(b) are diagrams showing a screen example when the display target is switched by tap input.

FIGS. 26(a) and 26(b) are diagrams showing a screen example when the display target is switched by tap input.

FIGS. 27(a) and 27(b) are diagrams showing a screen example when the display target is switched by tap input.

FIGS. 28(a) and 28(b) are diagrams showing a screen example when the display target is switched by tap input.

FIGS. 29(a) and 29(b) are diagrams showing a screen example when the display target is switched by tap input.

FIGS. 30(a) and 30(b) are diagrams showing a screen example when the display target is switched by tap input.

FIGS. 31(a) and 31(b) are diagrams showing a screen example when the display target is switched by tap input.

FIGS. 32(a) and 32(b) are diagrams showing a screen example when the display target is switched by tap input.

FIGS. 33(*a*) and 33(*b*) are diagrams showing a screen example when the display target is switched by tap input.

FIGS. 34(*a*) and 34(*b*) are diagrams showing a screen example when the display target is switched by tap input.

FIGS. 35(*a*) and 35(*b*) are diagrams showing a screen example when the display target is switched by tap input.

FIGS. 36(*a*) and 36(*b*) are diagrams showing a screen example when the display target is switched by tap input.

FIGS. 37(*a*) and 37(*b*) are diagrams showing a screen example when the display target is switched by tap input.

FIGS. 38(*a*) and 38(*b*) are diagrams showing a screen example when the display target is switched by tap input.

DESCRIPTION OF EMBODIMENTS

An input control device according to an embodiment has a touch panel annexed to a display screen of a display device and a back touch panel disposed on a surface on the opposite side to the display screen, and controls movement or rotation of a display target displayed on the display device according to input to the touch panel and the back touch panel. When the display target is one whose rotation about a virtual axis parallel to the display screen cannot be conceived, the input control device sets the relationship between the direction of input to the back touch panel and the operation direction the same as the relationship between the direction of input to the touch panel and the operation direction. When the display target is one whose rotation about a virtual axis can be conceived, the input control device sets the relationship between the direction of input to the back touch panel and the operation direction opposite to the relationship between the direction of input to the touch panel and the operation direction. For example, when upward drag input is made on the back touch panel for a display target operated upward by upward drag input on the touch panel, the display target is operated upward in the former case whereas it is operated downward in the latter case. In the embodiment, a game device will be described as an example of the input control device.

Figure 1:
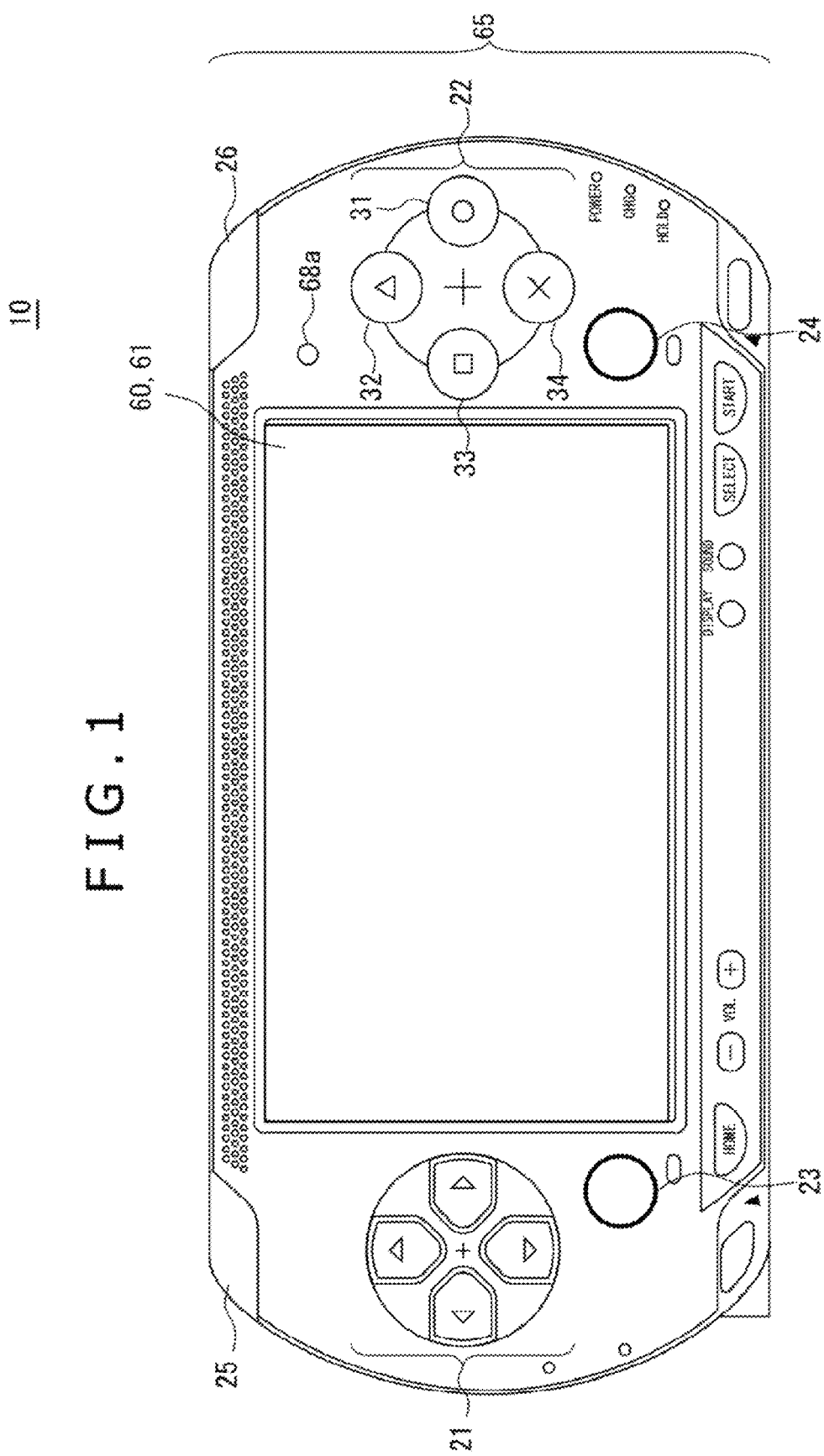
FIG. 1 is a diagram showing an appearance of a game device according to an embodiment.
Figure 2:
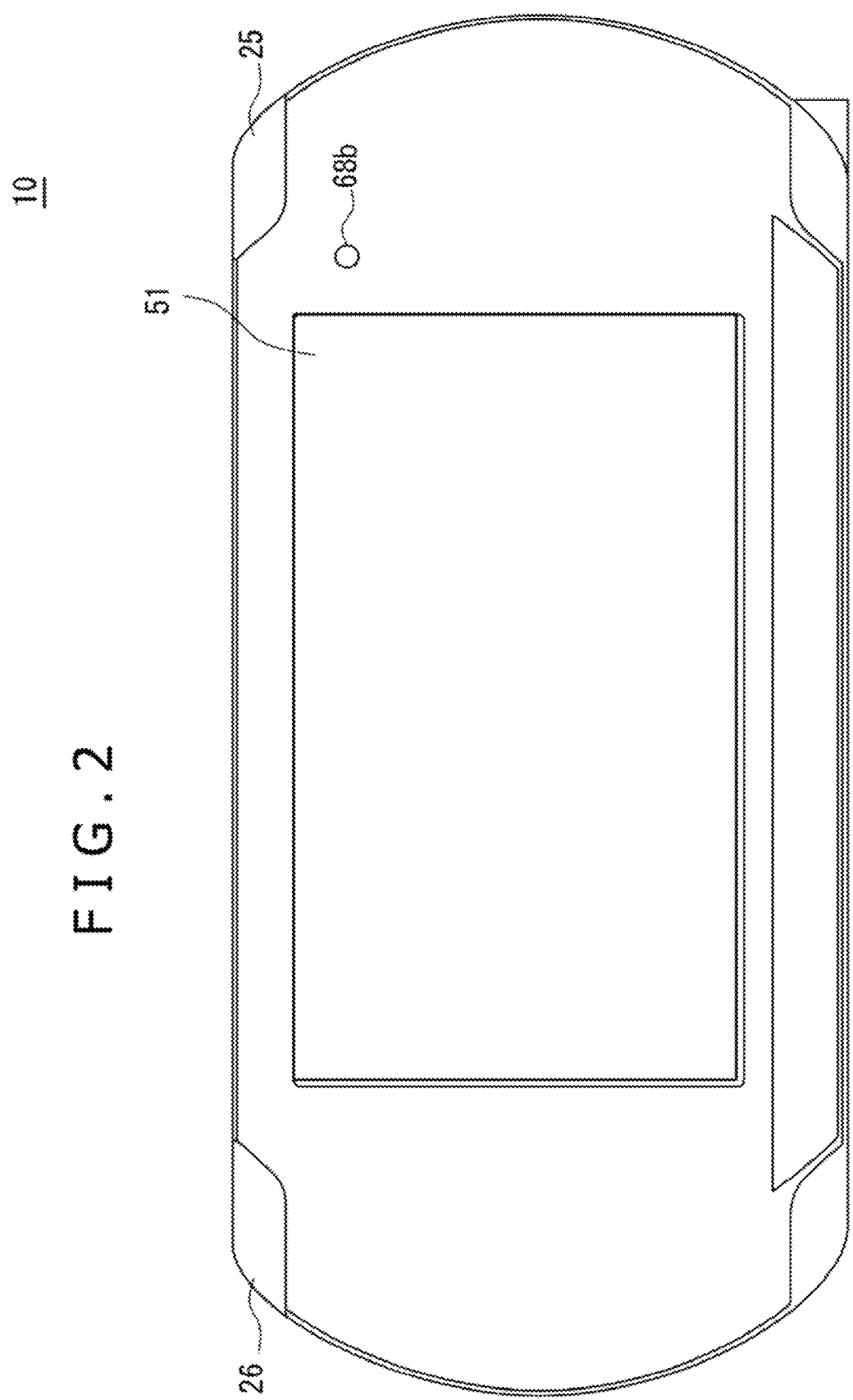
FIG. 2 is a diagram showing an appearance of the game device according to the embodiment.

FIGS. 1 and 2 show the appearance of a game device 10 according to the embodiment. The game device 10 shown in FIGS. 1 and 2 is a portable game device grasped and used by a player. As shown in FIG. 1, on the front side of the game device 10, i.e. on the side facing the player when the player is grasping and operating the game device 10, an input device 65 including directional keys 21, buttons 22, a left analog stick 23, a right analog stick 24, a left button 25, a right button 26, and so forth, a display device 60, and a front camera 68*a* are provided. To the display device 60, a touch panel 61 for detecting contact by a finger of the player, a stylus pen, or the like is annexed. The buttons 22 include a circle button 31, a triangle button 32, a square button 33, and a cross button 34.

As shown in FIG. 2, on the back side of the game device 10, a back touch panel 51 and a back camera 68*b* are provided. A display device may be provided also on the back side of the game device 10 similarly to the front side. However, in the present embodiment, a display device is not provided and only the back touch panel 51 is provided on the back side of the game device 10.

While grasping the game device 10 with both hands, for example the player can operate the buttons 22 with a right hand thumb, operate the directional keys 21 with a left hand thumb, operate the right button 26 with a right hand index or middle finger, operate the left button 25 with a left hand index or middle finger, operate the touch panel 61 with the thumbs of both hands, and operate the back touch panel 51 with third or little fingers of both hands. In the case of using the stylus pen or the like, for example while grasping the game device 10 with the left hand, the player can operate the touch panel 61 and the buttons 22 with the right hand by the stylus pen or the index finger, operate the directional keys 21 with the left hand thumb, operate the left button 25 with the left hand index or middle finger, and operate the back touch panel 51 with the left hand third or little finger.

Figure 3:
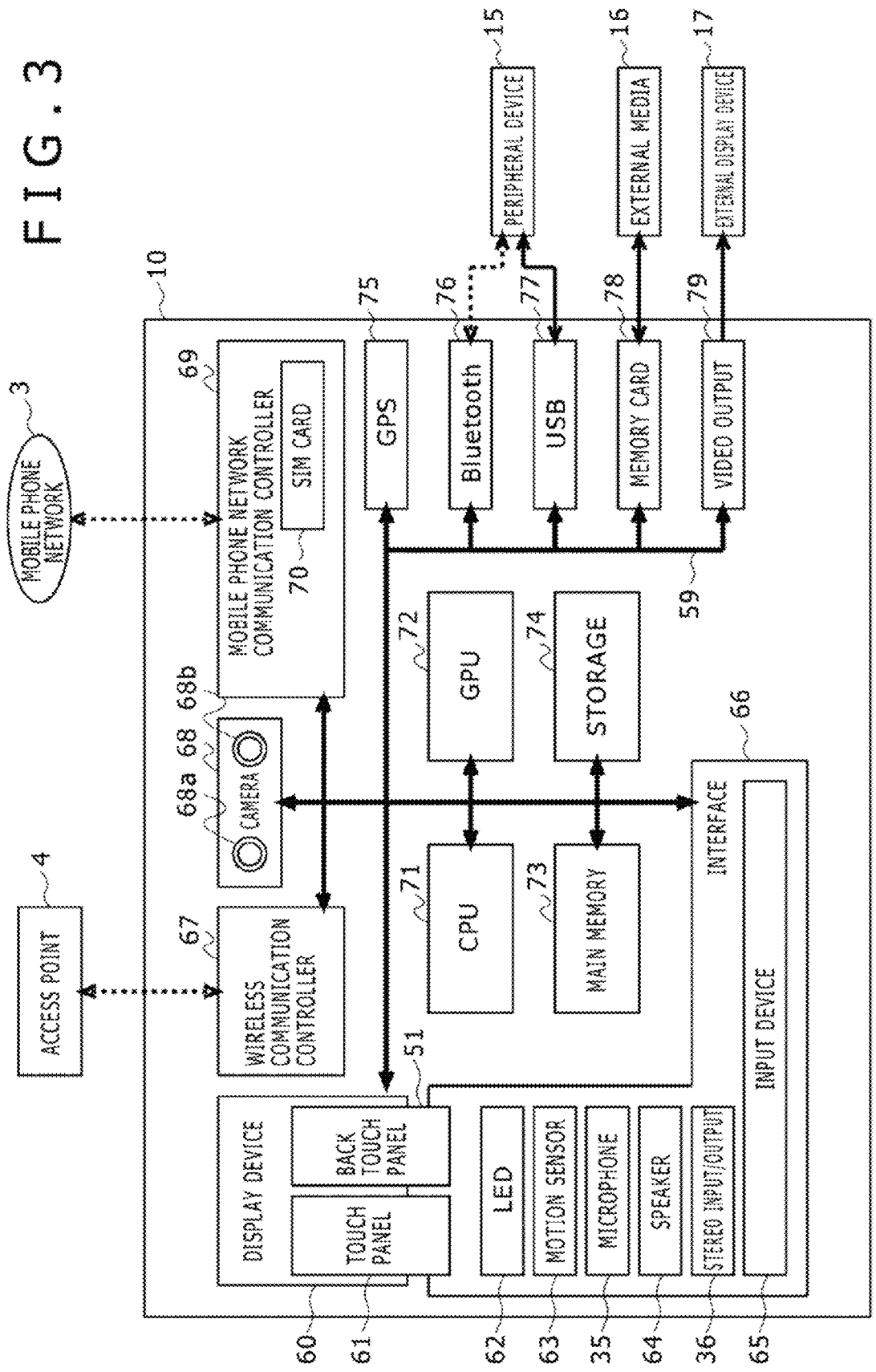
FIG. 3 is a diagram showing a circuit configuration of the game device.

FIG. 3 shows the circuit configuration of the game device 10. The display device 60 displays a display screen generated by the respective functions of the game device 10. The display device 60 may be a liquid crystal display device or may be an organic EL display device. The touch panel 61 is so provided as to be overlapped on the display device 60 and detects contact by a user's finger, a pen, or the like. The touch panel 61 may be one based on any system such as resistive film system, surface capacitive system, or projected capacitive system. The touch panel 61 outputs the coordinates of a position at which input is detected at a predetermined cycle. The back touch panel 51 may also be a touch panel of an arbitrary system. The back touch panel 51 may have a pressure-sensitive sensor capable of detecting the pressure of pressing against the back touch panel 51 and calculate the intensity of input based on the dimension, voltage value, capacitance, and so forth of an area in which input is detected. The back touch panel 51 outputs the coordinates of a position at which input is detected and the intensity (pressure) of the input at a predetermined cycle.

An LED 62 serves as an indicator showing the state of the game device 10 and so forth. A motion sensor 63 detects motion of the game device 10. The motion sensor 63 includes a three-axis gyro sensor and a three-axis acceleration sensor. The three-axis gyro sensor detects the angular velocity in the XZ-plane, ZY-plane, and YX-plane of the game device 10. The three-axis gyro sensor may be a mechanical gyro sensor of a rotation type or vibration type or may be a gyro sensor of a fluid system or optical system. By integrating the angular velocity about the three axes detected by the three-axis gyro sensor, the amount of rotation about the three axes can be calculated. The three-axis acceleration sensor includes a weight supported by a beam and detects the acceleration of the three-axis directions of XYZ of the game device 10 by detecting a position change of the weight due to acceleration. The three-axis acceleration sensor may be an acceleration sensor of a mechanical system, optical system, or semiconductor system. By the three-axis acceleration sensor, the relative angle between the direction of the gravitational acceleration and the directions of the three axes of XYZ of the game device 10 can be detected. Thus, the posture of the game device 10 can be calculated. Furthermore, the velocity can be calculated by integrating the acceleration of the directions of the three axes and the amount of movement can be calculated by further performing an integral.

A microphone 35 inputs ambient sounds of the game device 10. A speaker 64 outputs sounds generated by the respective functions of the game device 10. Stereo sounds are input from an external microphone to a stereo input/output terminal 36 and the stereo input/output terminal 36 outputs stereo sounds to an external headphone or the like. The input device 65 includes the above-described operation keys and so forth and accepts operation input by the user. The above-described touch panel 61, back touch panel 51, LED 62, motion sensor 63, microphone 35, speaker 64, stereo input/output terminal 36, and input device 65 mutually exchange data with a CPU 71 and so forth via an interface 66.

A wireless communication controller 67 is configured by a wireless LAN (Wireless Local Area Network) compliant with a communication standard such as IEEE 802.11b/g. It carries out wireless communication with an access point and so forth and controls communication with other devices via the access point and the Internet. A camera 68 captures an image and inputs image data. A mobile phone network communication controller 69 is compatible with the 3G (3rd Generation) digital mobile phone system compliant with the IMT-2000 standard defined by the ITU (International Telecommunication Union) and controls communication with other devices via a mobile phone network and the Internet. In a SIM card 70, a unique ID number for identifying a phone number of a mobile phone is recorded. Insertion of the SIM card 70 enables communication with the mobile phone network. The camera 68 is composed of the front camera 68a formed of a CMOS image sensor (Complementary Metal Oxide Semiconductor Image Sensor) and the back camera 68b formed of a CMOS image sensor similarly and captures each of images of the front direction and the back direction to output it as image data.

Figure 4:
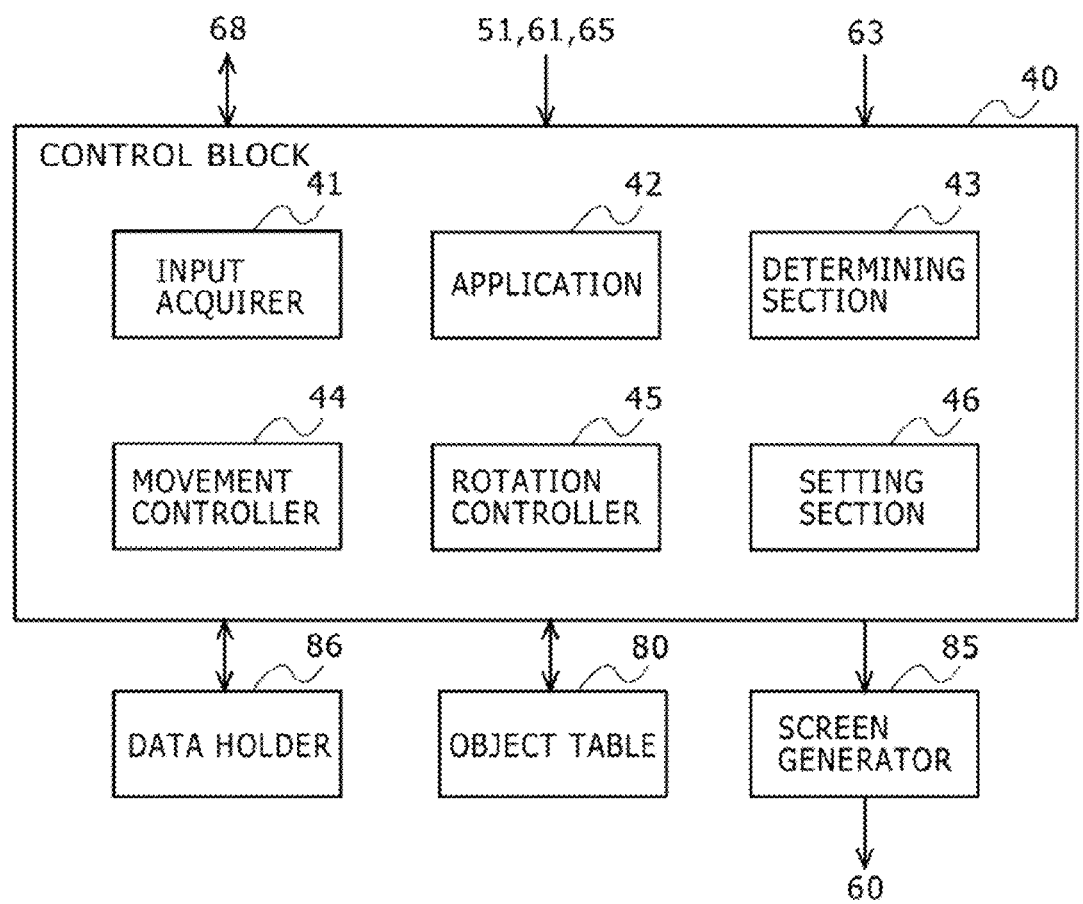
FIG. 4 is a diagram showing functional configurations of the game device according to the embodiment.

The CPU (Central Processing Unit) 71 runs a program and so forth loaded into a main memory 73 and realizes the respective functional configurations shown in FIG. 4. A GPU (Graphics Processing Unit) 72 performs calculation necessary for image processing. The main memory 73 is formed of a RAM (Random Access Memory) or the like and stores programs that run in the game device 10, data, and so forth. A storage 74 is formed of a NAND-type flash memory or the like and programs, data, and so forth utilized by the respective configurations of the game device 10 are recorded therein.

A GPS (Global Positioning System) controller 75 receives signals from the GPS satellites and calculates the present location. A Bluetooth controller 76 controls wireless communication by Bluetooth with a peripheral device 15. A USB controller 77 controls communication by USB with the peripheral device 15. A memory card controller 78 controls data reading and writing with external media 16. A video output controller 79 outputs a video signal to an external display device 17 based on a standard such as HDMI.

FIG. 4 shows the functional configurations of the game device 10 according to the embodiment. The game device 10 includes a control block 40, a data holder 86, an object table 80, and a screen generator 85. Although these configurations are realized by a CPU of an arbitrary computer, a memory, a program loaded into the memory, and so forth in terms of a hardware component, functional blocks realized by cooperation of them are drawn here. Therefore, it is understood by those skilled in the art that these functional blocks can be realized in various forms by only hardware, only software, or a combination of them.

The control block 40 reads out a program from the data holder 86 in which a program of an application is stored or the like and carries out the application based on operation instructions input by the user from the input device 65, the touch panel 61, the back touch panel 51, the motion sensor 63, and so forth. The data holder 86 holds programs, various kinds of data files, and so forth. The object table 80 stores information on objects to be displayed on the display screen of the display device 60 by an application 42 and so forth. The screen generator 85 generates a screen of an application or the like controlled by the control block 40 and makes the display device 60 display it.

The control block 40 includes an input acquirer 41, the application 42, a determining section 43, a movement controller 44, a rotation controller 45, and a setting section 46.

The input acquirer 41 acquires input for operating a display target displayed on the display device 60 from the touch panel 61 and the back touch panel 51. The input acquirer 41 acquires input for instructing the direction in which to operate the display target, such as flick input, swipe input, and drag input. The input acquirer 41 acquires the coordinates in the display screen about positions at which input to the touch panel 61 and the back touch panel 51 is detected and determines whether or not the input corresponds to flick input, swipe input, drag input, and so forth. If the input corresponds to any of them, the input acquirer 41 may determine the direction thereof or may acquire the direction of flick input, swipe input, drag input, and so forth from a device driver not shown in the diagram or the like.

The application 42 provides various kinds of functions by reading out a program of a game or the like from the data holder 86 and carrying out it. The application 42 and the screen generator 85 function as the display controller that displays the display target on the display screen of the display device 60.

When accepting instruction input for operating a display target from the user via the touch panel 61 or the back touch panel 51 while the display target is being displayed on the display device 60 by the application 42, the determining section 43 refers to the object table 80 and determines the direction in which to operate the display target.

The movement controller 44 controls movement of a display target displayed on the display device 60. The rotation controller 45 controls rotation of a display target displayed on the display device 60. The movement controller 44 and the rotation controller 45 move or rotate the display target in the operation direction determined by the determining section 43. The setting section 46 accepts a setting relating to the operation direction of the display target from the user and registers it in the object table 80.

FIG. 5 shows an example of internal data of the object table 80. In the object table 80, an operation target field 81, an operation field 82, and a direction field 83 are set. The operation target field 81 stores the types of objects and so forth to become the target of operation by instruction input to the touch panel 61 and the back touch panel 51. The operation field 82 stores the contents of operation carried out for objects and so forth as the operation target. The direction field 83 stores information indicating whether the relationship between the direction of instruction input to the touch panel 61 and the direction when the operation target is operated is the same as or opposite to the relationship between the direction of instruction input to the back touch panel 51 and the direction when the operation target is operated. For example, when the operation target is a homepage and the contents of operation is scrolling, the homepage is scrolled in the same direction by instruction input of the same direction to the touch panel 61 and the back touch panel 51. In the case of scrolling a rotating drum, the rotating drum is scrolled in the opposite directions by instruction input of the same direction to the touch panel 61 and the back touch panel 51.

FIGS. 6(*a*) and 6(*b*) show a screen example when a homepage is scrolled. If, as shown in FIG. 6(*a*), the input acquirer 41 detects that drag input is made upward on the touch panel 61 when the homepage is displayed in a screen 100 by the application 42 for displaying the homepage, the movement controller 44 scrolls the homepage upward as shown in FIG. 6(*b*). Therefore, the lower part of the homepage, which is not displayed in the screen 100 before the scrolling, is displayed in the screen 100.

FIGS. 7(a) and 7(b) show a screen example when the homepage is scrolled. If, as shown in FIG. 7(a), the input acquirer 41 detects that drag input is made on the back touch panel 51 when the homepage is displayed in the screen 100, the determining section 43 refers to the object table 80 and decides the direction in which to scroll the homepage. The object table 80 stores information indicating that, in the case of scrolling a homepage, by operation to the back touch panel 51, it should be scrolled in the same direction as that in the case of operation to the touch panel 61. Therefore, when it is detected that drag input is made upward on the back touch panel 51, the determining section 43 determines to scroll the homepage upward. The movement controller 44 scrolls the homepage upward as shown in FIG. 7(b). In this manner, when scrolling a homepage, the user can scroll it upward when making drag input upward and can scroll it downward when making drag input downward both on the touch panel 61 and on the back touch panel 51. This can provide an operation environment that fits the intuition of the user.

FIGS. 8(a) and 8(b) show a screen example when the rotating drum is scrolled. As shown in FIG. 8(a), by the application 42 for setting the time, a rotating drum 112a for setting the hours and a rotating drum 112b for setting the minutes are displayed in a screen 110. As shown in FIG. 8(b), the rotating drums 112a and 112b are represented by a columnar object rotated about a virtual axis 114 parallel to the display screen of the display device 60 and part of numerical values written on the side surface of the column is displayed in the screen 110. By rotating the rotating drums 112a and 112b, the user can scroll the numerical values displayed in the screen 110 upward and downward to change the set numerical values.

FIGS. 9(a) and 9(b) show a screen example when the rotating drum is scrolled. If, as shown in FIG. 9(a), the input acquirer 41 detects that drag input is made upward at a position on the touch panel 61 corresponding to a position at which the rotating drum 112a is displayed when the rotating drum 112a is displayed in the screen 110, the movement controller 44 rotates the rotating drum 112a about the virtual axis 114 in such a manner that the front side of the drum moves upward and the back side moves downward to scroll the numerical values displayed on the rotating drum 112a upward as shown in FIG. 9(b).

FIGS. 10(a) and 10(b) show a screen example when the rotating drum is scrolled. If, as shown in FIG. 10(a), the input acquirer 41 detects that drag input is made at a position on the back touch panel 51 corresponding to a position at which the rotating drum 112a is displayed when the rotating drum 112a is displayed in the screen 110, the determining section 43 refers to the object table 80 and determines the direction in which to rotate the rotating drum 112a to scroll the numerical values. As shown in FIG. 8(b), only part of the side surface of the columnar object representing the rotating drum 112a is displayed in the screen 110. However, when scrolling in the same direction is continued, numerical values of 0 to 23 are cyclically displayed. This allows the user to recognize that the rotating drum 112a is represented by a columnar object rotated around a virtual axis. Therefore, when operating the rotating drum 112a by the touch panel 61, the user feels as if operating the front-side side surface of the columnar object. When operating the rotating drum 112a by the back touch panel 51, the user feels as if operating the back-side side surface of the columnar object. Accordingly, as shown in FIG. 10(b), when the user makes drag input downward on the back touch panel 51, the movement controller 44 scrolls the rotating drum 112a upward in contrast to when the user makes drag input downward on the touch panel 61. This can provide an operation environment that fits the intuition of the user.

FIGS. 11(a) and 11(b) show a screen example when the rotating drum is scrolled. If, as shown in FIG. 11(a), the input acquirer 41 detects that drag input is made downward at the position on the touch panel 61 corresponding to the position at which the rotating drum 112a is displayed when the rotating drum 112a is displayed in the screen 110, the movement controller 44 rotates the rotating drum 112a about the virtual axis 114 in such a manner that the front side of the drum moves downward and the back side moves upward to scroll the numerical values displayed on the rotating drum 112a downward as shown in FIG. 11(b).

FIGS. 12(a) and 12(b) show a screen example when the rotating drum is scrolled. If, as shown in FIG. 12(a), the input acquirer 41 detects that drag input is made downward at the position on the back touch panel 51 corresponding to the position at which the rotating drum 112a is displayed when the rotating drum 112a is displayed in the screen 110, the determining section 43 refers to the object table 80 and determines the direction in which to rotate the rotating drum 112a to scroll the numerical values. The object table 80 stores information indicating that, in the case of scrolling a rotating drum, by operation to the back touch panel 51, it should be scrolled in the opposite direction to that in the case of operation to the touch panel 61. Therefore, when it is detected that drag input is made downward on the back touch panel 51, the determining section 43 determines to scroll the rotating drum upward. The movement controller 44 scrolls the rotating drum 112a upward as shown in FIG. 12(b).

As shown in FIGS. 9(a) and 12(a), by instruction input of opposite directions to the touch panel 61 and the back touch panel 51, the rotating drum 112a is scrolled in the same upward direction as shown in FIGS. 9(b) and 12(b). Similarly, as shown in FIGS. 10(a) and 11(b), by instruction input of opposite directions to the touch panel 61 and the back touch panel 51, the rotating drum 112a is scrolled in the same downward direction as shown in FIGS. 10(b) and 11(b).

The movement controller 44 may accept only operation input from either one of the touch panel 61 and the back touch panel 51 and scroll the rotating drum or may accept operation input from both. In the latter case, for example the user can scroll the rotating drum by the back touch panel 51 and thereafter stop the scrolling and finely adjust the scrolling by the touch panel 61. The movement controller 44 may adjust the amount, speed, or acceleration of scrolling according to the movement amount, speed, or acceleration of drag input.

FIGS. 13(a) and 13(b) show a screen example when a three-dimensional object is rotated. If, as shown in FIG. 13(a), the input acquirer 41 detects that drag input is made upward on the touch panel 61 when a three-dimensional object 122 is displayed in a screen 120 by the application 42 for displaying the three-dimensional object, the rotation controller 45 rotates the three-dimensional object 122 about a virtual axis 124 in such a manner that the front side of the object moves upward and the back side moves downward as shown in FIG. 13(b).

FIGS. 14(a) and 14(b) show a screen example when the three-dimensional object is rotated. If, as shown in FIG. 14(a), the input acquirer 41 detects that drag input is made on the back touch panel 51 when the three-dimensional object 122 is displayed in the screen 120, the determining section 43 refers to the object table 80 and determines the direction in which to rotate the three-dimensional object 122. Similarly to the case of the rotating drum, when rotating the three-dimensional object 122 by the touch panel 61, the user feels as if rotating the three-dimensional object 122 by holding the part of the three-dimensional object 122 closer to the front side than the virtual axis 124. When rotating the three-dimensional object 122 by the back touch panel 51, the user feels as if rotating the three-dimensional object 122 by holding the part of the three-dimensional object 122 closer to the back side than the virtual axis 124. Therefore, in the object table 80, information is stored that indicates that the direction when the three-dimensional object is rotated by input to the back touch panel 51 is opposite to the direction when the three-dimensional object is rotated by input to the touch panel 61. As shown in FIG. 14(*b*), when the user makes drag input downward on the back touch panel 51, the movement controller 44 rotates the three-dimensional object 122 in such a manner that the front side of the object moves upward and the back side moves downward. This can provide an operation environment that fits the intuition of the user.

FIGS. 15(*a*) and 15(*b*) show a screen example when the three-dimensional object is rotated. If, as shown in FIG. 15(*a*), the input acquirer 41 detects that drag input is made rightward on the touch panel 61 when the three-dimensional object 122 is displayed in the screen 120 by the application 42 for displaying the three-dimensional object, the rotation controller 45 rotates the three-dimensional object 122 about a virtual axis 126 that is parallel to the display screen of the display device 60 and is perpendicular to the direction of the drag input in such a manner that the front side of the object moves rightward and the back side moves leftward as shown in FIG. 15(*b*).

FIGS. 16(*a*) and 16(*b*) show a screen example when the three-dimensional object is rotated. If, as shown in FIG. 16(*a*), the input acquirer 41 detects that drag input is made on the back touch panel 51 when the three-dimensional object 122 is displayed in the screen 120, the determining section 43 refers to the object table 80 and determines the direction in which to rotate the three-dimensional object 122. The object table 80 stores information indicating that the direction when a three-dimensional object is rotated by input to the back touch panel 51 is opposite to the direction when a three-dimensional object is rotated by input to the touch panel 61. Therefore, when the user makes drag input leftward on the back touch panel 51, the movement controller 44 rotates the three-dimensional object 122 in such a manner that the front side of the object moves rightward and the back side moves leftward as shown in FIG. 14(*b*). This can provide an operation environment that fits the intuition of the user.

FIGS. 17(*a*) and 17(*b*) show a screen example when a circular list is scrolled. If, as shown in FIG. 17(*a*), the input acquirer 41 detects that drag input is made upward on the touch panel 61 when a list of bookmarks is displayed in a screen 130 by the application 42 for displaying the bookmark, the movement controller 44 scrolls the list upward as shown in FIG. 17(*b*). The list of bookmarks is so scrolled that "user folder 1" as the first item is cyclically displayed next to "user bookmark 7" as the last item.

FIGS. 18(*a*) and 18(*b*) show a screen example when the circular list is scrolled. If, as shown in FIG. 18(*a*), the input acquirer 41 detects that drag input is made on the back touch panel 51 when the list of bookmarks is displayed in the screen 120, the determining section 43 refers to the object table 80 and determines the direction in which to scroll the list. The object table 80 stores information indicating that the direction when the circular list is scrolled by input to the back touch panel 51 is opposite to the direction when the circular list is scrolled by input to the touch panel 61. Therefore, when the user makes drag input downward on the back touch panel 51, the movement controller 44 scrolls the list upward as shown in FIG. 18(*b*).

In the example shown in FIG. 18(*b*), an environment in which a list of bookmarks cyclically displayed is operated similarly to the rotating drum is provided. However, depending on the user, there is a possibility that the user feels uncomfortable about operating the list of bookmarks, from which an impression as a planar object is received more than the rotating drum, similarly to the rotating drum. In this case, the user can change the operation direction by the setting section 46. For example, the setting section 46 may display a setting screen for changing the operation direction when a display target is operated and accept a change in the setting from the user to register it in the object table 80.

FIGS. 19(*a*) and 19(*b*) show a screen example when the circular list is scrolled. Suppose that, by the setting section 46, the user has changed the setting so that the direction when the circular list is scrolled by input to the back touch panel may become the same as the direction when the circular list is scrolled by input to the touch panel 61. In this case, if, as shown in FIG. 19(*a*), the input acquirer 41 detects that drag input is made downward on the back touch panel 51 when the list of bookmarks is displayed in the screen 120, the movement controller 44 scrolls the list downward as shown in FIG. 19(*b*). This can further enhance the convenience for the user.

Figure 20:
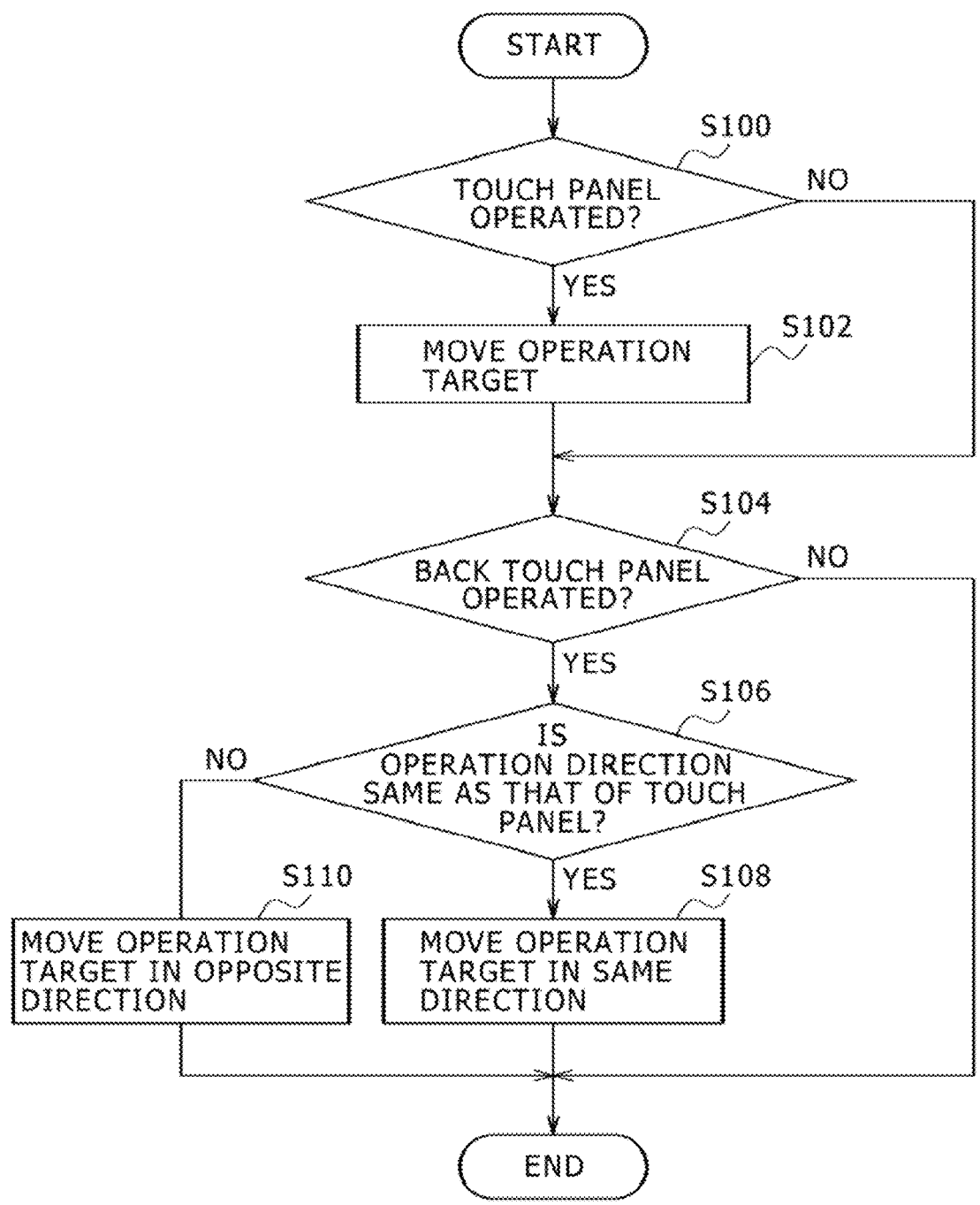
FIG. 20 is a flowchart showing the procedure of an input control method according to the embodiment.

FIG. 20 is a flowchart showing the procedure of an input control method according to the embodiment. FIG. 20 shows procedure when a display target is moved. If the input acquirer 41 acquires operation input to the touch panel (Y of S100), the movement controller 44 moves the operation target according to the direction of the input (S102). If the input acquirer 41 does not acquire operation input to the touch panel 61 (N of S100), S102 is skipped. If the input acquirer 41 acquires operation input to the back touch panel 51 (Y of S104), the determining section 43 refers to the object table 80 and determines whether or not the operation direction is the same as that in the case of operation input to the touch panel 61 (S106). If the operation direction is the same (Y of S106), the movement controller 44 moves the operation target in the same direction as that in the case of operation input to the touch panel 61 (S108). If the operation direction is opposite (N of S106), the movement controller 44 moves the operation target in the opposite direction to that in the case of operation input to the touch panel 61 (S110). If the input acquirer 41 does not acquire operation input to the back touch panel (N of S104), S106, S108, and S110 are skipped.

Figure 21:
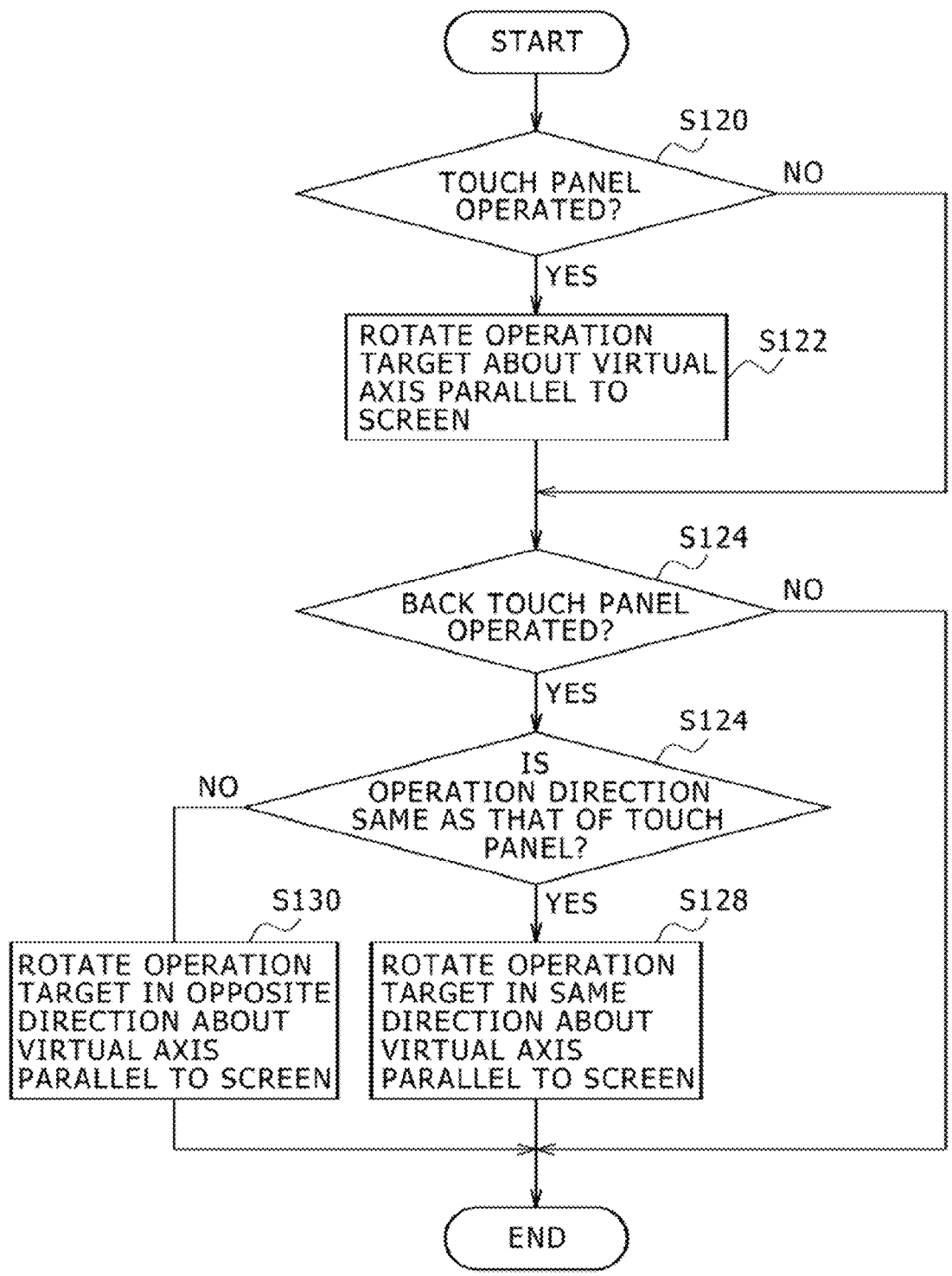
FIG. 21 is a flowchart showing the procedure of the input control method according to the embodiment.

FIG. 21 is a flowchart showing the procedure of the input control method according to the embodiment. FIG. 21 shows procedure when a display target is rotated. If the input acquirer 41 acquires operation input to the touch panel (Y of S120), the rotation controller 45 rotates the operation target about a virtual axis parallel to the display screen of the display device according to the direction of the input (S122). If the input acquirer 41 does not acquire operation input to the touch panel 61 (N of S120), S122 is skipped. If the input acquirer 41 acquires operation input to the back touch panel 51 (Y of S124), the determining section 43 refers to the object table 80 and determines whether or not the operation direction is the same as that in the case of operation input to the touch panel 61 (S126). If the operation direction is the same (Y of S126), the rotation controller 45 rotates the operation target about the virtual axis parallel to the display screen in the same direction as that in the case of operation input to the touch panel 61 (S128). If the operation direction is opposite (N of S126), the rotation controller 45 rotates the operation target about the virtual axis parallel to the display screen in the opposite direction to that in the case of operation input to the touch panel 61 (S130). If the input acquirer 41 does not acquire operation input to the back touch panel 51 (N of S124), S126, S128, and S130 are skipped.

In the above example, explanation is made about the technique to operate a display target in the same direction by operation input to the touch panel 61 and operation input of the opposite direction to the back touch panel 51. However, in another example, a display target may be operated by simultaneous operation input to the touch panel 61 and the back touch panel 51. For example, a display target may be moved when drag input is made to either one of the touch panel 61 and the back touch panel 51 and the display target may be rotated when drag inputs in opposite directions are simultaneously made to both of the touch panel 61 and the back touch panel 51.

FIGS. 22(*a*) and 22(*b*) show a screen example when the three-dimensional object is moved. If, as shown in FIG. 22(*a*), the input acquirer 41 detects that drag input is made upward on the touch panel 61 when the three-dimensional object 122 is displayed in the screen 120, the movement controller 44 moves the three-dimensional object 122 upward as shown in FIG. 22(*b*).

FIGS. 23(*a*) and 23(*b*) show a screen example when the three-dimensional object is rotated. If, as shown in FIG. 23(*a*), the input acquirer 41 detects that drag input is made upward on the touch panel 61 and simultaneously drag input is made downward on the back touch panel 51 when the three-dimensional object 122 is displayed in the screen 120, the rotation controller 45 rotates the three-dimensional object 122 in such a manner that the front side of the object moves upward and the back side moves downward as shown in FIG. 23(*b*). This can provide an operation environment that fits the intuition of the user.

In the above examples, explanation is made about examples in which a display target is moved or rotated according to direction instruction input such as drag input, swipe input, flick input, and pinch input to the touch panel 61 or the back touch panel 51. However, in another example, a display target may be operated according to tap input or the like to the touch panel 61 or the back touch panel 51. Also in this case, operation different between when tap input is made to the touch panel 61 and when tap input is made to the back touch panel 51 may be carried out.

FIGS. 24(*a*) and 24(*b*) show a screen example when the display target is switched by tap input. As shown in FIG. 24(*a*), document pages 143*a* and 143*b* are displayed in a screen 140 by the application 42 for displaying the document. As shown in FIG. 24(*b*), the pages 143*a* and 143*b* are disposed on the front-side side surface of a rectangular parallelepiped object 142 rotated about a virtual axis 144 parallel to the display screen of the display device 60. When the user makes tap input on the touch panel 61 or the back touch panel 51, the determining section 43 deems that the position on the object 142 corresponding to the input position is pressed by the user and determines the rotation direction of the object 142. The user can switch the pages displayed in the screen 140 by rotating the object 142.

FIGS. 25(*a*) and 25(*b*) show a screen example when the display target is switched by tap input. If, as shown in FIG. 25(*a*), the input acquirer 41 detects that tap input is made at a position at which an upper page 143*a* is displayed on the touch panel 61, i.e. a position corresponding to the area of the object 142 closer to the upper side than the virtual axis 144, when the pages 143*a* and 143*b* are displayed in the screen 140, the rotation controller 45 rotates the object 142 about the virtual axis 144 in such a manner that the upper half of the object moves to the back side and the lower half moves to the front side as shown in FIG. 25(*b*). Therefore, the pages displayed in the screen 140 are switched to the pages disposed on the back-side side surface of the object 142. In the present embodiment, it is assumed that the display target is switched to pages 145*a* and 145*b* as the previous pages of the pages 143*a* and 143*b* when the object 142 is rotated as shown in FIG. 25(*b*). When the object 142 is further rotated in the same direction, the display target is switched to the more previous pages.

FIGS. 26(*a*) and 26(*b*) show a screen example when the display target is switched by tap input. If, as shown in FIG. 26(*a*), the input acquirer 41 detects that tap input is made at a position at which a lower page 143*b* is displayed on the touch panel 61, i.e. a position corresponding to the area of the object 142 closer to the lower side than the virtual axis 144, when the pages 143*a* and 143*b* are displayed in the screen 140, the rotation controller 45 rotates the object 142 about the virtual axis 144 in such a manner that the upper half of the object moves to the front side and the lower half moves to the back side as shown in FIG. 26(*b*). Therefore, the pages displayed in the screen 140 are switched to the pages disposed on the back-side side surface of the object 142. In the present embodiment, it is assumed that the display target is switched to pages 146*a* and 146*b* as the next pages of the pages 143*a* and 143*b* when the object 142 is rotated as shown in FIG. 26(*b*). When the object 142 is further rotated in the same direction, the display target is switched to the more next pages.

FIGS. 27(*a*) and 27(*b*) show a screen example when the object is rotated by tap input. If, as shown in FIG. 27(*a*), the input acquirer 41 detects that tap input is made at a position at which the upper page 143*a* is displayed on the back touch panel 51, i.e. a position corresponding to the area of the object 142 closer to the upper side than the virtual axis 144, when the pages 143*a* and 143*b* are displayed in the screen 140, the rotation controller 45 rotates the object 142 about the virtual axis 144 in such a manner that the upper half of the object moves to the front side and the lower half moves to the back side as shown in FIG. 27(*b*). Therefore, the pages displayed in the screen 140 are switched to the pages 146*a* and 146*b* as the next pages of the pages 143*a* and 143*b*.

FIGS. 28(*a*) and 28(*b*) show a screen example when the display target is switched by tap input. If, as shown in FIG. 28(*a*), the input acquirer 41 detects that tap input is made at a position at which the lower page 143*b* is displayed on the back touch panel 51, i.e. a position corresponding to the area of the object 142 closer to the lower side than the virtual axis 144, when the pages 143*a* and 143*b* are displayed in the screen 140, the rotation controller 45 rotates the object 142 about the virtual axis 144 in such a manner that the upper half of the object moves to the back side and the lower half moves to the front side as shown in FIG. 28(*b*). Therefore, the pages displayed in the screen 140 are switched to the pages 145*a* and 145*b* as the previous pages of the pages 143*a* and 143*b*.

Such a function allows the user to press and rotate the object 142 by tap input to the touch panel 61 or the back touch panel 51 to make switching to a different display target according to the rotation direction. This can provide an operation environment that fits the intuition.

FIGS. 29(*a*) and 29(*b*) show a screen example when the display target is switched by tap input. As shown in FIG. 29(*a*), a document page 152 is displayed in a screen 150 by the application 42 for displaying the document. As shown in FIG. 29(*b*), the page 152 is disposed on the front-side side surface of a rectangular parallelepiped object 151 rotated about a virtual axis 153 parallel to the display screen of the display device 60. When the object 151 rotates frontward about the virtual axis 153 to fall down, an object 154 disposed on the back side of the object 151 is moved frontward and the display target is switched to a page disposed on the front-side side surface of the object 154. When the object 151 rotates backward about the virtual axis 153 to fall down, an object 156 disposed on the front side of the object 151 is moved backward and the display target is switched to a page disposed on the front-side side surface of the object 156. The determining section 43 determines the rotation direction of the object 151 based on a thought that the front-side side surface of the object 151 is pressed by the user when the user makes tap input on the touch panel 61 and the back-side side surface of the object 151 is pressed by the user when the user makes tap input on the back touch panel 51.

FIGS. 30(*a*) and 30(*b*) show a screen example when the display target is switched by tap input. If, as shown in FIG. 30(*a*), the input acquirer 41 detects that tap input is made at a position on the touch panel 61 corresponding to a position at which the object 151 is displayed when the page 152 is displayed in the screen 150, the rotation controller 45 rotates the object 151 about the virtual axis 153 in such a manner that the object 151 falls down backward, to set the object 156 as the display target instead as shown in FIG. 30(*b*). Therefore, the page displayed in the screen 150 is switched to a page 157 as the previous page of the page 152.

FIGS. 31(*a*) and 31(*b*) show a screen example when the display target is switched by tap input. If, as shown in FIG. 31(*a*), the input acquirer 41 detects that tap input is made at a position on the back touch panel 51 corresponding to a position at which the object 151 is displayed when the page 152 is displayed in the screen 150, the rotation controller 45 rotates the object 151 about the virtual axis 153 in such a manner that the object 151 falls down frontward, to set the object 154 as the display target instead as shown in FIG. 31(*b*). Therefore, the page displayed in the screen 150 is switched to a page 155 as the next page of the page 152.

Such a function allows the user to press and rotate the object 151 by tap input to the touch panel 61 or the back touch panel 51 to make switching to a different display target according to the rotation direction. This can provide an operation environment that fits the intuition.

FIGS. 32(*a*) and 32(*b*) show a screen example when the display target is switched by tap input. As shown in FIG. 32(*a*), the document page 152 is displayed in the screen 150 by the application 42 for displaying the document. As shown in FIG. 32(*b*), the page 152 is disposed on the front-side side surface of the rectangular parallelepiped object 151 disposed on a plane 159. When the object 151 is pressed to the front side to drop down from the plane 159, the object 154 disposed on the back side of the object 151 is moved frontward and the display target is switched to a page disposed on the front-side side surface of the object 154. When the object 151 is pressed to the back side to drop down from the plane 159, the object 156 disposed on the front side of the object 151 is moved backward and the display target is switched to a page disposed on the front-side side surface of the object 156. The determining section 43 determines the movement direction of the object 151 based on a thought that the front-side side surface of the object 151 is pressed by the user when the user makes tap input on the touch panel 61 and the back-side side surface of the object 151 is pressed by the user when the user makes tap input on the back touch panel 51.

FIGS. 33(*a*) and 33(*b*) show a screen example when the display target is switched by tap input. If, as shown in FIG. 33(*a*), the input acquirer 41 detects that tap input is made at a position on the touch panel 61 corresponding to a position at which the object 151 is displayed when the page 152 is displayed in the screen 150, the movement controller 44 moves the object 151 backward and then moves it downward to set the object 156 as the display target instead as shown in FIG. 33(*b*). Therefore, the page displayed in the screen 150 is switched to the page 157 as the previous page of the page 152.

FIGS. 34(*a*) and 34(*b*) show a screen example when the display target is switched by tap input. If, as shown in FIG. 34(*a*), the input acquirer 41 detects that tap input is made at a position on the back touch panel 51 corresponding to a position at which the object 151 is displayed when the page 152 is displayed in the screen 150, the movement controller 44 moves the object 151 frontward and then moves it downward to set the object 154 as the display target instead as shown in FIG. 34(*b*). Therefore, the page displayed in the screen 150 is switched to the page 155 as the next page of the page 152.

Such a function allows the user to press and move the object 151 by tap input to the touch panel 61 or the back touch panel 51 to make switching to a different display target according to the movement direction. This can provide an operation environment that fits the intuition.

In the above-described examples, a display target is rotated or moved based on a thought that the display target is pressed by tap input. However, conversely instruction input for pulling or sucking a display target may be accepted from a user and the display target may be rotated or moved based on a thought that the display target is pulled. For example, operation input of tapping a position corresponding to a display target and performing long press for predetermined time or longer and then performing release may be employed as instruction input for sucking the display target. Because operation of e.g. pressing a finger against a sucking target by the user to make the target be adsorbed onto the finger and then pulling it is employed as instruction input for sucking the display target, an operation environment that fits the intuition of the user can be provided. The instruction input for sucking a display target may be another input. For example, it may be pinch-in input or the like.

FIGS. 35(*a*) and 35(*b*) show a screen example when the display target is switched by tap input. If, as shown in FIG. 35(*a*), detecting that tap input is made at a position on the back touch panel 51 corresponding to a position at which the object 151 is displayed when the page 152 is displayed in the screen 150, the input acquirer 41 displays an object 158 indicating the tapped position in the screen 150. If detecting that the tap input is made at the same position for predetermined time or longer, the input acquirer 41 changes the display form of the object 158 as shown in FIG. 35(*b*) in order to visually show the user that the operation mode has shifted to a suck mode for sucking the display target.

FIGS. 36(*a*) and 36(*b*) show a screen example when the display target is switched by tap input. After the shift to the suck mode for sucking the display target, if detecting that the user has detached the finger from the back touch panel 51 as shown in FIG. 36(*a*), the input acquirer 41 notifies the rotation controller 45 of information indicating the input position and that the operation mode is the suck mode. In contrast to the example shown in FIGS. 31(a) and 31(b), the rotation controller 45 rotates the object 151 about the virtual axis 153 in such a manner that the object 151 falls down backward to set the object 156 as the display target instead as shown in FIG. 36(b). Therefore, the page displayed in the screen 150 is switched to the page 157 as the previous page of the page 152.

FIGS. 37(a) and 37(b) show a screen example when the display target is switched by tap input. As shown in FIG. 37(a), the input acquirer 41 changes the display form of the object 151 if detecting that tap input is made at a position on the touch panel 61 corresponding to a position at which the object 151 is displayed when the page 152 is displayed in the screen 150. When the touch panel 61 is tapped, although an object indicating the tapped position is displayed in the screen 150, it is often difficult to visually recognize because being hidden by the finger. Therefore, the display form of the whole of the object 151 as the operation target is changed. If detecting that the tap input is made at the same position for predetermined time or longer, the input acquirer 41 further changes the display form of the object 151 as shown in FIG. 37(b) in order to visually show the user that the operation mode has shifted to the suck mode for sucking the display target.

FIGS. 38(a) and 38(b) show a screen example when the display target is switched by tap input. After the shift to the suck mode for sucking the display target, if detecting that the user has detached the finger from the touch panel 61 as shown in FIG. 38(a), the input acquirer 41 notifies the rotation controller 45 of information indicating the input position and that the operation mode is the suck mode. In contrast to the example shown in FIGS. 30(a) and 30(b), the rotation controller 45 rotates the object 151 about the virtual axis 153 in such a manner that the object 151 falls down frontward to set the object 154 as the display target instead as shown in FIG. 38(b). Therefore, the page displayed in the screen 150 is switched to the page 155 as the next page of the page 152.

In the suck mode, the determining section 43 determines the rotation direction of the object 151 based on the thought that the front-side side surface of the object 151 is sucked by the user when the user makes input for sucking a display target on the touch panel 61 and the back-side side surface of the object 151 is sucked by the user when the user makes the input on the back touch panel 51.

The suck mode can be utilized for various functions. For example, an object sucked in the suck mode may be so displayed as to be scaled down by a predetermined scaling factor. This allows an object to look as if getting into the back side when the user has made input for sucking on the back touch panel 51, and allows an object to look as if floating up into the front side when the user has made input for sucking on the touch panel 61. Thus, the movement of the object can be three-dimensionally represented. Furthermore, it is possible to realize e.g. a game in which an icon of a vacuum cleaner is displayed in a screen when the user touches the touch panel 61 or the back touch panel 51 with a finger and a dust is sucked when a touch is continued on an object of the dust disposed on the screen for predetermined time or longer.

In the example in which an object is operated by tap input, the contents of operation may be made different according to the length, strength, and so forth of the tap input. For example, in the examples shown in FIGS. 24 to 28, if tap input is longer or stronger than a predetermined value, the object 142 may be rotated twice or more to switch the display target to a page that is previous or subsequent by two or more pages. The display target may be switched more times when tap input is longer or stronger. Also in the examples shown in FIGS. 29 to 38, similarly the display target may be switched more times when tap input is longer or stronger.

The present invention is described above based on embodiment examples. It will be understood by those skilled in the art that the embodiment examples are exemplification and various modifications can be made in combinations of the respective constituent elements and the respective processing processes thereof and such modification examples are also within the scope of the present invention.

In the embodiment, explanation is made about examples in which rotating drum, three-dimensional object, and circular list are operated. However, the technique of the present embodiment can be applied also to the case of operating another object, of course. For example, the technique of the present embodiment can be applied to the case of operating an arbitrary operation target whose rotation about a virtual axis parallel to a screen can be conceived, such as a case in which a gun displayed in a screen is operated to change the orientation of the gun in a game in which the gun is shot, a case in which a control stick of an airplane or the like is operated, and a case in which an elevator or the like moving up and down by a pulley is operated.

REFERENCE SIGNS LIST

10 Game device, 40 Control block, 41 Input acquirer, 42 Application, 43 Determining section, 44 Movement controller, 45 Rotation controller, 46 Setting section, 51 Back touch panel, 60 Display device, 61 Touch panel, 80 Object table

INDUSTRIAL APPLICABILITY

The present invention can be utilized for an input control device that accepts input for operating a display target displayed on a display device and operates the display target.

The invention claimed is:

1. A computer having a processing system executing an input control program for causing the computer to function as:
   a display controller that displays a display target on a display screen of a display device,
   an acquiring section that acquires a position or direction of operation input to the display target from a touch panel annexed to the display screen of the display device and a back touch panel provided on a surface on an opposite side to the display screen of the display device,
   a determining section that determines a direction in which to operate the display target according to the position or direction of operation input and a kind of the display target as a target of operation when the acquiring section acquires the operation input to the display target from the back touch panel,
   a setting section that accepts, from a user, a setting relating to whether, when the acquiring section acquires operation input of a certain direction to the display target from the back touch panel, the display target is operated in the same direction as or an opposite direction to a direction when the acquiring section acquires operation input of the same direction to the display target from the touch panel, and registers the accepted setting in a table, and an operation controller that operates the display target in the direction determined by the determining section.

2. The computer according to claim 1, wherein when the display target rotates about a virtual axis parallel to the display screen, when the acquiring section acquires operation input of a certain direction to the display target from the back touch panel, the determining section determines to operate the display target in an opposite direction to a direction when the acquiring section acquires operation input of the same direction to the display target from the touch panel.

3. The computer according to claim 1, wherein when the display target is so displayed that a display part larger than a display area cyclically scrolls, when the acquiring section acquires operation input of a certain direction to the display target from the back touch panel, the determining section determines to operate the display target in an opposite direction to a direction when the acquiring section acquires operation input of the same direction to the display target from the touch panel.

4. The computer according to claim 1, wherein the determining section determines the direction in which to operate the display target with reference to the table in association with the kind of the display target.

5. An input control device, comprising:
a display controller that displays a display target on a display screen of a display device,
an acquiring section that acquires a position or direction of operation input to the display target from a touch panel annexed to the display screen of the display device and a back touch panel provided on a surface on an opposite side to the display screen of the display device,
a determining section that determines a direction in which to operate the display target according to the position or direction of operation input and a kind of the display target as a target of operation when the acquiring section acquires the operation input to the display target from the back touch panel, wherein the direction of the display target is determined as a result of an input made on the back touch panel, and
an operation controller that operates the display target in the direction determined by the determining section.

6. An input control method, comprising the steps of:
displaying, by a display controller, a display target on a display screen of a display device,
acquiring, by an acquiring section, a position or direction of operation input to the display target from a touch panel annexed to the display screen of the display device and a back touch panel provided on a surface on an opposite side to the display screen of the display device,
determining, by a determining section, a direction in which to operate the display target according to the position or direction of operation input and a kind of the display target as a target of operation when the acquiring section acquires the operation input to the display target from the back touch panel,
specifying the direction of the display target as a result of an input made on the back touch panel, and
operating, by an operation controller, the display target in the direction determined by the determining section.

7. A non-transitory, computer-readable recording medium containing the input control program according to claim 1.

* * * * *